(12) United States Patent　　(10) Patent No.: US 9,918,003 B2
Inoue　　(45) Date of Patent: Mar. 13, 2018

(54) CONTROL APPARATUS, IMAGE PICKUP APPARATUS, IMAGE PICKUP SYSTEM, LENS APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 14/927,651

(22) Filed: Oct. 30, 2015

(65) Prior Publication Data

US 2016/0134802 A1　　May 12, 2016

(30) Foreign Application Priority Data

Nov. 10, 2014　(JP) ................. 2014-227662

(51) Int. Cl.
| | |
|---|---|
| H04N 5/232 | (2006.01) |
| G02B 7/36 | (2006.01) |
| G02B 7/28 | (2006.01) |
| G02B 27/00 | (2006.01) |
| G02B 7/10 | (2006.01) |
| G02B 15/14 | (2006.01) |

(52) U.S. Cl.
CPC ......... *H04N 5/23212* (2013.01); *G02B 7/285* (2013.01); *G02B 7/365* (2013.01); *G02B 7/102* (2013.01); *G02B 15/14* (2013.01); *G02B 27/0075* (2013.01)

(58) Field of Classification Search
CPC .... H04N 5/23212; G02B 7/365; G02B 7/285; G02B 15/14; G02B 27/0075; G02B 7/102
See application file for complete search history.

(56) References Cited

U.S. PATENT DOCUMENTS

| | | | |
|---|---|---|---|
| 7,676,146 B2 | 3/2010 | Border et al. | |
| 7,728,903 B2* | 6/2010 | Ohnishi ................ | G03B 13/34 348/345 |
| 7,733,412 B2* | 6/2010 | Takayama ........... | H04N 5/23212 348/349 |
| 8,098,287 B2 | 1/2012 | Misawa et al. | |
| 8,135,268 B2* | 3/2012 | Hongu .................. | G02B 7/102 396/80 |
| 2014/0002688 A1* | 1/2014 | Inoue ................. | H04N 5/23296 348/222.1 |

FOREIGN PATENT DOCUMENTS

| | | |
|---|---|---|
| JP | 2004207774 A | 7/2004 |
| JP | 2010521005 A | 6/2010 |
| WO | 2008112051 A1 | 9/2008 |

* cited by examiner

*Primary Examiner* — Padma Haliyur

(74) *Attorney, Agent, or Firm* — Rossi, Kimms & McDowell LLP

(57) ABSTRACT

A control apparatus includes a focus detector configured to perform focus detection based on an image signal obtained via a first optical system, the first optical system having a shallowest depth of field in a plurality of optical systems having focal lengths different from each other, and a controller configured to perform focus control of the plurality of optical systems based on an output signal from the focus detector.

18 Claims, 26 Drawing Sheets

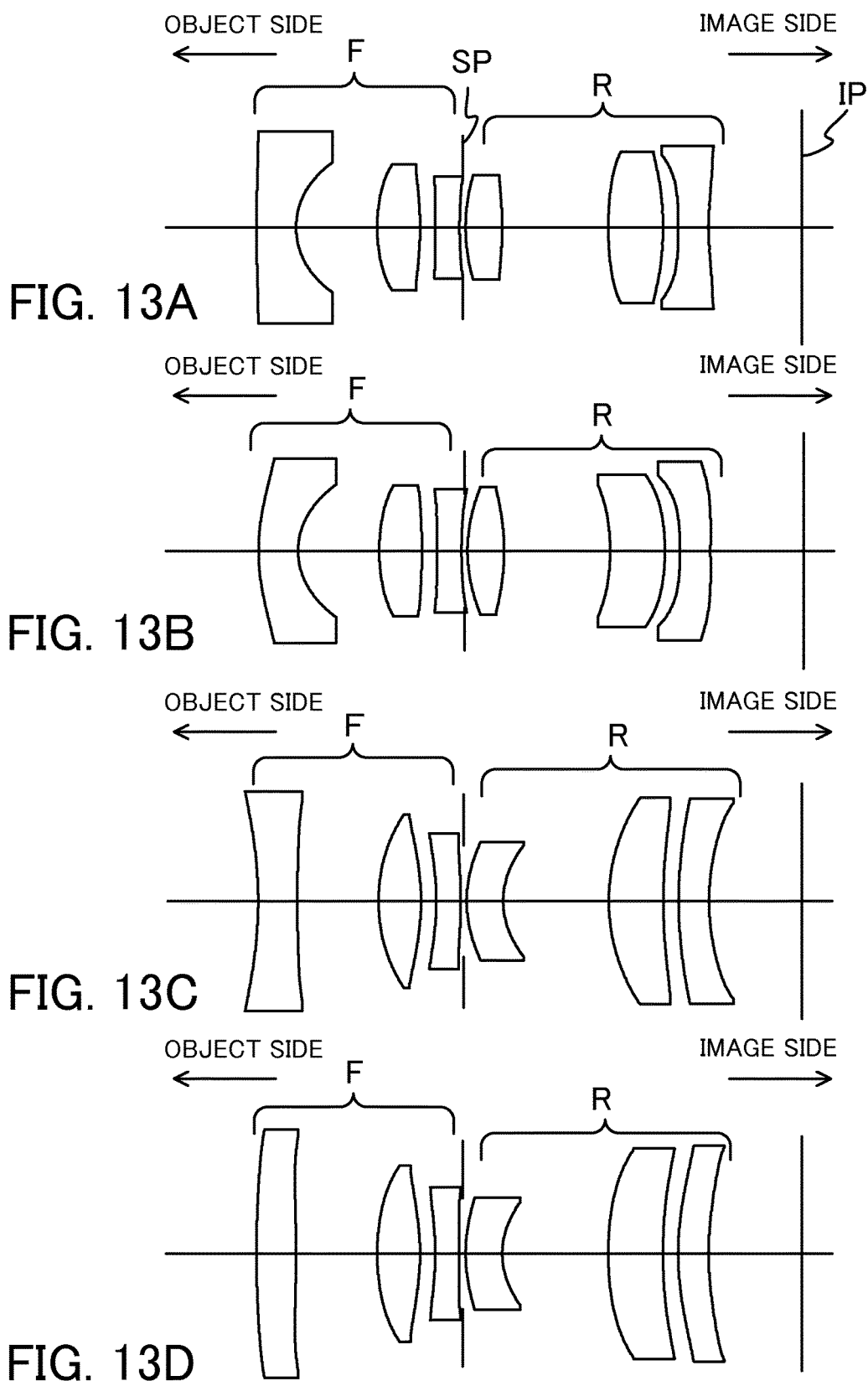

CONTROL APPARATUS, IMAGE PICKUP APPARATUS, IMAGE PICKUP SYSTEM, LENS APPARATUS, CONTROL METHOD, AND NON-TRANSITORY COMPUTER-READABLE STORAGE MEDIUM

BACKGROUND OF THE INVENTION

Field of the Invention

The present invention relates to a compound-eye image pickup apparatus configured by arraying a plurality of optical systems.

Description of the Related Art

Previously, with respect to a compound-eye image pickup apparatus including a plurality of optical systems disposed parallel to each other, an image pickup apparatus which performs focus control (AF control) is known. In the compound-eye image pickup apparatus, a load in performing the AF control increases when a defocus amount for each of the optical systems needs to be calculated.

Japanese Patent Laid-open No. 2004-207774 discloses a compound-eye image pickup apparatus which performs AF control by a contrast detection method by using a short focus optical system based on an image signal obtained from an image pickup element corresponding to the short focus optical system having a deep depth of focus, and then it performs AF control of a long focus optical system based on an AF result of the short focus optical system. Japanese Translation of PCT International Application Publication No. 2010-521005 discloses a compound-eye image pickup apparatus which performs AF control of an optical system selected for capturing an image by using an output signal from an image pickup element via the other optical system when one optical system is selected for capturing the image of two optical systems. As described above, in the compound-eye image pickup apparatus disclosed in Japanese Patent Laid-open No. 2004-207774 and Japanese Translation of PCT International Application Publication No. 2010-521005, the AF control is performed by using the image signal obtained from one optical system, and thus a load in performing the AF control is reduced.

However, the compound-eye image pickup apparatus disclosed in Japanese Patent Laid-open No. 2004-207774 performs the AF by the contrast detection method by using the short focus optical system having a deep depth of field. Therefore, when the AF result obtained by using the short focus optical system is applied to the long focus optical system having a shallow depth of focus, the accuracy of the focus control is deteriorated. The compound-eye image pickup apparatus disclosed in Japanese Translation of PCT International Application Publication No. 2010-521005 performs the AF control by using the short focus optical system having a deep depth of field, and therefore the accuracy of the AF control in other optical systems having different depth of field is deteriorated. Accordingly, in the configurations of Japanese Patent Laid-open No. 2004-207774 and Japanese Translation of PCT International Application Publication No. 2010-521005, focal points in a plurality of optical systems cannot be determined efficiently and accurately.

SUMMARY OF THE INVENTION

The present invention provides a control apparatus, an image pickup apparatus, an image pickup system, a lens apparatus, a control method, and a non-transitory computer-readable storage medium which are capable of efficiently and accurately determining (detecting) focal points of a plurality of optical systems having focal lengths different from each other.

A control apparatus as one aspect of the present invention includes a focus detector configured to perform focus detection based on an image signal obtained via a first optical system, the first optical system having a shallowest depth of field in a plurality of optical systems having focal lengths different from each other, and a controller configured to perform focus control of the plurality of optical systems based on an output signal from the focus detector.

An image pickup apparatus as another aspect of the present invention includes an image pickup element configured to photoelectrically convert an optical image formed via a plurality of optical systems having focal lengths different from each other, a focus detector configured to perform focus detection based on an image signal obtained via a first optical system, the first optical system having a shallowest depth of field in the plurality of optical systems, and a controller configured to perform focus control of the plurality of optical systems based on an output signal from the focus detector.

An image pickup system as another aspect of the present invention includes a plurality of optical systems having focal lengths different from each other, an image pickup element configured to photoelectrically convert an optical image formed via the plurality of optical systems, a focus detector configured to perform focus detection based on an image signal obtained via a first optical system, the first optical system having a shallowest depth of field in the plurality of optical systems, and a controller configured to perform focus control of the plurality of optical systems based on an output signal from the focus detector.

A lens apparatus as another aspect of the present invention includes a plurality of optical systems having focal lengths different from each other, and a controller configured to perform focus control of the plurality of optical systems based on an image signal obtained via a first optical system, the first optical system having a shallowest depth of field in the plurality of optical systems.

A control method as another aspect of the present invention includes the steps of performing focus detection based on an image signal obtained via a first optical system, the first optical system having a shallowest depth of field in a plurality of optical systems having focal lengths different from each other, and performing focus control of the plurality of optical systems based on a result of the focus detection.

A non-transitory computer-readable storage medium as another aspect of the present invention stores a program which causes a computer to execute a process including performing focus detection based on an image signal obtained via a first optical system, the first optical system having a shallowest depth of field in a plurality of optical systems having focal lengths different from each other, and performing focus control of the plurality of optical systems based on a result of the focus detection.

Further features and aspects of the present invention will become apparent from the following description of exemplary embodiments with reference to the attached drawings.

BRIEF DESCRIPTION OF THE DRAWINGS

FIGS. 13A to 13D are cross-sectional views of lenses of a wide facet, a wide-middle facet, a tele-middle facet, and a tele facet of a compound-eye optical system in Embodiment 4.

DESCRIPTION OF THE EMBODIMENTS

Exemplary embodiments of the present invention will be described below with reference to the accompanied drawings.

An image pickup apparatus in this embodiment is a compound-eye image pickup apparatus which controls a plurality of imaging optical systems (a plurality of optical systems) and a plurality of image pickup elements (or a plurality of image pickup regions) to capture a plurality of images at the same time. In this embodiment, as the imaging optical systems, a plurality of fixed-focal optical systems having different focal lengths from each other are disposed, and the image pickup elements having the image pickup regions corresponding to the respective optical systems are provided, and thus zooming is achieved. The number of the image pickup elements may be plural, or alternatively a single image pickup element may be divided into a plurality of image pickup regions.

A digital zoom unit is known which performs trimming of a part of an image captured by an image pickup apparatus and magnifies a range where the trimming of the captured image is performed up to a predetermined size so as to acquire an effect similar to that of artificial zooming. Furthermore, a zoom lens is known which combines digital zooming and optical zooming to achieve a higher variable power ratio.

Applying such a method, the effect similar to that of the artificial zooming can be obtained by providing the imaging optical systems having different angles of field in the compound-eye image pickup apparatus and interpolating an angle of field between the different angles of field by using a digital zoom technology. As a simple method, an image with a middle-angle of field, which has a high resolution in part but has a low resolution in other parts, can be obtained by fitting, into a part of an image obtained by performing digital zooming, a telephoto image obtained by an image pickup element corresponding to a telephoto lens. In other words, in order to achieve a continuous zooming function in the compound-eye image pickup apparatus, it is important to include a configuration in which a plurality of in-focus images with different angles of field can be captured simultaneously. If at least one of the images is an out-of-focus image which is not in focus, the effect of the method described above is decreased or lost, and accordingly the continuous zooming function with a high resolution cannot be achieved. Thus, the AF function is important in the compound-eye image pickup apparatus. However, a load of the image pickup apparatus increases if AF control and processing is to be individually performed.

Figure 21:
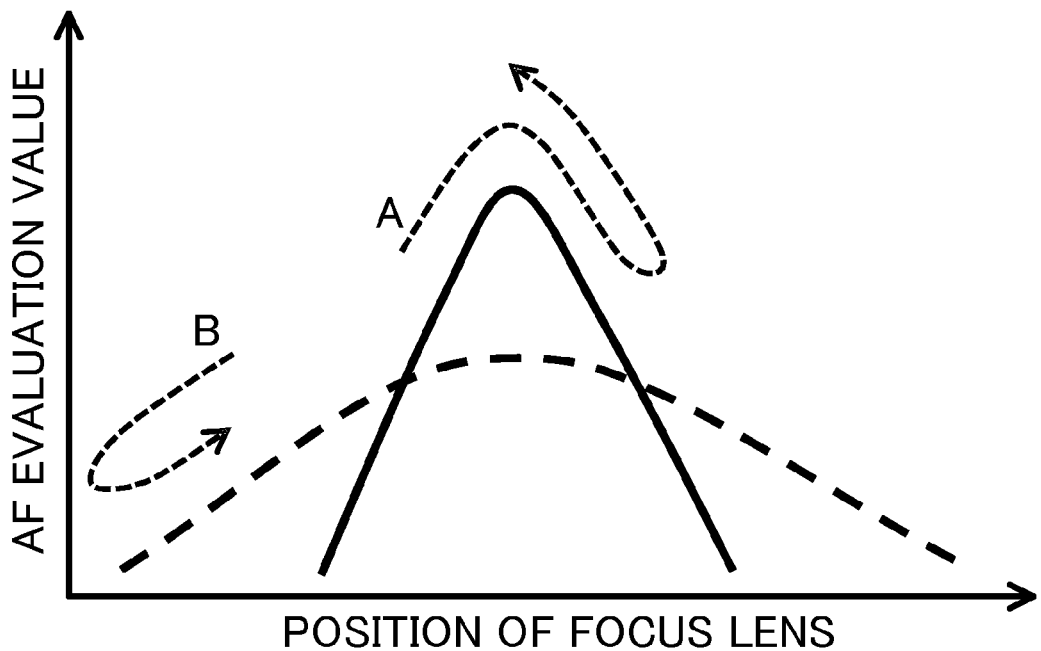
FIG. 21 is an explanatory diagram of a principle of AF control by a contrast detection method in each of Embodiments 1, 3, and 4.

Referring to FIG. 21, an example of a drive operation of a focus lens during the AF by a contrast detection method will be described. FIG. 21 is an explanatory diagram of a principle of the AF control by the contrast detection method. In FIG. 21, a dashed line indicates a relationship between an AF evaluation value and a position of a focus lens in an optical system having a deep depth of field, and a solid line indicates a relationship between an AF evaluation value and a position of a focus lens in an optical system having a shallow depth of field. The AF evaluation value is a value obtained by extracting a high frequency component by applying a filter to an image signal in an image region where focusing is to be performed. As illustrated in FIG. 21, the AF evaluation value is a value representing a sharpness (level of contrast) of an image, and it can be used as a value of representing a focus state of an image pickup optical system since the sharpness of the in-focus image is higher and the sharpness of the blurred image is lower.

In FIG. 21, when the focus lens is driven from a start position of a climbing drive in a rightward direction in the drawing, as indicated by an arrow A, it is detected that the AF evaluation value has passed the peak and is decreasing. In this case, it is assumed that a focal point has passed, and the climbing drive operation is finished and the focus lens goes back to a position where the AF evaluation value is maximized, and then a fine drive operation starts. By the fine drive operation, the focal point is detected in more detail to determine a final position of the focus lens. On the other hand, when the focus lens is driven from the start position of the climbing drive in a leftward direction in the drawing, as indicated by an arrow B, it is detected that the AF evaluation value is decreasing without passing the peak. In this case, it is determined that a moving direction of the focus lens is erroneous, and the climbing drive operation in a reverse direction continues. During the climbing drive operation, a moving amount of the focus lens per a certain period of time, i.e., a moving velocity, is typically larger than that during the fine drive operation. In addition, when the AF evaluation value is determined actually, it is typically determined that it reaches the focal point if it is within a certain threshold range. This is because an output similar to that in an in-focus state is obtained as a captured image within a depth of focus in the image pickup optical system. The depth of focus in the optical system is represented by $2 \times Fno \times \delta$ where Fno is an F number and $\delta$ is a diameter of a permissible circle of confusion with respect to a pixel pitch of an image pickup element.

Figure 22:
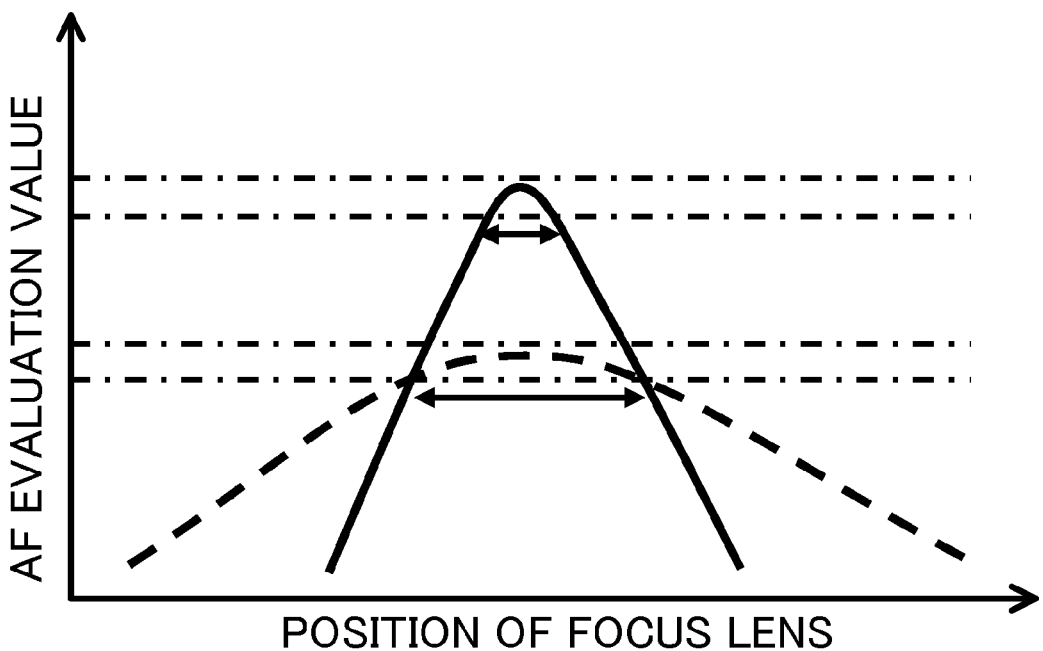
FIG. 22 is an explanatory diagram of a depth of field in the AF control by the contrast detection method in each of Embodiments 1, 3, and 4.

Referring to FIG. 22, an in-focus threshold value of the AF evaluation value will be described considering depths of focus in a graph for the optical system having the deep depth of field indicated by the dashed line and a graph for the optical system having the shallow depth of field indicated by the solid line depicted in FIG. 21. FIG. 22 is an explanatory diagram of the depth of field during the AF control by the contrast detection method. In FIG. 22, dashed-dotted lines indicate in-focus threshold values of the AF evaluation value.

In the drawing, the threshold value ranges for the optical systems are illustrated to be identical since it is assumed that the F numbers Fno of the optical systems are identical. In this case, a range in which it is determined that the focus lens in each optical system is in the in-focus state is indicated by an arrow in the drawing. As can be seen in FIG. 22, the position of the focus lens can be accurately determined with an increase of the sharpness in the graph as the optical system having the shallow depth of field. Since the optical system having the shallow depth of field tends to have high sensitivity of an image-plane moving amount with respect to the position of the focus lens, the position of the focus lens can be determined with high accuracy compared to the optical system having the deep depth of field.

For example, a compound-eye image pickup apparatus in this embodiment includes an acquirer which acquires an image capturing condition for capturing an image by using a plurality of imaging optical systems, and a determiner which determines a first imaging optical system having the shallowest depth of field to be used for capturing the image.

In this configuration, optical systems used for the AF control or the AF process can be controlled to select an optical system in which a position of a focus lens can be determined with high accuracy. As a result, reduction of a load of the control and the process during the AF as a whole of the image pickup apparatus and improvement of a focusing accuracy can be achieved.

Embodiment 1

Figure 1:
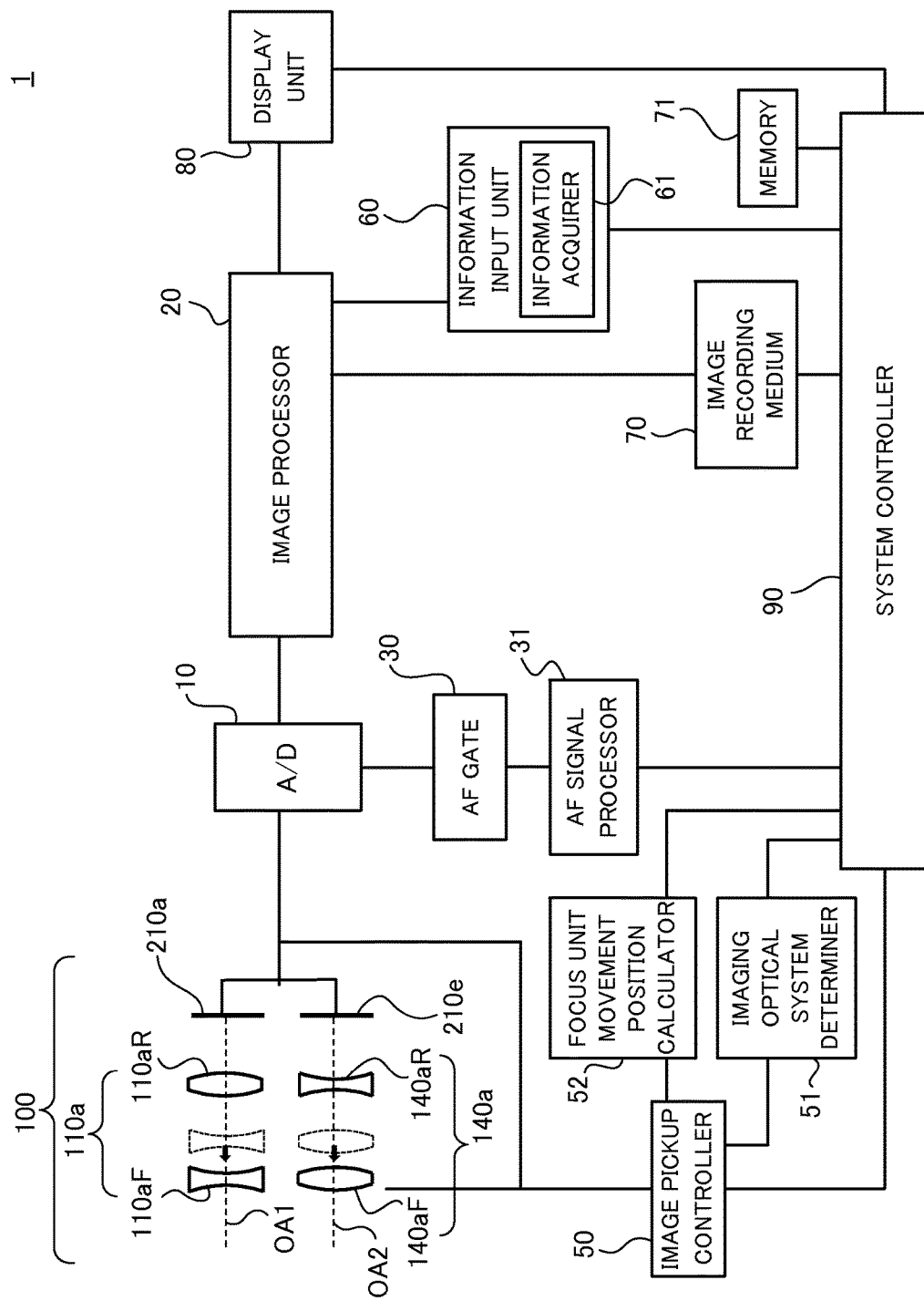
FIG. 1 is a block diagram of a compound-eye image pickup apparatus in Embodiment 1.
Figure 2:
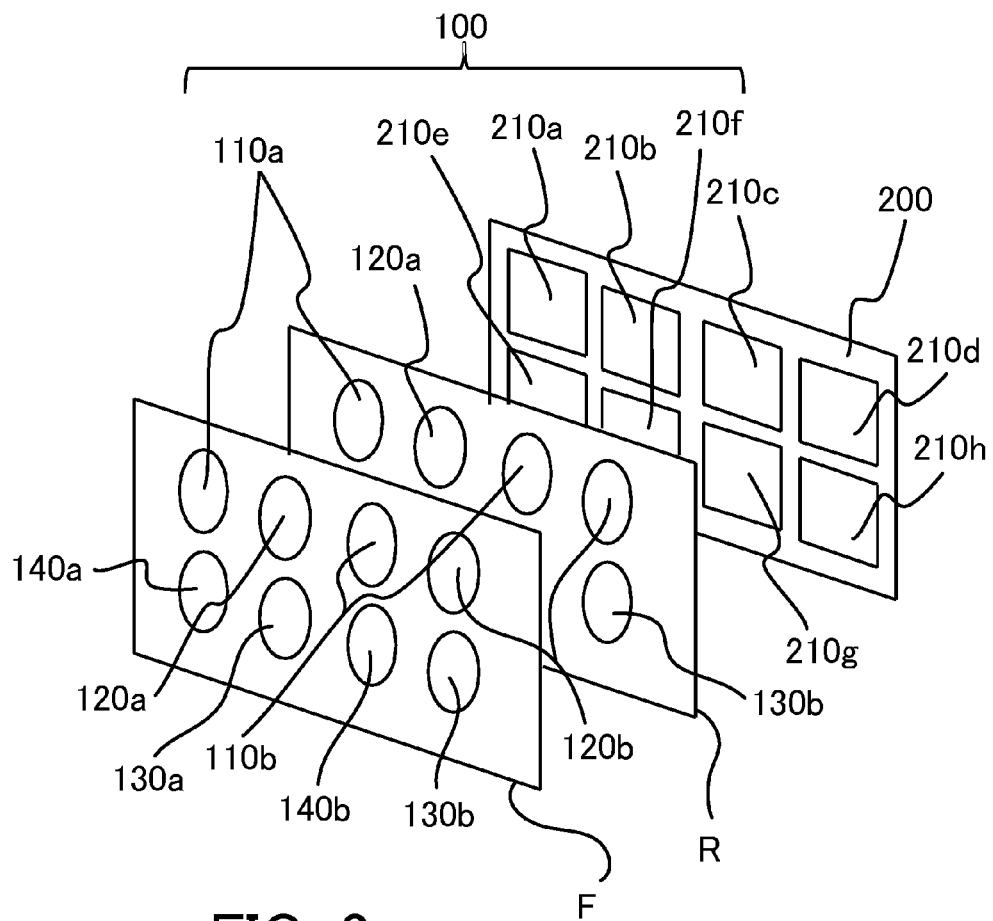
FIG. 2 is a perspective view of an image pickup unit in each of Embodiments 1 to 3.
Figure 3:
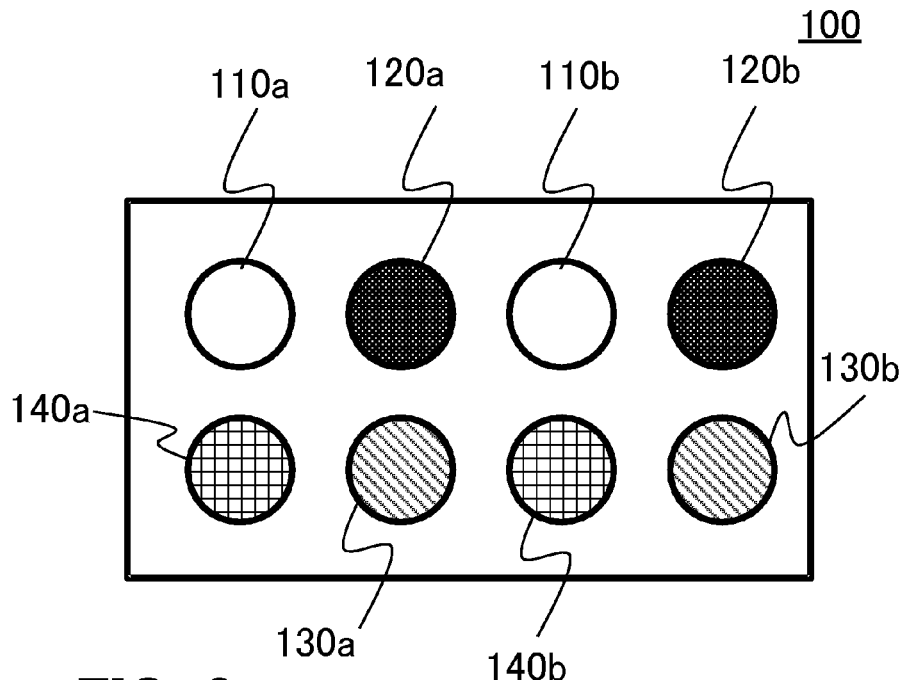
FIG. 3 is a front view of the image pickup unit in each of Embodiments 1 to 3.

First of all, referring to FIGS. 1 to 3, a compound-eye image pickup apparatus in Embodiment 1 of the present invention will be described. FIG. 1 is a block diagram of a compound-eye image pickup apparatus 1 in this embodiment. FIG. 2 is a perspective view of an image pickup unit 100 in the compound-eyen image pickup apparatus 1. FIG. 3 is a front view of the image pickup unit 100.

The compound-eye image pickup apparatus 1 includes the image pickup unit 100, an A/D converter 10, an image processor 20, an AF gate 30, an AF signal processor 31 (focus detector), a system controller 90, and an image pickup controller 50 (controller). Furthermore, the compound-eye image pickup apparatus 1 includes an imaging optical system determiner 51 (determiner), a focus unit movement position calculator 52 (calculator), an information input unit 60, an information acquirer 61 (acquirer), an image recording medium 70, a memory 71, and a display unit 80. The compound-eye image pickup apparatus 1 is a lens-integrated image pickup apparatus, but it is not limited thereto. For example, the compound-eye image pickup apparatus 1 may be an image pickup system which includes an image pickup apparatus body including an image pickup element and a lens apparatus including an imaging optical system (image pickup optical system) removably attached to the image pickup apparatus body.

As illustrated in FIGS. 1 to 3, the image pickup unit 100 includes eight imaging optical systems (image pickup optical systems) 110a, 120a, 130a, 140a, 110b, 120b, 130b, and 140b, each of which forms an optical image of an object. The image pickup unit 100 includes a plurality of image pickup elements 210a to 210h which correspond to the respective imaging optical systems 110a to 140b. FIG. 1 illustrates a cross section of the image pickup unit 100 including optical axes OA1 and OA2 of the imaging optical systems 110a and 140a in the image pickup unit 100, respectively.

Each imaging optical system includes a focus unit F (focus lens unit or front unit) and a rear unit R (fixed lens unit). FIG. 1 illustrates focus units 110aF and 140aF and rear units 110aR and 140aR corresponding to the imaging optical systems 110a and 140a, respectively. The focus unit F is driven so as to move while an object position changes (i.e., while focusing is performed). The rear unit R is fixed during the focusing, and other members such as a stop (not illustrated) are included in each imaging optical system. Thus, the compound-eye image pickup apparatus 1 of this embodiment uses a partial focusing method in which a part of the optical systems is moved during the focusing. The number of focus lenses mounted on the focus unit F included in each imaging optical system is one or more.

The plurality of image pickup elements 210a to 210f are held integrally and they constitute an image pickup element unit 200. The image pickup elements 210a and 210b correspond to the imaging optical systems 110a and 120a, respectively, and the image pickup elements 210c and 210d correspond to the imaging optical systems 110b and 120b, respectively. The image pickup elements 210e and 210f correspond to the imaging optical systems 140a and 130a, respectively, and the image pickup elements 210*g* and 210*h* correspond to the imaging optical systems 140*b* and 130*b*, respectively.

As illustrated in FIG. 3, optical axes of the eight imaging optical systems 110*a*, 120*a*, 130*a*, 140*a*, 110*b*, 120*b*, 130*b*, and 140*b* are approximately parallel to each other. The two imaging optical systems (for example, imaging optical systems 110*a* and 110*b*) to which an identical reference numeral is added have an identical focal length. In this embodiment, four pairs of imaging optical systems 110, 120, 130, and 140 having focal length different from each other are provided. The imaging optical systems 110*a* and 110*b* are a pair of wide-angle imaging optical systems having the shortest focal length among the eight imaging optical systems. The imaging optical systems 120*a* and 120*b* have a focal length longer than that of the imaging optical systems 110*a* and 110*b*. The imaging optical systems 130*a* and 130*b* have a focal length longer than that of the imaging optical systems 120*a* and 120*b*. The imaging optical systems 140*a* and 140*b* have a focal length longer than that of the imaging optical systems 130*a* and 130*b*.

Figure 4:
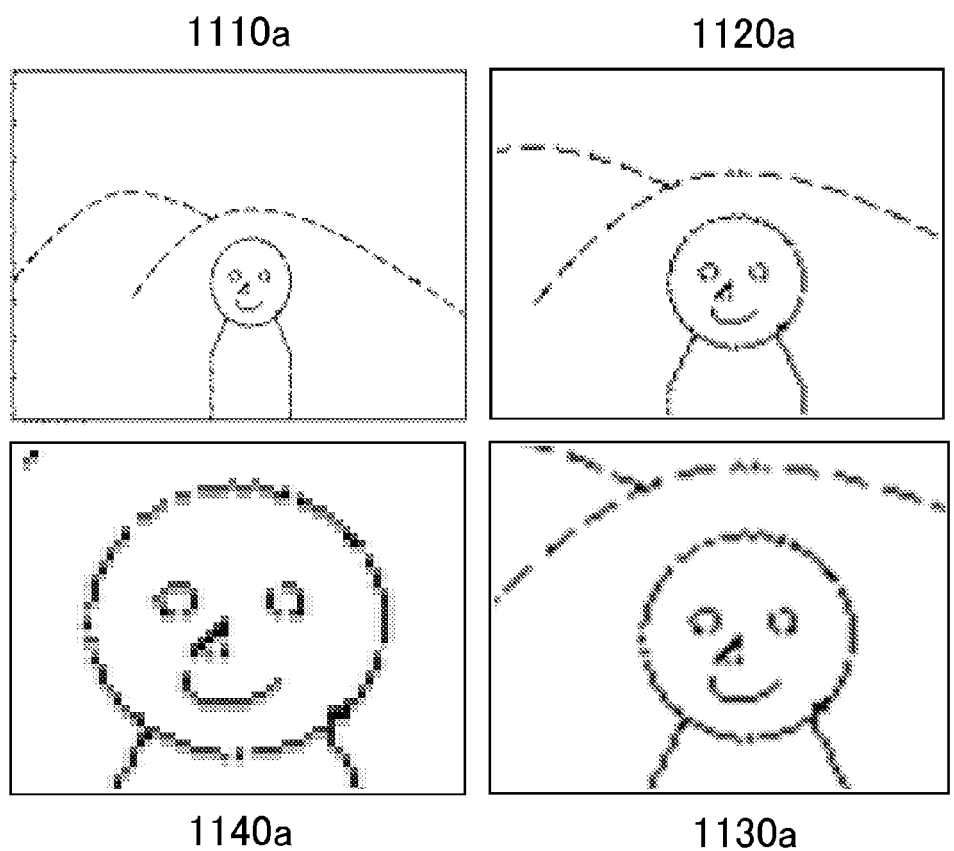
FIG. 4 is an explanatory diagram of captured images in each of Embodiments 1 to 3.

FIG. 4 is an explanatory diagram of shot images (captured images) in this embodiment, and illustrates captured images 1110*a*, 1120*a*, 1130*a*, and 1140*a* corresponding to the imaging optical systems 110*a*, 120*a*, 130*a*, and 140*a*, respectively. As illustrated in FIG. 4, the captured image 1110*a* corresponding to the imaging optical system 110*a* has the widest object space. The captured images 1120*a*, 1130*a*, and 1140*a* corresponding to the imaging optical systems 120*a*, 130*a*, and 140*a* have narrower captured object spaces depending on focal lengths.

In FIG. 1, the imaging optical systems 110*a* and 140*a* constitute a compound eye. The image pickup elements 210*a* and 210*e* convert, to electric signals (analog signals), optical images formed on surfaces (image pickup surfaces) of the image pickup elements 210*a* and 210*e* via the imaging optical systems 110*a* and 140*a*, respectively. The A/D converter 10 coverts the analog signals output from the image pickup elements 210*a* to 210*f* to digital signals, and then it supplies the digital signals to image processor 20 or the AF gate 30. The image processor 20 performs predetermined pixel interpolation processing, color conversion processing, or the like on each of image data from the A/D converter 10, and it also performs a predetermined calculation (arithmetic processing) by using each of the captured image data. A result processed by the image processor 20 is sent to the system controller 90.

The image processor 20 may include a super-resolution processor (super-resolution processing unit), image synthesizer (image synthesis unit), a blur adder, an object remover, or the like. The super-resolution processor performs super-resolution processing on an image by using a plurality of images. The image synthesizer uses a plurality of images to generate a single synthesized image having image characteristics different from those of the plurality of images, and for example it performs processing to reduce a noise level or create a high-dynamic-range image. The image characteristics include, for example at least one of a dynamic range, a resolution, a blurring amount, an angle of field, and a rate of removal of a captured object in an image. The blur adder adds (applies) a blur to an image based on distance information. The object remover obtains for example an image in which a background, which is specified as an unnecessary object by a user, other than a main object is removed.

The AF gate 30 supplies, to the AF signal processor 31, only a signal in a region (focus detection region or AF frame), which is to be used for focus detection, set by the system controller 90 among output signals of all pixels from the A/D converter 10. The AF signal processor 31 applies a filter to a pixel signal (focal signal or image signal) supplied from the AF gate 30 to extract a high frequency component, and it generates an AF evaluation value. The AF evaluation value is output to the system controller 90. The information input unit 60 detects information (data) relating to a desired image capturing condition which is selected and input by the user, and it supplies the data to the system controller 90. The information input unit 60 includes the information acquirer 61. The information acquirer 61 acquires current image capturing condition information (such as an aperture value (F number), a focal length, an exposure time, and an image pickup optical system to be used) from the image pickup controller 50 or the system controller 90.

The imaging optical system determiner 51 determines (selects) an imaging optical system to acquire a pixel output signal to be supplied to the AF gate 30 based on the image capturing condition information obtained from the information acquirer 61. The focus unit movement position calculator 52 calculates a focus unit movement position of the other imaging optical systems that are not selected, based on a focus unit position of the imaging optical system selected by imaging optical system determiner 51 and a lookup table or a function stored in the memory 71. The system controller 90 controls the image pickup controller 50 based on the supplied data. The image pickup controller 50 moves the focus unit F and controls each image pickup element according to the aperture value of each imaging optical system and the exposure time to acquire a necessary image.

The image recording medium 70 stores a file header of an image file, in addition to a plurality of still images or moving images. The memory 71 stores the lookup table relating to a relative position of the focus unit of each imaging optical system or the function of calculating the relative position of the focus unit. The display unit 80 displays an image, a status, an error, and the like, and it includes for example a liquid crystal display element.

Figure 5:
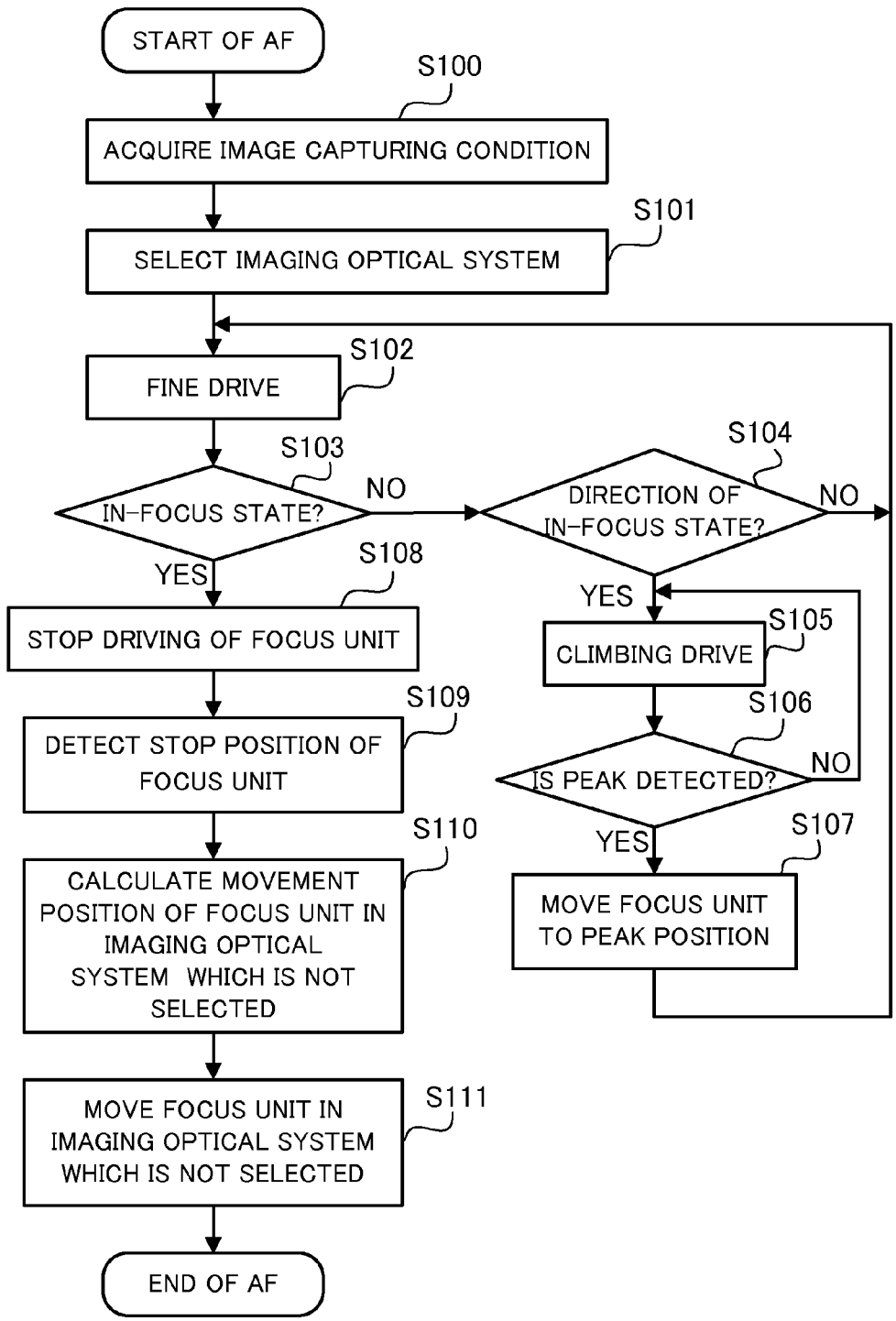
FIG. 5 is a flowchart of illustrating an image capturing operation of the compound-eye image pickup apparatus in Embodiment 1.

Next, referring to FIG. 5, an AF control method performed by the compound-eye image pickup apparatus 1 will be described. FIG. 5 is a flowchart of illustrating an image capturing operation (AF control method) of the compound-eye image pickup apparatus 1. Each step in FIG. 5 is performed by an instruction of the system controller 90 in the compound-eye image pickup apparatus 1. In other words, the AF control method illustrated in FIG. 5 can be realized as a program which causes the system controller including a microcomputer (processor) to execute a function of each step.

First, when the user inputs an image capturing signal (for example, when the user presses a release button), the system controller 90 starts AF control. When the AF control starts, first at step S100, the system controller acquires the image capturing condition. The image capturing condition is for example focal lengths of imaging optical systems to be used for capturing an image, Fno data (aperture value data), diameters δ of permissible circles of confusion relating to pixel sizes of the image pickup elements, which are image capturing condition information obtained from the information acquirer 61.

Subsequently, at step S101, the system controller 90 selects an imaging optical system having the shallowest depth of field in the imaging optical systems to be used for capturing the image, based on the focal lengths, the Fno data, and the diameters of the permissible circles of confusion acquired at step S100.

Hereinafter, a method of selecting the imaging optical system in the compound-eye image pickup apparatus 1 will be described. Depths of field (rear-side depth of field d1 and front-side depth of field d2) indicating ranges in which an actual object is determined to be in focus are represented by the following expressions (1) and (2), respectively.

$$d1 = \frac{\delta \times Fno \times L^2}{f^2 - \delta \times Fno \times L} \quad (1)$$

$$d2 = \frac{\delta \times Fno \times L^2}{f^2 + \delta \times Fno \times L} \quad (2)$$

In expressions (1) and (2), symbol f denotes a focal length of the imaging optical system, symbol δ denotes a diameter of a permissible circle of confusion, symbol Fno denotes an F number of the imaging optical system, and symbol L denotes an object distance. As can be seen from expressions (1) and (2), the depth of field decreases, with respect to an identical object distance, with increasing the focal length of the imaging optical system, with decreasing Fno, or with decreasing the diameter of the permissible circle of confusion. In this embodiment, the imaging optical system determiner 51 selects a first imaging optical system which satisfies the following conditional expression (3) introduced from expressions (1) and (2).

$$\frac{f_i^2}{\delta_i Fno_i} \leq \frac{f_1^2}{\delta_1 Fno_1} \quad (3)$$

In conditional expression (3), symbols $f_i$, $Fno_i$, and $\delta_i$ denote a focal length, an F number, and a diameter of permissible circle of confusion with respect to an optical system (i-th optical system) in the eight imaging optical systems, respectively. Symbols $f_1$, $Fno_1$, and $\delta_1$ denote a focal length, an F number, and a diameter of permissible circle of confusion with respect to the selected first imaging optical system, respectively. When pixel sizes of the image pickup elements corresponding the respective imaging optical systems are identical, the diameters of the permissible circles of confusion are identical. Accordingly, conditional expression (3) can be replaced with the following conditional expression (3a).

$$\frac{f_i^2}{Fno_i} \leq \frac{f_1^2}{Fno_1} \quad (3a)$$

In this embodiment, it is assumed that the pixel sizes of the respective image pickup elements are identical and also the F numbers Fno of the respective imaging optical systems are identical. Accordingly, the imaging optical system determiner 51 selects the first imaging optical system satisfying conditional expression (3a). In this embodiment, the imaging optical system determiner 51 selects, as the first imaging optical system, the imaging optical system 140a having the longest focal length.

Subsequently, at step S102, the system controller 90 finely drives the focus unit 140aF via the image pickup controller 50. For more details, the system controller 90 determines, as a focus detection region, an image center region or a region specified by a user via the information input unit 60, and it sets the AF gate 30 so that only an image signal in the determined focus detection region is supplied to the AF signal processor 31. Then, the system controller 90 acquires an AF evaluation value that is generated by the AF signal processor 31 based on the image signal in the focus detection region. Furthermore, the system controller 90 moves the focus unit 140aF from side to side (from right to left and from left to right) by a fine amount, and again it acquires the AF evaluation values (i.e., an AF evaluation value obtained by moving to the left and an AF evaluation value obtained by moving to the right).

Subsequently, at step S103, the system controller 90 performs an in-focus determination based on the AF evaluation value obtained by the fine drive performed at step S102. When the system controller 90 determines that the imaging optical system is in an in-focus state, the flow proceeds to step S108. On the other hand, when the system controller 90 determines that the imaging optical system is not in the in-focus state (i.e., the imaging optical system is in an out-of-focus state), the flow proceeds to step S104. For more details, the system controller 90 compares the AF evaluation value at a current position (stop position) of the focus unit 140aF acquired at step S102 with the two AF evaluation values acquired after moving from side to side by the fine amount. When both of the two AF evaluation values acquired after moving from side to side by the fine amount are lower than the current AF evaluation value, the system controller 90 determines that the current position (stop position) of the focus unit 140aF is located at a peak position of the AF evaluation value. In other words, the system controller 90 determines that the imaging optical system is in the in-focus state and the flow proceeds to step S108. On the other hand, when any one of the two AF evaluation values acquired after moving from side to side by the fine amount is higher than the current AF evaluation value, the system controller 90 determines that the imaging optical system is in the out-of-focus state and the flow proceeds to step S104.

For the determination result of the out-of-focus state, at step S104, the system controller 90 determines whether a focusing direction (i.e., direction of the peak position of the AF evaluation value) can be determined. When the system controller 90 can determine the focusing direction, the flow proceeds to step S105. On the other hand, when the system controller 90 cannot determine the focusing direction, the flow returns to step S102. For more details, when the AF evaluation value acquired after moving to the left by a fine amount is lower than the current AF evaluation value and the AF evaluation value acquired after moving to the right by a fine amount is higher than the current AF evaluation value, the system controller 90 determines that a focal point exists at the right side (i.e., focusing direction is the rightward direction) and the flow proceeds to step S105. When the AF evaluation value acquired after moving to the left by the fine amount is higher than the current AF evaluation value and the AF evaluation value acquired after moving to the right by the fine amount is lower than the current AF evaluation value, the system controller 90 determines that the focal point exists at the left side (i.e., focusing direction is the leftward direction) and the flow proceeds to step S105. On the other hand, when any one of the AF evaluation values cannot be acquired appropriately, the system controller 90 determines that the focusing direction cannot be determined, and the flow returns to step S102.

At step S105, the system controller 90 performs climbing drive of the focus unit 140aF by a drive amount larger than that of the fine drive in a direction determined at step S104. The detail of the climbing drive is the same as the description with reference to FIG. 21, and therefore the description is omitted. Subsequently, at step S106, the system controller 90 determines whether the peak (peak position) of the AF evaluation value can be detected. When the peak of the AF evaluation value is detected, the flow proceeds to step S107. On the other hand, the peak of the AF evaluation value is not detected, the flow returns to step S105. For more details, referring to FIG. 21, when the focus lens is driven from a start position of the climbing drive in the rightward direction in the drawing, as indicated by an arrow A, it is detected that the AF evaluation value has passed the peak and is decreasing. In this case, the system controller 90 determines that the peak of the AF evaluation value can be detected, and the flow proceeds to step S107. On the other hand, when it is not detected that the AF evaluation value has passed the peak and is decreasing, the system controller 90 determines that the AF evaluation value does not reach the peak yet, and the flow returns to step S105 to continue the climbing drive.

At step S107, the system controller 90 moves the focus unit 140aF to the peak position detected at step S106. After the system controller 90 moves the focus unit 140aF to the peak position, the flow returns to step S102 to continue the process.

When it is determined at the imaging optical system is in the in-focus state at step S103, at step S108, the system controller 90 stops, through the image pickup controller 50, the drive of the focus unit 140aF at the position where it is determined that the imaging optical system is in the in-focus state at step S103. Then, at step S109, the system controller 90 detects and acquires position information of the stopped focus unit 140aF.

Subsequently, at step S110, the system controller 90 calculates movement positions of focus units included in the imaging optical systems other than the selected imaging optical system 140a. The imaging optical systems in this embodiment have the focal lengths different from each other, and configurations of the imaging optical systems are different from each other. Accordingly, positions of the focus units to focus an image on the surfaces of the image pickup elements for an arbitrary object distance are also different from each other. However, a position of the focus unit for a certain object distance is uniquely determined in each of the imaging optical systems. In other words, with respect to each of the imaging optical systems, the position of the focus unit to focus the image on the surface of the image pickup element for a certain object distance always maintains a relative relation. Therefore, if the position of the focus unit included in an imaging optical system for a certain object distance is determined, the positions the focus units included in the other imaging optical systems can be determined based on the relative relations. In this embodiment, for example, the relative position relations described above are stored as a lookup table in the memory 71. The positions of the focus units included in the other imaging optical systems corresponding to the stop position of the focus unit 140aF can be determined based on the lookup table and the stop position information of the focus unit 140aF determined at the preceding stage. As another method, the relative relation described above is stored as a function in the memory 71, and the positions of the focus units included in the other imaging optical systems corresponding to the stop position can be determined based on the function and the stop position information of the focus unit 140aF determined at the preceding stage.

Subsequently, at step S111, the system controller 90 moves the focus units F to the respective movement positions, calculated at step S110, of the focus units included in the imaging optical systems other than the imaging optical system 140a and then it stops the focus units F. Thus, the AF control of this embodiment is completed.

According to this embodiment, as an optical system to be used for AF control, an optical system capable of determining a position of a focus lens with high accuracy can be selected. As a result, a reduction of a processing load and improvement of a focusing accuracy during the AF control can be achieved.

Embodiment 2

Figure 6:
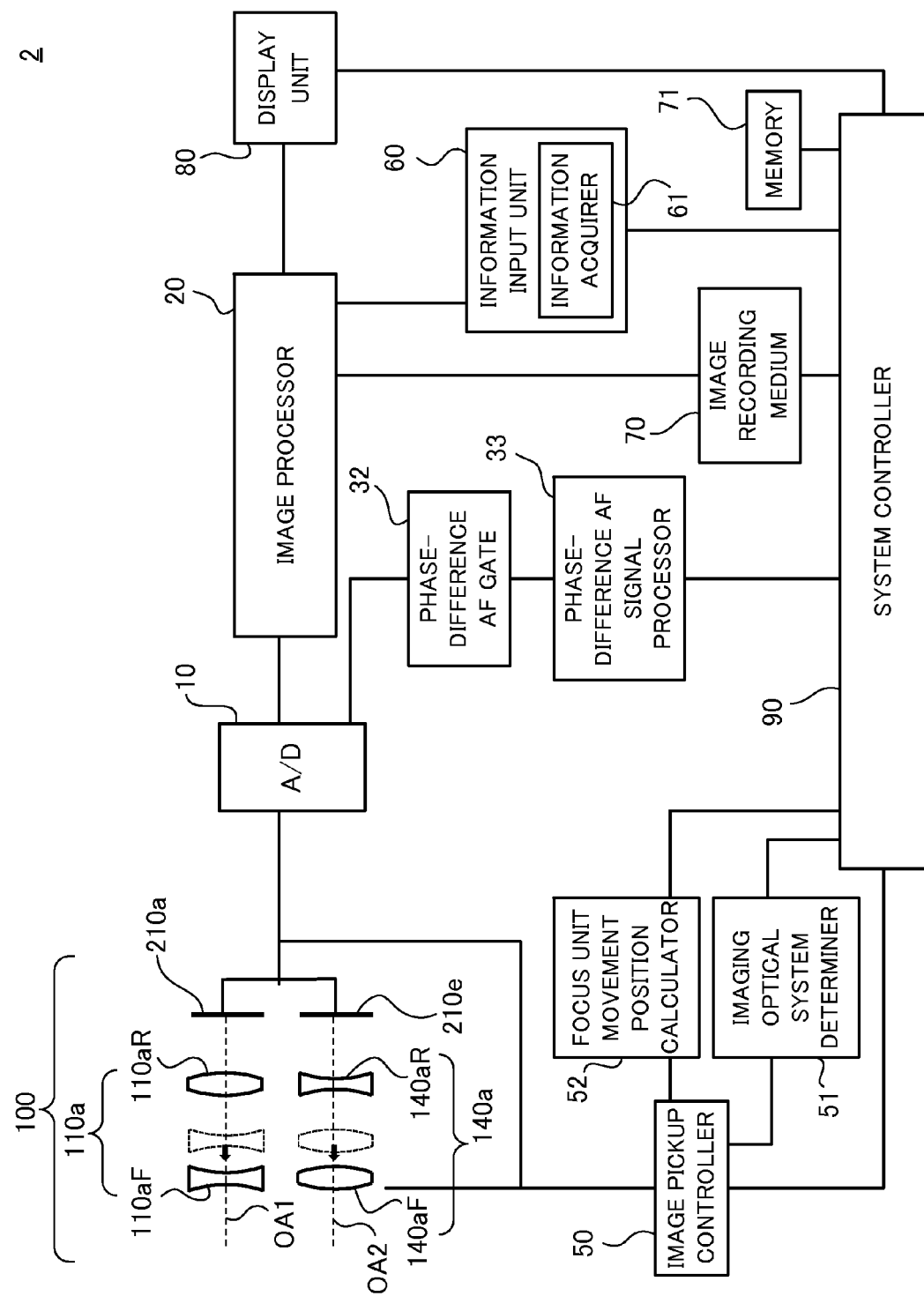
FIG. 6 is a block diagram of a compound-eye image pickup apparatus in Embodiment 2.

Next, referring to FIG. 6, a compound-eye image pickup apparatus in Embodiment 2 of the present invention will be described. FIG. 6 is a block diagram of a compound-eye image pickup apparatus 2 in this embodiment. The compound-eye image pickup apparatus 2 of this embodiment is different from the compound-eye image pickup apparatus 1 of Embodiment 1 in that the compound-eye image pickup apparatus 2 includes a phase-difference AF gate 32 and a phase-difference AF signal processor 33, instead of the AF gate 30 and the AF signal processor 31.

The phase-difference AF gate 32 supplies, to the phase-difference AF signal processor 33 (focus detector), only a signal in a focus detection region or an AF frame set by the system controller 90 among output signals of all pixels from the A/D converter 10. The phase-difference AF signal processor 33 performs processing of a phase-difference detection method on a pixel signal (focal signal or image signal) supplied from the phase-difference AF gate 32 to calculate a defocus amount. The defocus amount is output to the system controller 90.

The information input unit 60 detects information (data) relating to a desired image capturing condition which is selected and input by a user, and it supplies the data to the system controller 90. The information input unit 60 includes the information acquirer 61. The information acquirer 61 acquires current image capturing condition information (such as an aperture value (F number), a focal length, an exposure time, and an image pickup optical system to be used) from the image pickup controller 50 or the system controller 90. The imaging optical system determiner 51 determines (selects) an imaging optical system to acquire a pixel output signal to be supplied to the phase-difference AF gate 32 based on the image capturing condition information obtained from the information acquirer 61. The focus unit movement position calculator 52 calculates a position of a focus unit included in the imaging optical system selected by the imaging optical system determiner 51 based on the defocus amount. Furthermore, the focus unit movement position calculator 52 calculates movement positions of focus units included in the other imaging optical systems which are not selected, based on the position of the focus unit included in the selected imaging optical system and a lookup table or a function stored in the memory 71. The system controller 90 controls the image pickup controller 50 based on the supplied data. The image pickup controller 50 moves the focus unit F and controls each image pickup element according to the aperture value of each imaging optical system and the exposure time to acquire a necessary image. The other configurations of the compound-eye image pickup apparatus 2 are the same as those of the compound-eye image pickup apparatus 1 described with reference to FIG. 1, and therefore descriptions thereof are omitted.

Hereinafter, a principle of a phase-difference AF will be described briefly. Typically, as described in the background of the invention, light beams, emitted from an object, passing through exit pupil regions different from each other in an image pickup optical system are imaged on a pair of line sensors, and a shift amount of relative positions of a pair of image signals obtained by photoelectrically converting an object image is obtained. In the compound-eye image pickup apparatus of this embodiment, only an image signal from the focus detection region is extracted from image signals obtained by two imaging optical systems having the same focal length, and thus the similar effect can be obtained. Hereinafter, as one example, a principle of the phase-difference AF in which one-line image signals is used similarly to a typical line sensor will be described. Outputs of image signals (two images) from the focus detection region among image signals obtained by the two imaging optical systems are as illustrated in FIG. 23.

Figure 23:
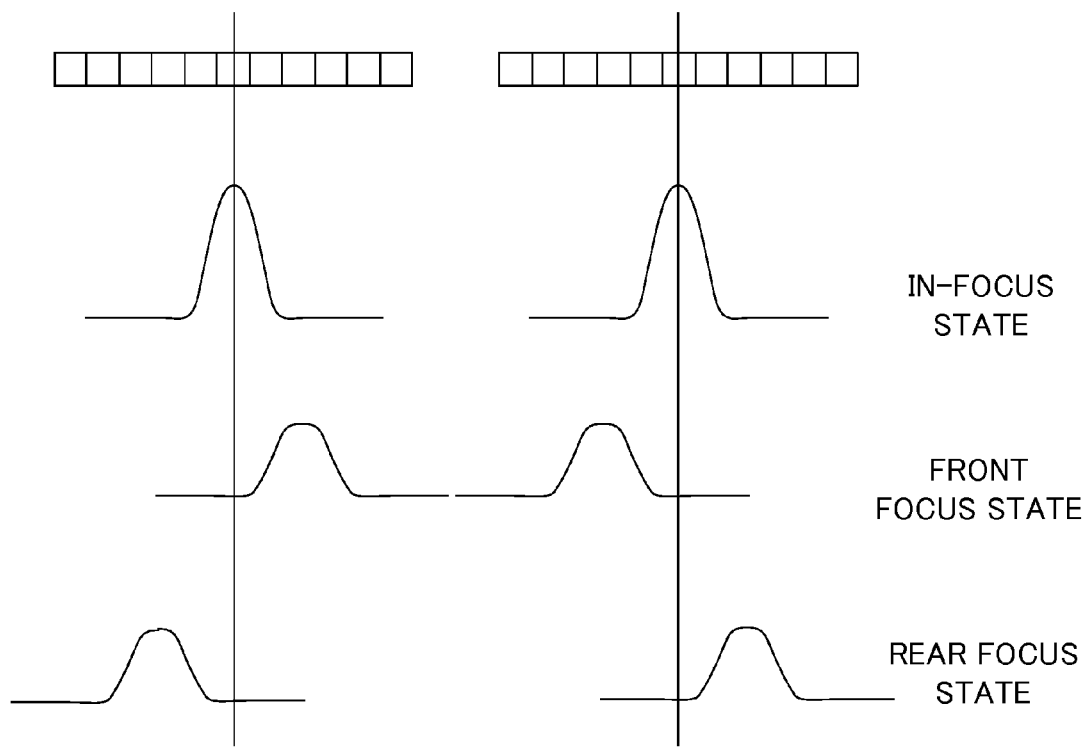
FIG. 23 is an explanatory diagram of a principle of AF control by a phase-difference detection method in each of Embodiments 2 to 4.

FIG. 23 is an explanatory diagram of a principle of the AF control by the phase-difference detection method, and with respect to outputs of image signals (two images) from the focus detection region, intervals (gaps) between the two images (image interval) are different depending on an in-focus state, a front-focus state, and a rear-focus state. The focusing is performed by moving a lens so that the image interval becomes an interval obtained in the in-focus state. A moving amount of the lens, i.e., a defocus amount as a moving amount of an image plane, is calculated based on the interval of the two images. The calculation is performed by the following algorithm.

First, outputs from the two image pickup elements are input as data. Then, a correlation calculation is performed by using the two outputs. As a correlation calculation method, there is a method which is called MIN algorithm. A correlation amount U0 is represented by the following expression (4), where A[1]-A[n] are one of the output data and B[1]-B[n] are the other of the output data.

$$U0 = \sum_{j}^{m} \min(A[j], B[j]) \quad (4)$$

In expression (4), symbol min (a,b) denotes a function indicating a smaller value of values a and b.

Figure 24:
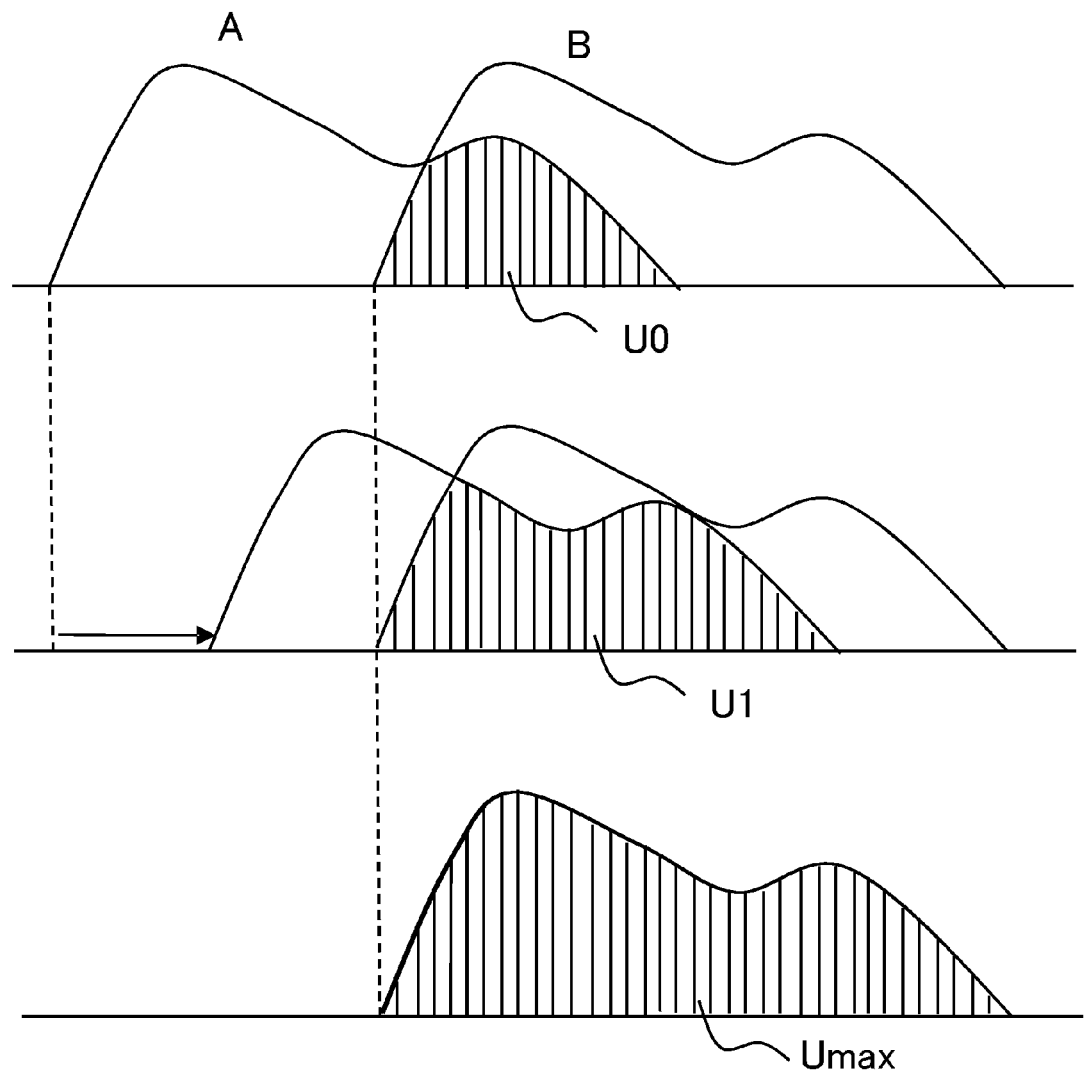
FIG. 24 is an explanatory diagram of a correlation calculation of the AF control by the phase-difference detection method in each of Embodiments 2 to 4.

Subsequently, as illustrated in FIG. 24, a correlation amount U1 between data in which an image A is shifted by 1 bit in an arrow direction in the drawing and data of an image B is calculated. The correlation amount U1 is calculated by the following expression (5).

$$U1 = \sum_{j}^{m} \min(A[j+1], B[j]) \quad (5)$$

Similarly, correlation amounts obtained by shifting by 1 bit are calculated in sequence. When the two images coincide with each other, the correlation amount is maximized. Accordingly, a shift amount corresponding to the maximum value is obtained, and based on its previous and next data, a true maximum value Umax of the correlation amount is obtained by interpolation, and thus the shift amount is determined as a displacement amount. The relation between the displacement amount (shift amount) and the defocus amount as an image-plane moving amount is determined according to an optical system. Therefore, the defocus amount is calculated based on the displacement amount.

Then, an extension amount of a lens is obtained based on the defocus amount, and accordingly the lens can be moved to be focused.

Figure 7:
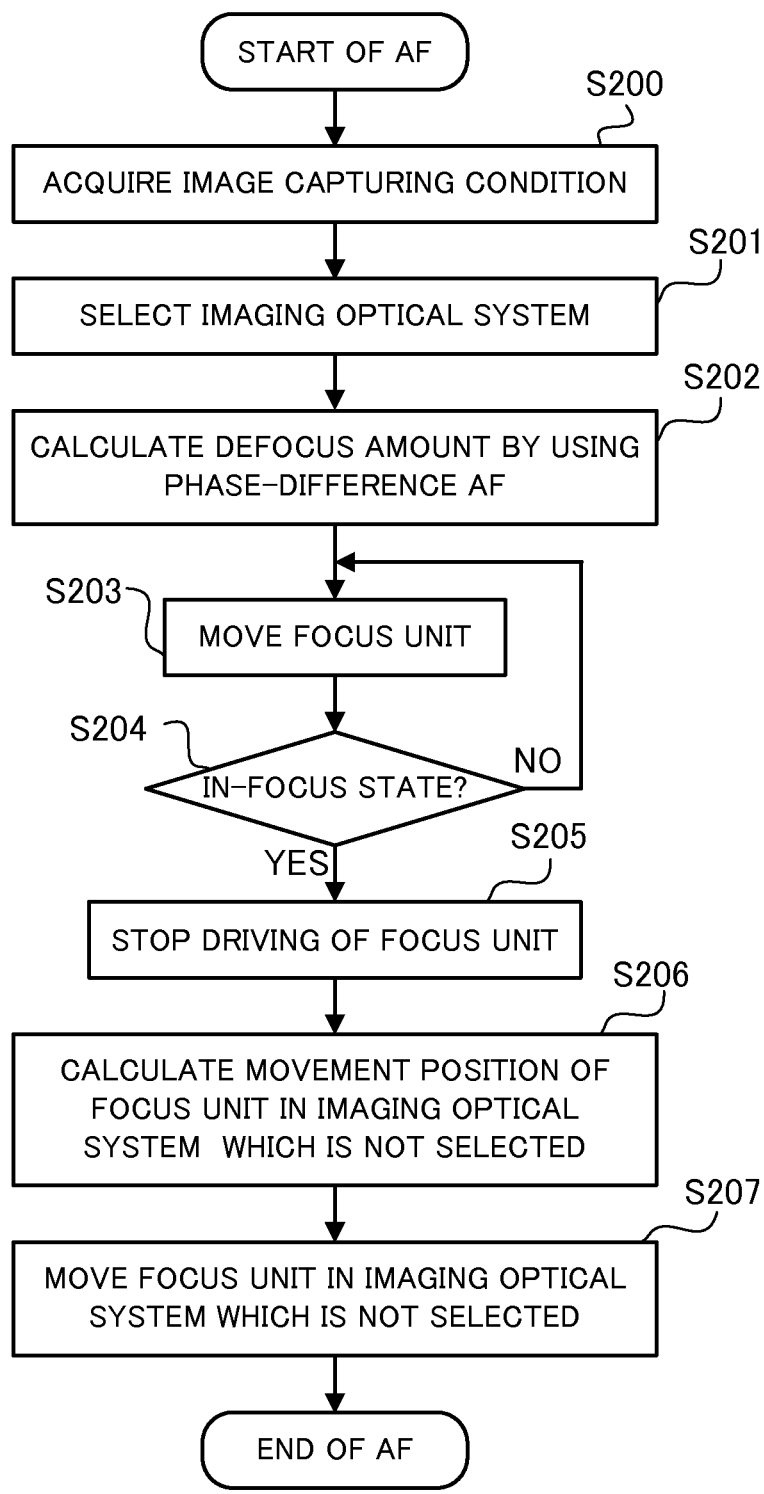
FIG. 7 is a flowchart of illustrating an image capturing operation of the compound-eye image pickup apparatus in Embodiment 2.

Next, referring to FIG. 7, an AF control method performed by the compound-eye image pickup apparatus 2 will be described. FIG. 7 is a flowchart of illustrating an image capturing operation (AF control method) of the compound-eye image pickup apparatus 2. Each step in FIG. 7 is performed by an instruction of the system controller 90 in the compound-eye image pickup apparatus 2. In other words, the AF control method illustrated in FIG. 7 can be realized as a program which causes the system controller including a microcomputer (processor) to execute a function of each step.

Steps S200 and S201 in FIG. 7 are similar to steps S100 and S101 in Embodiment 1 (FIG. 5), respectively. Subsequently, at step S202, the system controller 90 calculates, via the phase-difference AF signal processor 33, a defocus amount by the phase-difference AF. For more details, the system controller 90 determines, as a focus detection region, an image center region or a region specified by a user via the information input unit 60. Then, the system controller 90 sets the phase-difference AF gate 32 so that only an image signal in the determined focus detection region is supplied to the phase-difference AF signal processor 33.

The phase-difference AF signal processor 33 calculates the defocus amount by the correlation calculation described above. When a plurality of lines are used as data, for example, the correlation calculation is performed for each line and an average of the obtained correlation value groups can be obtained. Alternatively, the data of the plurality of lines may be averaged in upward and downward directions before performing the correlation amount, and the averaged data may be used as data for a single line to perform the correlation calculation. The system controller 90 acquires the defocus amount which is calculated by the phase-difference AF signal processor 33 based on the image signal in the focus detection region.

Subsequently, at step S203, the system controller 90 outputs the defocus amount calculated at step S202 to the focus unit movement position calculator 52. The focus unit movement position calculator 52 calculates a movement position of the focus unit 140aF based on the defocus amount. Then, the system controller 90 moves, via the image pickup controller 50, the focus unit 140aF to the calculated movement position.

Subsequently, at step S204, the system controller 90 performs the phase-difference AF control again at the movement position of the focus unit 140aF calculated at step S203, and it performs the in-focus determination. When the system controller 90 determines that the focus unit 140aF is in the in-focus state as a result of the in-focus determination, the flow proceeds to step S205. On the other hand, when the system controller determines that the focus unit 140aF is in the out-of-focus state, the flow returns to step S203. For more details, when the defocus amount calculated again is within a predetermined threshold value, the system controller 90 determines that the focus unit 140aF is in the in-focus state, and the flow proceeds to step S205. On the other hand, when the defocus amount is larger than the predetermined threshold value, the system controller 90 determines that the focus unit 140aF is in the out-of-focus state, and the flow returns to step S203. At step S205, the system controller 90 stops, via the image pickup controller 50, driving of the focus unit 140aF at the position where it is determined that the focus unit 140aF is in the in-focus state at step S204.

Subsequent steps S206 and S207 are similar to steps S110 and S111 in Embodiment 1 (FIG. 5), respectively. Thus, the AF control of this embodiment is completed.

According to this embodiment, as an optical system to be used for AF control, an optical system capable of determining a position of a focus lens with high accuracy can be selected. As a result, reduction of a processing load and improvement of focusing accuracy can be achieved in the AF control.

Embodiment 3

Figure 8:
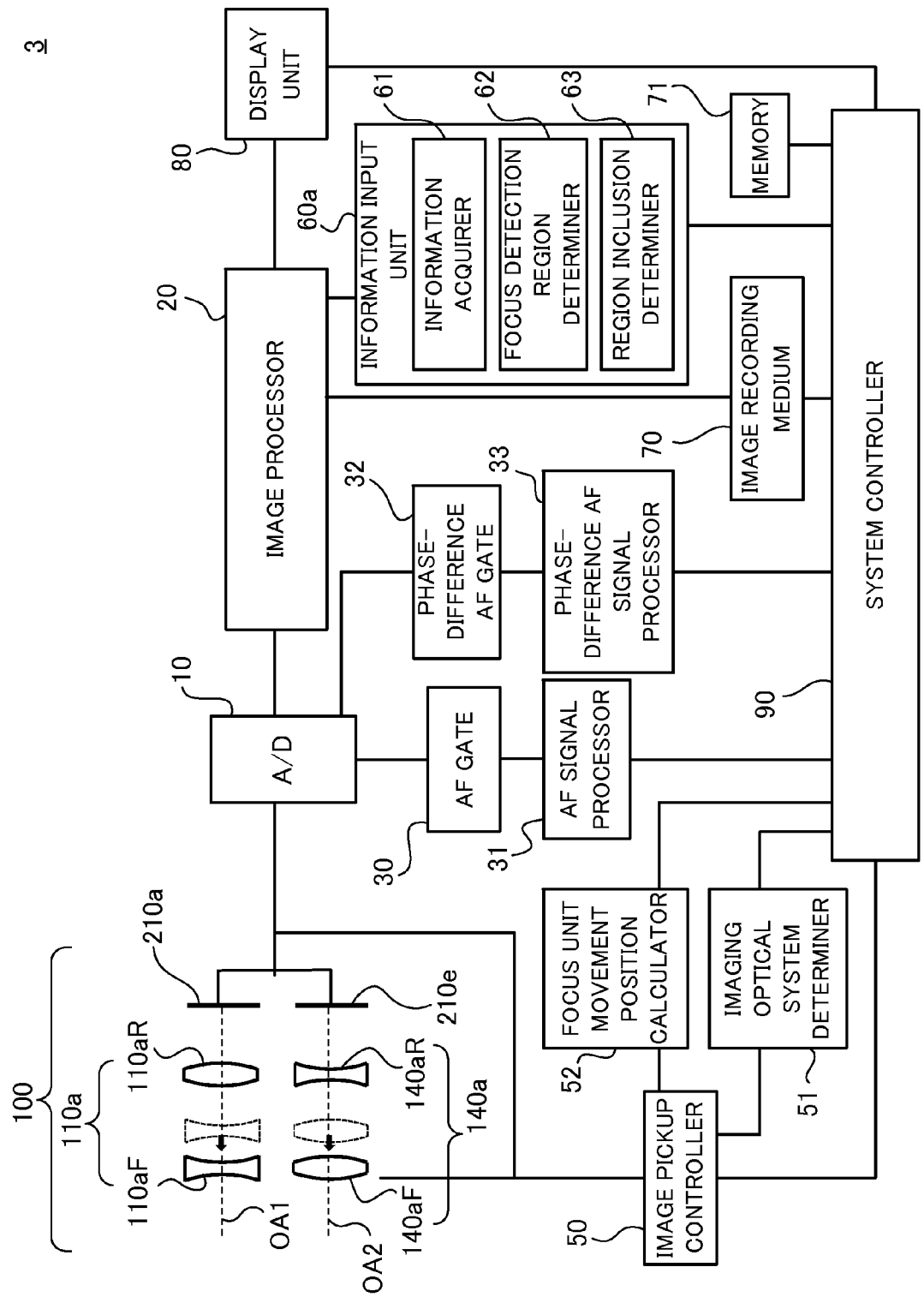
FIG. 8 is a block diagram of a compound-eye image pickup apparatus in Embodiment 3.

Next, referring to FIG. 8, a compound-eye image pickup apparatus in Embodiment 3 of the present invention will be described. FIG. 8 is a block diagram of a compound-eye image pickup apparatus 3 in this embodiment. The compound-eye image pickup apparatus 3 of this embodiment is different from the compound-eye image pickup apparatus 1 of Embodiment 1, the compound-eye image pickup apparatus 2 of Embodiment 2, or the combination of them in that the compound-eye image pickup apparatus 3 includes an information input unit 60a containing a focus detection region determiner 62 and a region inclusion determiner 63, instead of the information input unit 60.

The focus detection region determiner 62 (region determiner) determines, as a focus detection region, a region specified by a user via the information input unit 60a. The region inclusion determiner 63 (inclusion determiner) determines whether the focus detection region is included in each image signal obtained via an image pickup optical system (imaging optical system) used for capturing an image.

Figure 9:
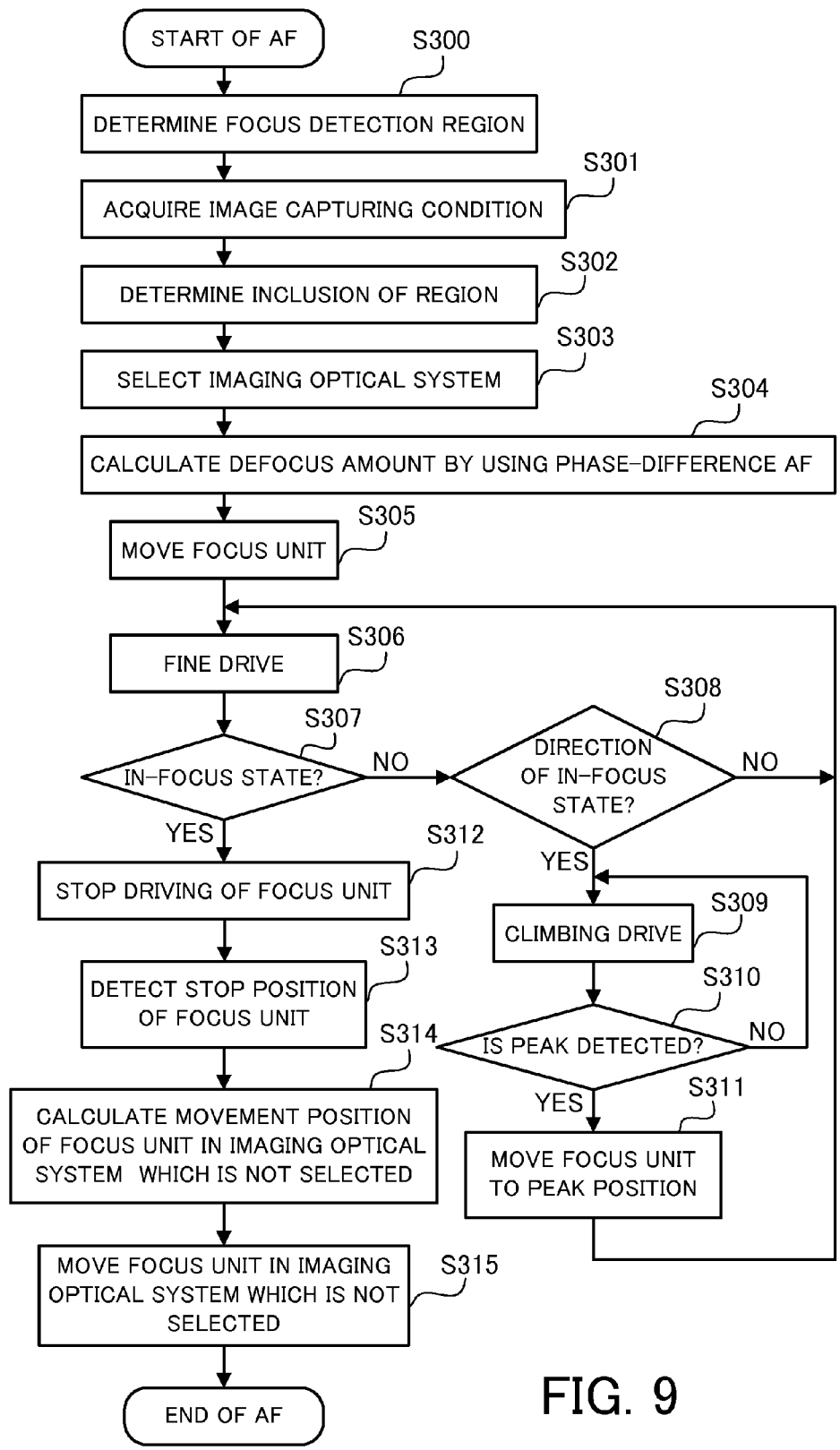
FIG. 9 is a flowchart of illustrating an image capturing operation of the compound-eye image pickup apparatus in Embodiment 3.

Next, referring to FIG. 9, an AF control method performed by the compound-eye image pickup apparatus 3 will be described. FIG. 9 is a flowchart of illustrating an image capturing operation (AF control method) of the compound-eye image pickup apparatus 3. Each step in FIG. 9 is performed by an instruction of the system controller 90 in the compound-eye image pickup apparatus 3. In other words, the AF control method illustrated in FIG. 9 can be realized as a program which causes the system controller including a microcomputer (processor) to execute a function of each step.

When the user inputs an image capturing signal (for example, when the user presses a release button), the system controller 90 starts AF control. When the AF control starts, at step S300, the system controller 90 determines, as a focus detection region, the region specified by the user via the information input unit 60a. In this embodiment, the region specified by the user is determined as the focus detection region, but is not limited thereto. Simply, an image center region may be determined as the focus detection region, or a plurality of regions set by default can be determined as the focus detection region.

Subsequently, at step S301, the system controller 90 acquires an image capturing condition (image capturing condition information) from the information acquirer 61. The image capturing condition information is for example imaging optical systems to be used for capturing an image, focal lengths of the imaging optical systems, Fno data, and diameters δ of permissible circles of confusion relating to pixel sizes of the image pickup elements. Subsequently, at step S302, the region inclusion determiner 63 determines whether the image signal obtained via the imaging optical system to be used for capturing the image, acquired at step S301, includes an image signal in the focus detection region determined at step S300.

Subsequently, at step S303, the system controller 90 (imaging optical system determiner 51) determines (selects) a first imaging optical system from among the imaging optical systems for which it is determined that the focus detection region is included at step S302. In this embodiment, the first imaging optical system is an imaging optical system having the shallowest depth of field, which is selected based on the focal length, the Fno data, and the diameter of the permissible circle of confusion as image capturing condition information. A method of selecting the imaging optical system having the shallowest depth of field is the same as that of Embodiment 1. Subsequent steps S304 and S305 are similar to steps S202 and S203 in Embodiment 2 (FIG. 7).

Subsequently, at step S306, the system controller 90 performs, via the image pickup controller 50, fine drive of the focus unit 140aF at a position of the focus unit to which the focus unit 140aF is moved by the phase-difference AF performed at steps S304 and S305. Subsequent steps S307 to S315 are similar to steps S103 to S111 in Embodiment 1 (FIG. 5).

As described above, the compound-eye image pickup apparatus of this embodiment performs a rough adjustment by moving a focus unit up to the vicinity of a focal point by using focus detection (AF) by a phase-difference detection method, and subsequently it performs a fine adjustment by using an AF by a contrast detection method. Thus, focus detection can be possible with high accuracy and in a short time. Furthermore, according to this embodiment, as an optical system to be used for AF control, an optical system capable of determining a position of a focus lens with high accuracy can be selected. As a result, reduction of a processing load and improvement of focusing accuracy can be achieved in the AF control.

Embodiment 4

Figure 10:
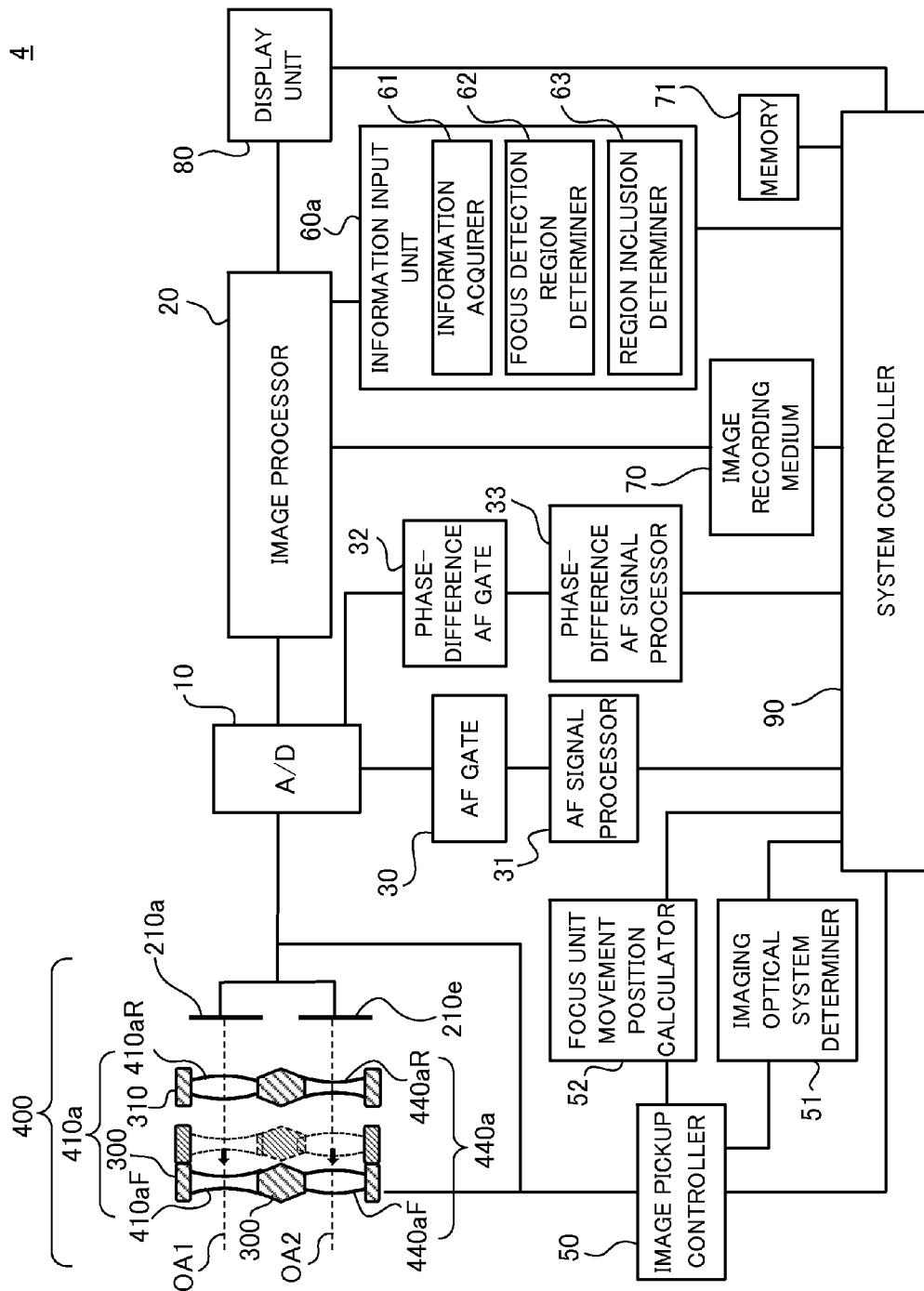
FIG. 10 is a block diagram of a compound-eye image pickup apparatus in Embodiment 4.

Next, referring to FIG. 10, a compound-eye image pickup apparatus in Embodiment 4 of the present invention will be described. FIG. 10 is a block diagram of a compound-eye image pickup apparatus 4 in this embodiment. The compound-eye image pickup apparatus 4 of this embodiment is different from the compound-eye image pickup apparatus 3 of Embodiment 3 in that the compound-eye image pickup apparatus 4 includes an image pickup unit 400 instead of the image pickup unit 100. The compound-eye image pickup apparatus 4 may be a lens-integrated image pickup apparatus, or alternatively it can be configured by a lens apparatus including an imaging optical system (image pickup optical system) and an image pickup apparatus body including an image pickup element to which the lens apparatus is removably attached Similarly to Embodiment 1 described referring to FIGS. 2 and 3, the image pickup unit 400 includes eight imaging optical systems (image pickup optical systems) 410a, 420a, 430a, 440a, 410b, 420b, 430b, and 440b, each of which forms an optical image of an object. The image pickup unit 400 includes a plurality of image pickup elements that correspond to the respective imaging optical systems 410a to 440b. FIG. 10 illustrates a cross section of the image pickup unit 400 including optical axes OA1 and OA2 of the imaging optical systems 410a and 440a, respectively.

Each imaging optical system includes a focus unit F (focus lens unit or front unit) and a rear unit R (fixed lens unit). As illustrated in FIG. 10, the focus units F are held and driven integrally with a holder 300 (holding member) so as to move by the same amount while an object position changes (i.e., while focusing is performed). The rear units R are fixed by a holder 310 (holding member) during the focusing, and other members such as a stop (not illustrated) are included in each imaging optical system. Thus, the compound-eye image pickup apparatus 4 of this embodiment uses a partial focusing method in which parts of the optical systems are moved integrally during the focusing. The number of focus lenses mounted on the focus unit F included in each imaging optical system is one or more.

The plurality of image pickup elements 210a to 210f are held integrally and they constitute an image pickup element unit 200. The image pickup elements 210a and 210b correspond to the imaging optical systems 410a and 420a, respectively, and the image pickup elements 210c and 210d correspond to the imaging optical systems 410b and 420b, respectively. The image pickup elements 210e and 210f correspond to the imaging optical systems 440a and 430a, respectively, and the image pickup elements 210g and 210h correspond to the imaging optical systems 440b and 430b, respectively.

Optical axes of the eight imaging optical systems 410a, 420a, 430a, 440a, 410b, 420b, 430b, and 440b are approximately parallel to each other. The two imaging optical systems (for example, imaging optical systems 410a and 410b) to which an identical reference numeral is added has an identical focal length. In this embodiment, four pairs of imaging optical systems 410, 420, 430, and 440 having focal length different from each other are provided. The imaging optical systems 410a and 410b are a pair of wide-angle imaging optical systems having the shortest focal length among the eight imaging optical systems. The imaging optical systems 420a and 420b have a focal length longer than that of the imaging optical systems 410a and 410b. The imaging optical systems 430a and 430b have a focal length longer than that of the imaging optical systems 420a and 420b. The imaging optical systems 440a and 440b have a focal length longer than that of the imaging optical systems 430a and 430b.

In FIG. 10, the imaging optical systems 410a and 440a constitute a compound eye. The image pickup elements 210a and 210e convert, to electric signals (analog signals), optical images formed on surfaces (image pickup surfaces) of the image pickup elements 210a and 210e via the imaging optical systems 410a and 440a, respectively.

Figure 11:
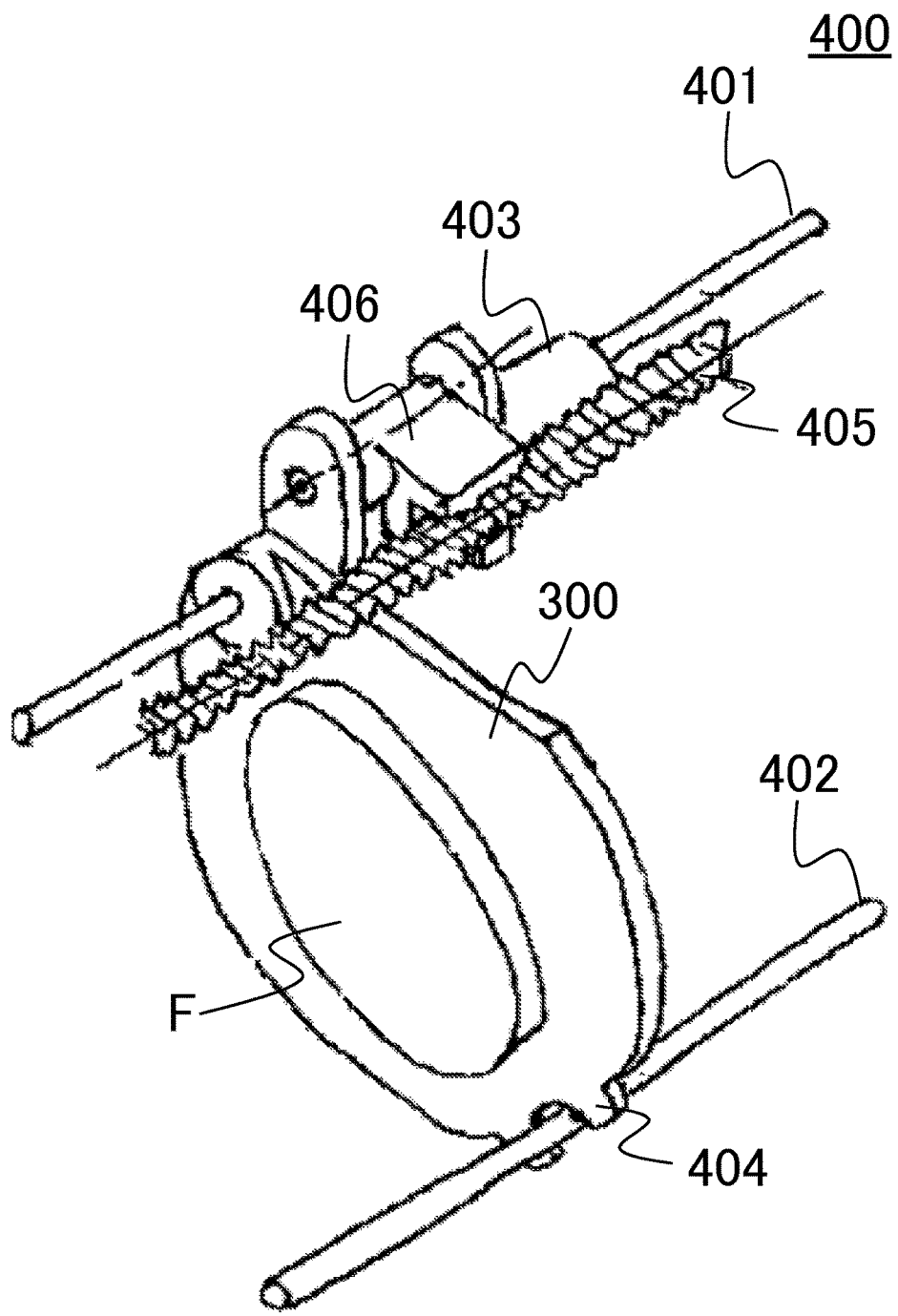
FIG. 11 is an explanatory diagram of a focus drive mechanism of the compound-eye image pickup apparatus in Embodiment 4.

Next, referring to FIG. 11, a focus drive mechanism of the image pickup unit 400 will be described. FIG. 11 is an enlarged perspective view of a part of the focus drive mechanism in the image pickup unit 400. The holder 300 of the focus unit F includes a sleeve 403 which is fitted to and held by a first guide bar 401 disposed parallel to the optical axis of each imaging optical system, and a U-shaped groove 404 which is rotationally limited by a second guide bar 402. The image pickup unit 400 includes an output axis 405 which rotates by an actuator such as a stepping motor (not illustrated) and a rack member 406 which engages with the output axis 405. Although a shape of the focus unit F illustrated in FIG. 11 is different from that illustrated in FIG. 10, these shapes are one example and actually the shapes may be identical. As a result, the holder 300 which holds the focus units F including parts of the plurality of imaging optical systems moves integrally in an optical axis direction (directions of the optical axes OA1 and OA2 indicated by dotted lines in FIG. 10) according to rotation of the output axis 405.

When in-focus images with different angles of field are intended to be acquired by using a compound-eye image pickup apparatus that has a plurality of imaging optical systems having focal lengths different from each other and the imaging optical systems are designed independently, it is necessary to provide a drive mechanism for each imaging optical system since moving amounts of the focus units are different during the focusing. For example, a drive motor is needed for each imaging optical system, or components such as feed screws and gears having different pitches are needed even if the drive motor can be shared. As a result, the size of the image pickup apparatus is enlarged, or the focus drive mechanism is complicated. In order to make the focus drive mechanism in a simple configuration, with respect to the plurality of imaging optical systems having focal lengths different from each other, the moving amounts of the focus units during the focusing need to be set to be identical. As a unit for achieving it, as described in this embodiment, it is necessary to hold the focus units (focus lens units) by using a common moving frame and the like, or hold integrally-molded focus units.

Figure 25:
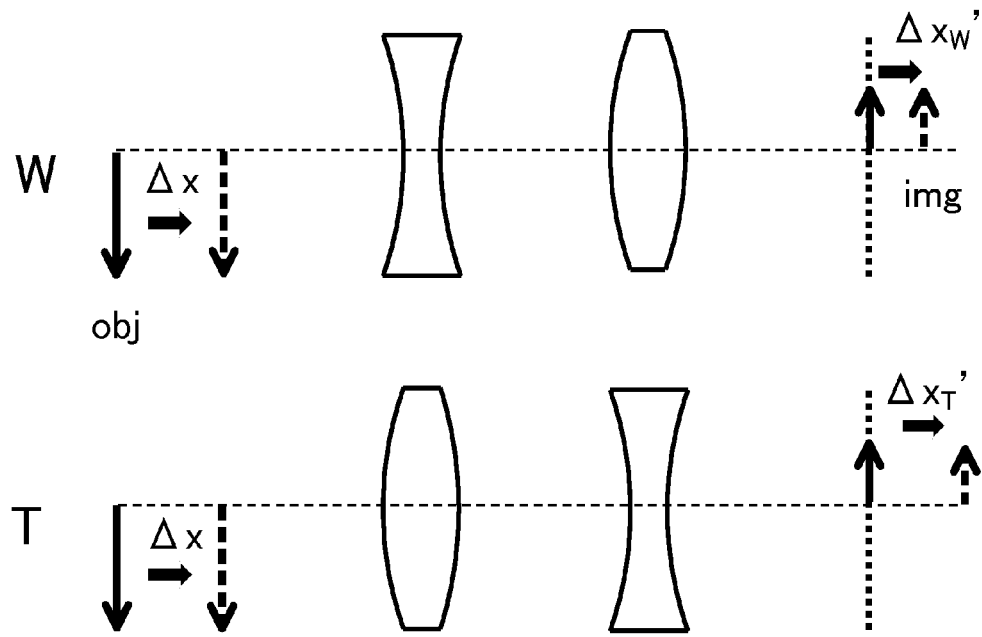
FIG. 25 is an explanatory diagram of a movement of an image plane due to variation of an object distance in Embodiment 4.
Figure 26:
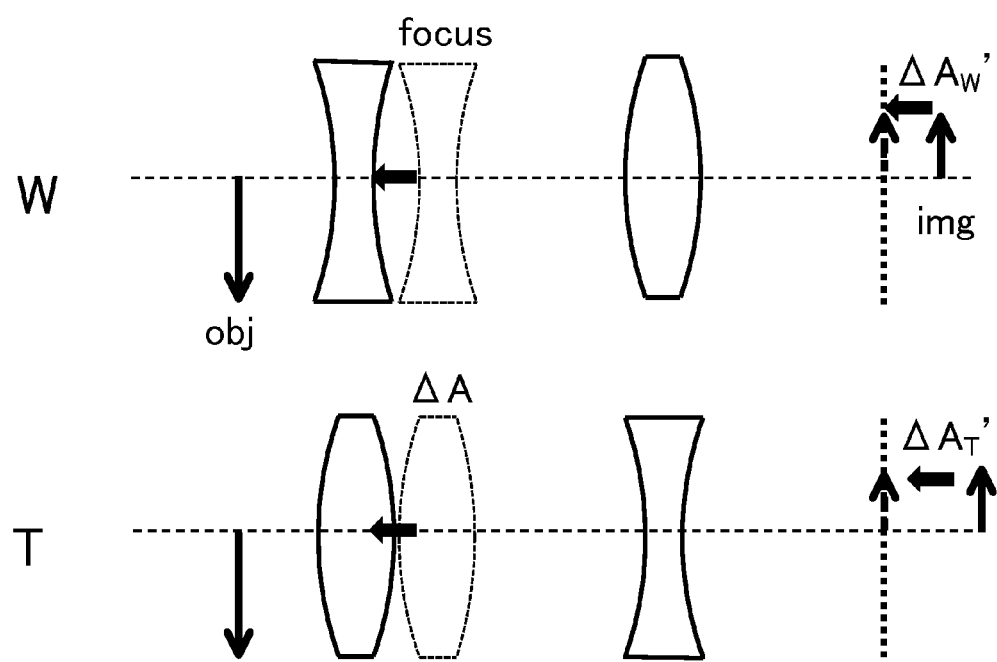
FIG. 26 is an explanatory diagram of a correction of the image plane by a movement of a focus unit in Embodiment 4.

Referring to FIGS. 25 and 26, a paraxial arrangement of the optical systems for this purpose will be described. FIG. 25 is an explanatory diagram of a movement of an image plane caused by variation of an object distance. FIG. 26 is an explanatory diagram of correction of the image plane by moving the focus unit. According to Newton's equation, the following expression (6) is satisfied where x is a distance from an object-side focal point of the imaging optical system having a focal length f to an object (obj), and x' is a distance from an image-side focal point to an image plane (img).

$$xx' = -f^2 \qquad (6)$$

According to expression (6), an image-plane moving amount $\Delta x'$, which is an amount obtained via the imaging optical system when the object is moved by $\Delta x$, is represented by the following expression (7).

$$\Delta x' = \frac{-f^2 \cdot \Delta x}{x(x + \Delta x)} \qquad (7)$$

According to expression (7), an image-plane moving amount when a variation of an object distance occurs is proportional to the square of the focal length f of the imaging optical system. In other words, a ratio of image-plane moving amounts $\Delta x_W'$ and $\Delta x_T'$ when the variation of the object distance is $\Delta x$ is represented by the following expression (8) where $f_W$ and $f_T$ are respectively focal lengths of a wide-angle optical system (optical system W) and a telephoto optical system (optical system T) illustrated in FIG. 25. Thus, the ratio of the image-plane moving amounts $\Delta x_W'$ and $\Delta x_T'$ corresponds to a ratio of the squares of the respective focal lengths.

$$\frac{\Delta x_T'}{\Delta x_W'} = \frac{f_T^2}{f_W^2} \qquad (8)$$

According to expression (8), as illustrated in FIG. 25, when an identical object is imaged by using optical systems having focal lengths different from each other, the image-plane moving amounts $\Delta x_T'$ of the telephoto optical system moves the ratio of the squares of the focal lengths times as large as the image-plane moving amounts $\Delta x_W'$ of the wide-angle optical system ($\Delta x_T' = \Delta x_W' \cdot f_T^2 / f_W^2$).

A focusing method in which an in-focus image is formed on a sensor surface by moving an entire optical system depending on an object distance is known as an entire extension. When the focusing is performed by extending each of the entire optical systems, an extension amount of the optical system and a variation amount of the image plane have a one-to-one relationship. Therefore, the extension amount of each of the entire optical systems for forming an image on the sensor surface is identical to each of $\Delta x_W'$ and $\Delta x_T'$. In other words, the telephoto optical system needs to extend a ratio of squares of focal lengths times as large as the wide-angle optical system, and accordingly it is difficult to drive them integrally and a drive mechanism is needed for each optical system, which results in a complicated focus drive mechanism.

In this embodiment, as illustrated in FIG. 26, a partial focusing method in which a part of the optical systems is moved during the focusing is adopted. As partial focusing methods of lenses, a front lens focus type in which a first lens unit disposed at the object side is moved, and an inner focus type and a rear focus type in which a lens unit subsequent to a second lens unit is moved are known. A position sensitivity ES with respect to a variation of the image plane caused by the movement of the focus unit F in the optical axis direction is represented by the following expression (9) where $\beta_F$ is a lateral magnification of the focus unit and $\beta_R$ is a lateral magnification of the image-side unit R disposed at the image side relative to the focus unit.

$$ES = (1-\beta_F^2) \cdot \beta_R^2 \tag{9}$$

When a lens unit does not exist at the image side relative to the focus unit as is the case for the rear focus type, the lateral magnification $\beta_R$ is 1 and the position sensitivity ES is $ES = 1-\beta_F^2$. A moving amount $\Delta A'$ of the image plane caused by the movement of the focus unit is represented by the following expression (10) where $\Delta A$ is a moving amount of the focus unit during the focusing.

$$\Delta A' = \Delta A \cdot ES \tag{10}$$

In other words, in order to perform the partial focusing method, the moving amount $\Delta x'$ of the image plane caused by the variation of the object distance represented by expression (7) and the moving amount $\Delta A'$ of the image plane caused by the moving amount $\Delta A$ of the focus unit represented by expression (10) only have to be equal to each other. As a result, in order to correct the variation of the image plane by the moving amount $\Delta x'$ in the optical system including the focus unit having a certain position sensitivity ES, the focus unit only has to be moved by $\Delta A$ represented by the following expression (11).

$$\Delta A = \frac{\Delta x'}{ES} \tag{11}$$

In this embodiment, focal lengths of the wide-angle optical system (optical system W) and the telephoto optical system (optical system T) illustrated in FIG. 26 are denoted by $f_W$ and $f_T$, respectively, a lateral magnification of the focus unit in the optical system W is denoted by $\beta_{FW}$, a lateral magnification of the image-side unit in the optical system W is denoted by $\beta_{RW}$, a lateral magnification of the focus unit in the optical system T is denoted by $\beta_{FT}$, and a lateral magnification of the focus unit in the optical system T is denoted by $\beta_{RT}$. In this case, position sensitivities $ES_W$ and $ES_T$ of the focus unit in the optical systems W and T are represented by the following expressions (12) and (13), respectively.

$$ES_W = (1-\beta_{FW}^2) \cdot \beta_{RW}^2 \tag{12}$$

$$ES_T = (1-\beta_{FT}^2) \cdot \beta_{RT}^2 \tag{13}$$

Figure 19A:
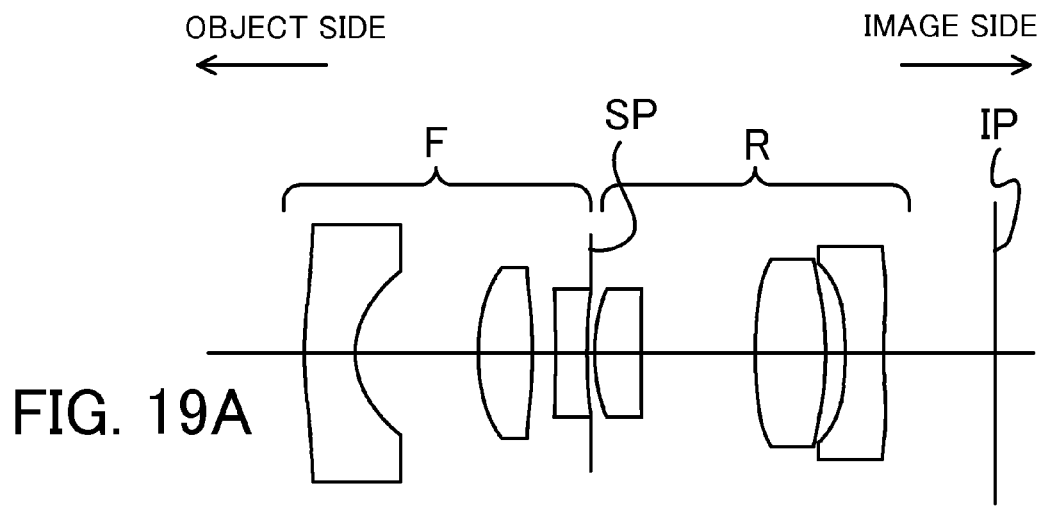
FIGS. 19A and 19B are cross-sectional views of lenses of a wide facet and a tele facet of a compound-eye optical system in Embodiment 4.
Figure 19B:
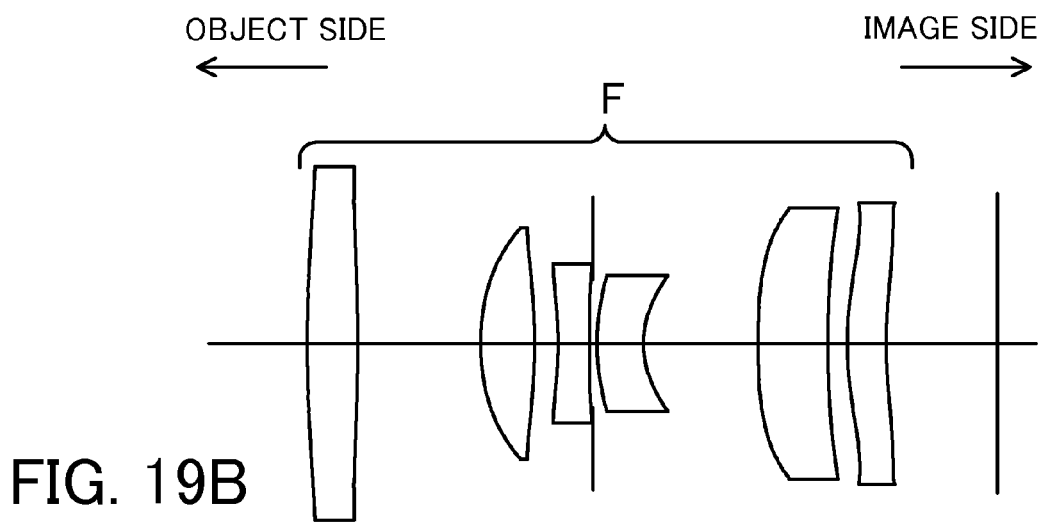

A conditional expression to be used for performing the image-plane correction of the moving amounts $\Delta x_W'$ and $\Delta x_T'$ of the image planes caused by the moving amounts $\Delta x$ of an object illustrated in FIGS. 19A and 19B by using the moving amount $\Delta A$ (identical moving amount) of the focus units is represented by the following expression (14) according to expressions (11) to (13).

$$\Delta A = \frac{\Delta x_W'}{ES_W} = \frac{\Delta x_T'}{ES_T} \tag{14}$$

According to expression (8), expression (14) is represented by the following expression (15).

$$\frac{ES_W \cdot f_T^2}{ES_T \cdot f_W^2} = 1 \tag{15}$$

Expression (15) is a paraxial conditional expression that is to be satisfied to make the moving amounts of the focus units identical in optical systems having focal lengths different from each other. In the optical system of this embodiment, the lateral magnification of the focus unit F and the image-side unit (rear unit R) is set so as to satisfy expression (15). Expression (15) indicates that the moving amounts for the focusing can be identical when a ratio of the squares of the focal lengths and a ratio of the position sensitivities of the focus units are approximately the same in the optical systems having the focal lengths different from each other.

The position sensitivity of the focus unit does not have to satisfy expression (15) completely if a defocus amount is within a diameter $\delta$ of a permissible circle of confusion. For example, when a difference between the moving amount $\Delta x'$ of the image plane and the moving amount $\Delta A'$ of the image plane caused by the focus unit is defined as a defocus amount and the diameter $\delta$ of the permissible circle of confusion is approximately from $\frac{1}{500}$ to $\frac{1}{1000}$ of an image pickup surface (image circle), the defocus amount only has to satisfy the following expression (16).

$$|\Delta x' - \Delta A'| < (F\ \text{number}) \times \delta \tag{16}$$

Accordingly, in an actual optical system, the defocus amount is within a depth of focus of the optical system if the following expression (17) is satisfied, and the in-focus images can be acquired at the same time by an identical moving amount of the focus units.

$$0.8 < \frac{ES_W \cdot f_T^2}{ES_T \cdot f_W^2} < 1.2 \tag{17}$$

In other words, in order to acquire the in-focus images having different angles of field at the same time with a simple focus drive mechanism, it is necessary to integrally hold the focus units of the respective optical systems having different focal lengths and also to satisfy expression (17) to make the moving amounts for the focusing identical. Accordingly, each focus unit in this embodiment satisfies expression (17) to make the moving amount for the focusing identical in the plurality of imaging optical systems having different focal lengths.

Figure 12:
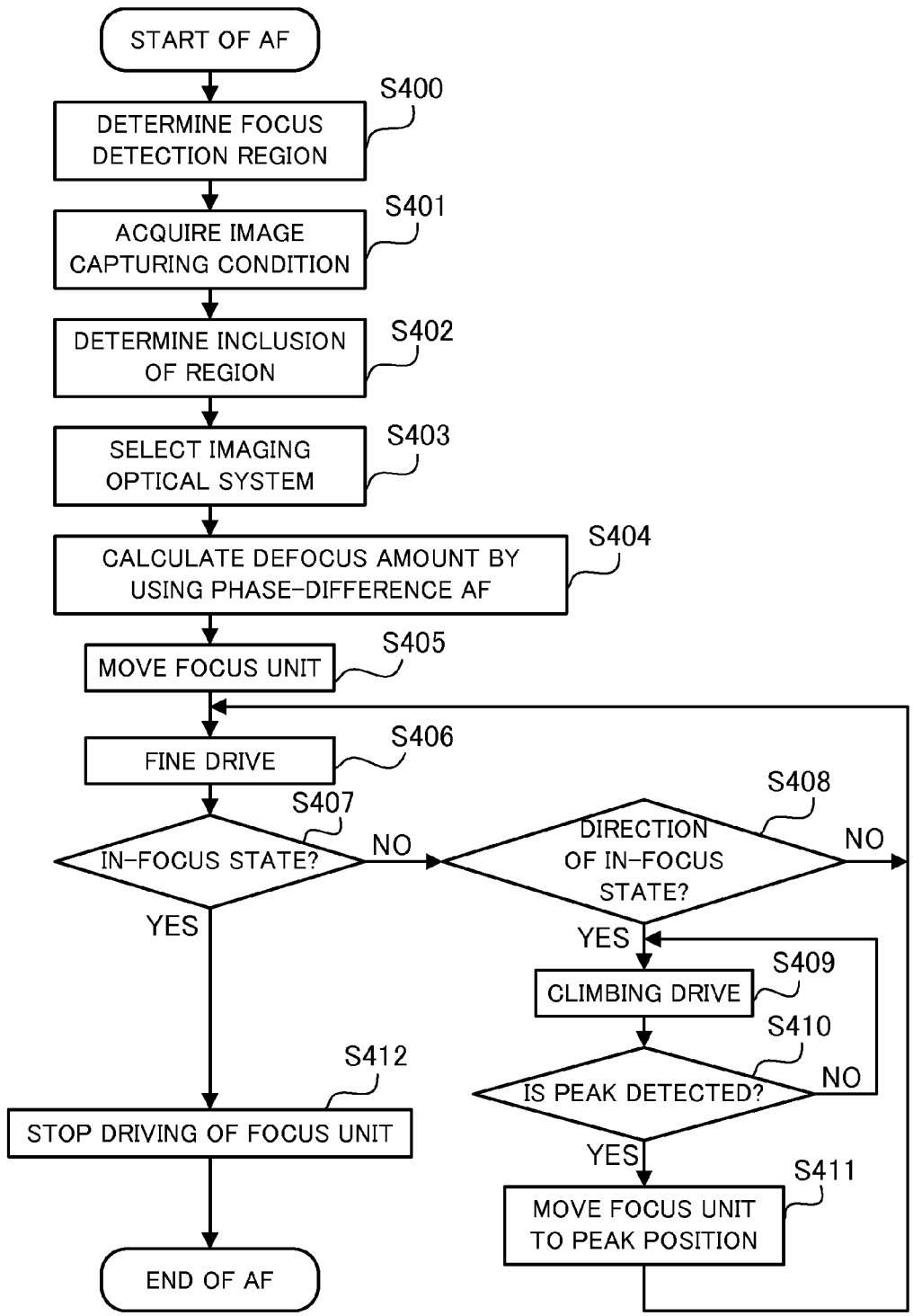
FIG. 12 is a flowchart of illustrating an image capturing operation of the compound-eye image pickup apparatus in Embodiment 4.
Figure 14A:
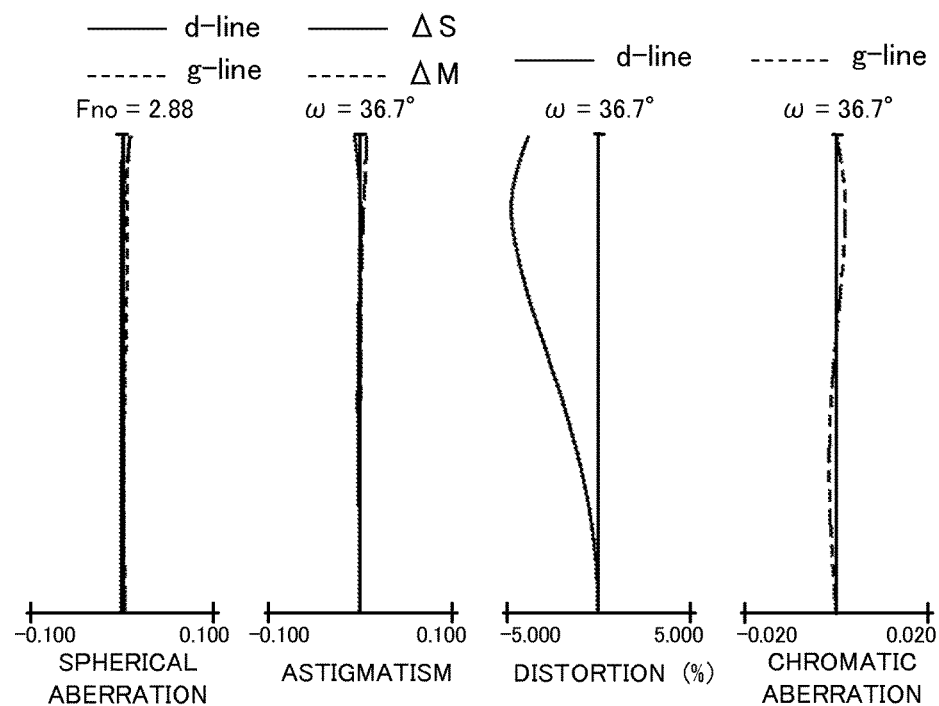
FIGS. 14A to 14D are aberration diagrams of Numerical example 1 corresponding to the compound-eye optical system in Embodiment 4.
Figure 14B:
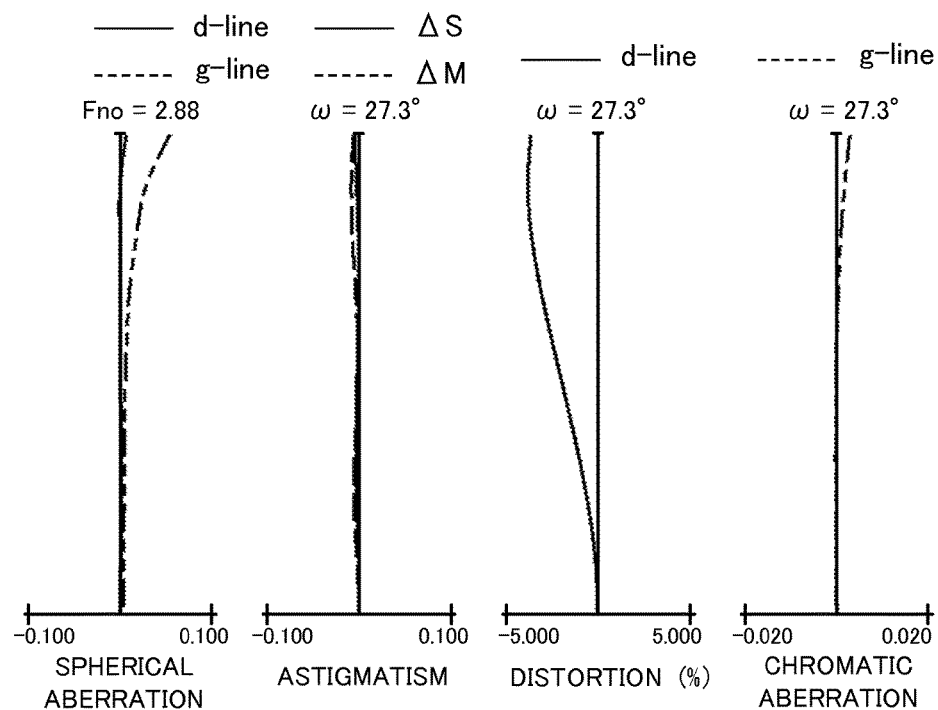
Figure 14C:
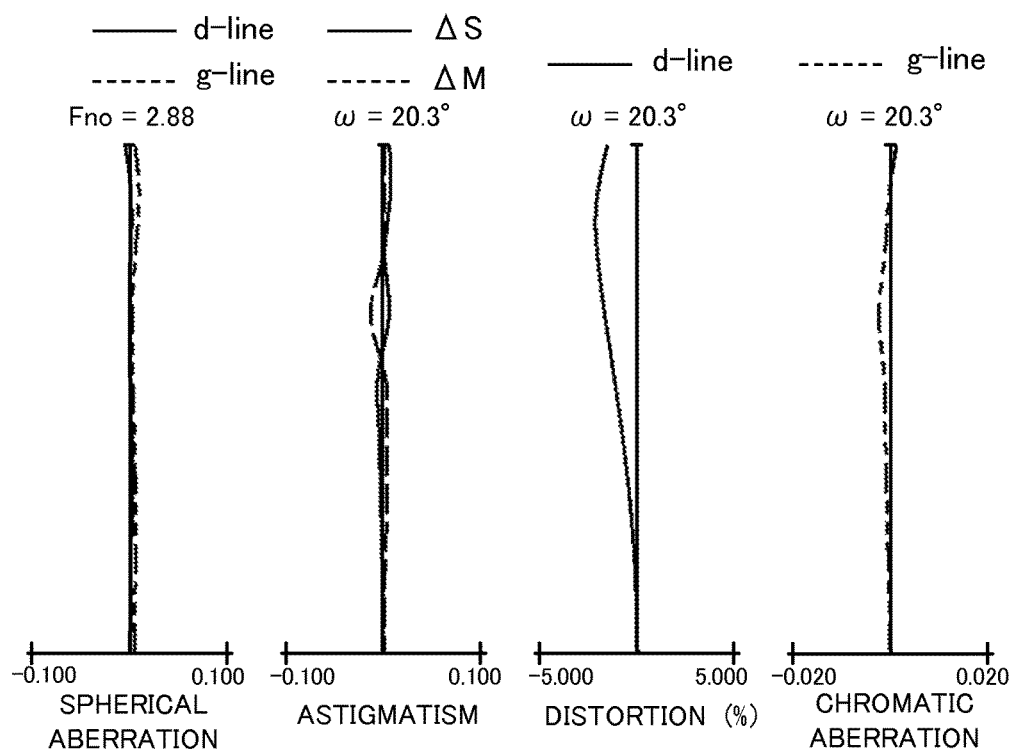
Figure 14D:
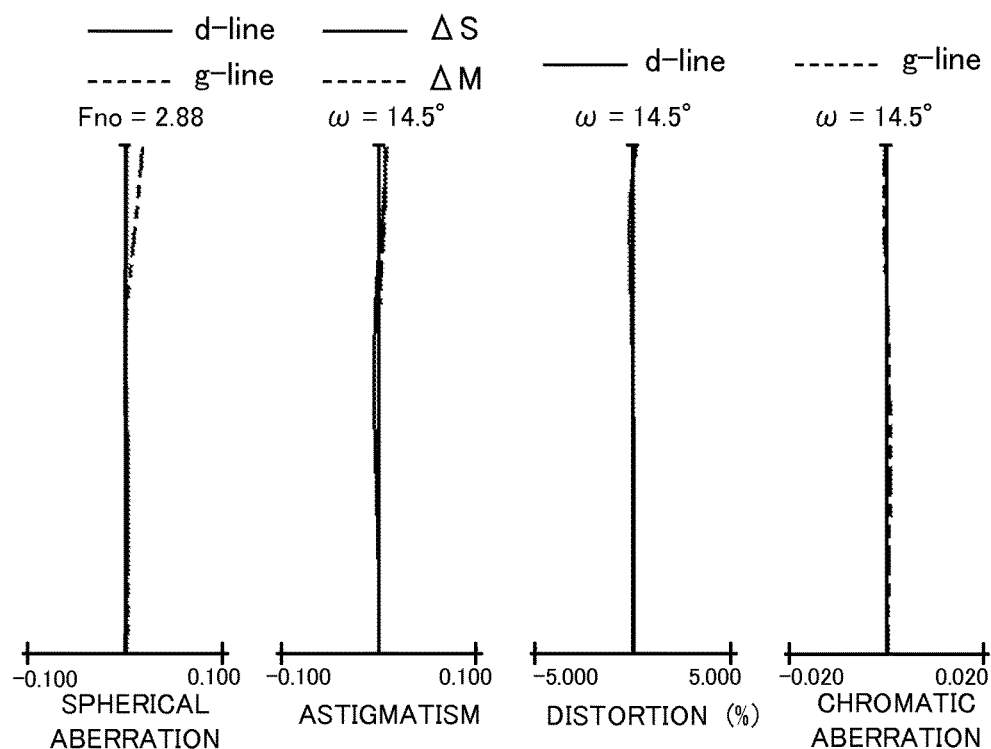
Figure 15A:
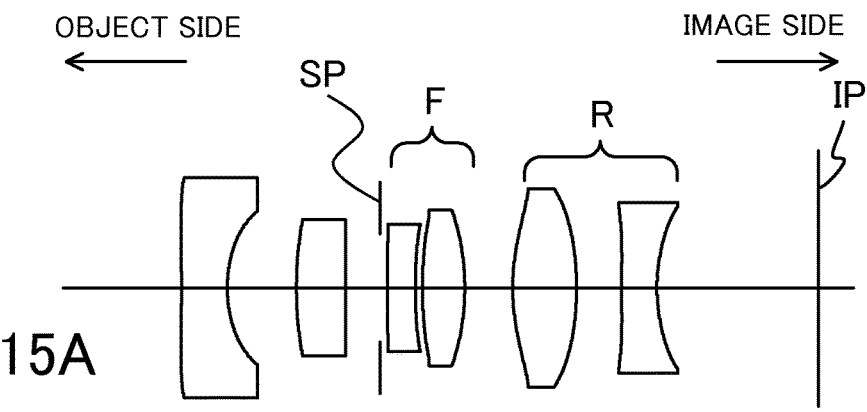
FIGS. 15A to 15D are cross-sectional views of lenses of a wide facet, a wide-middle facet, a tele-middle facet, and a tele facet of a compound-eye optical system in Embodiment 4.
Figure 15B:
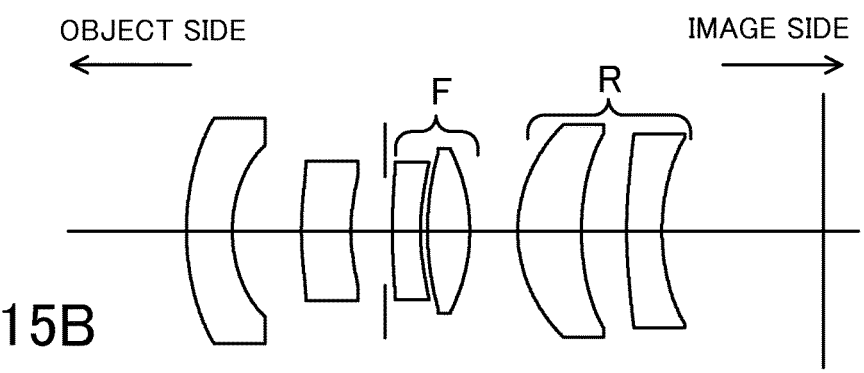
Figure 15C:
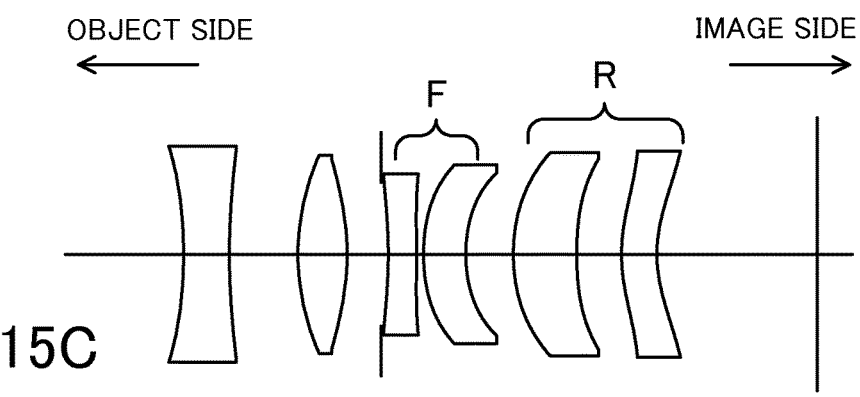
Figure 15D:
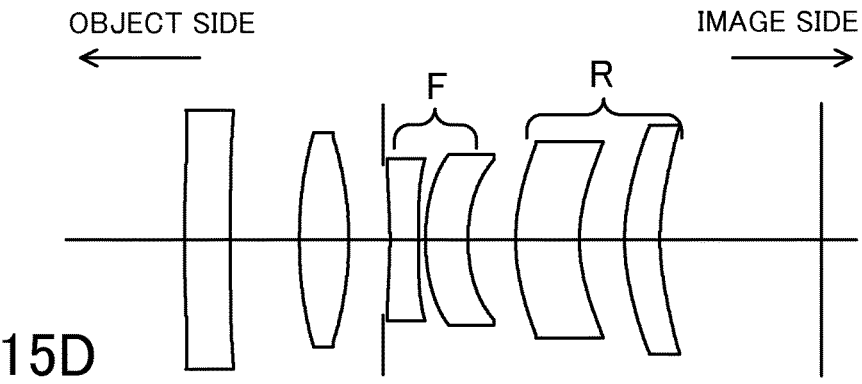
Figure 16A:
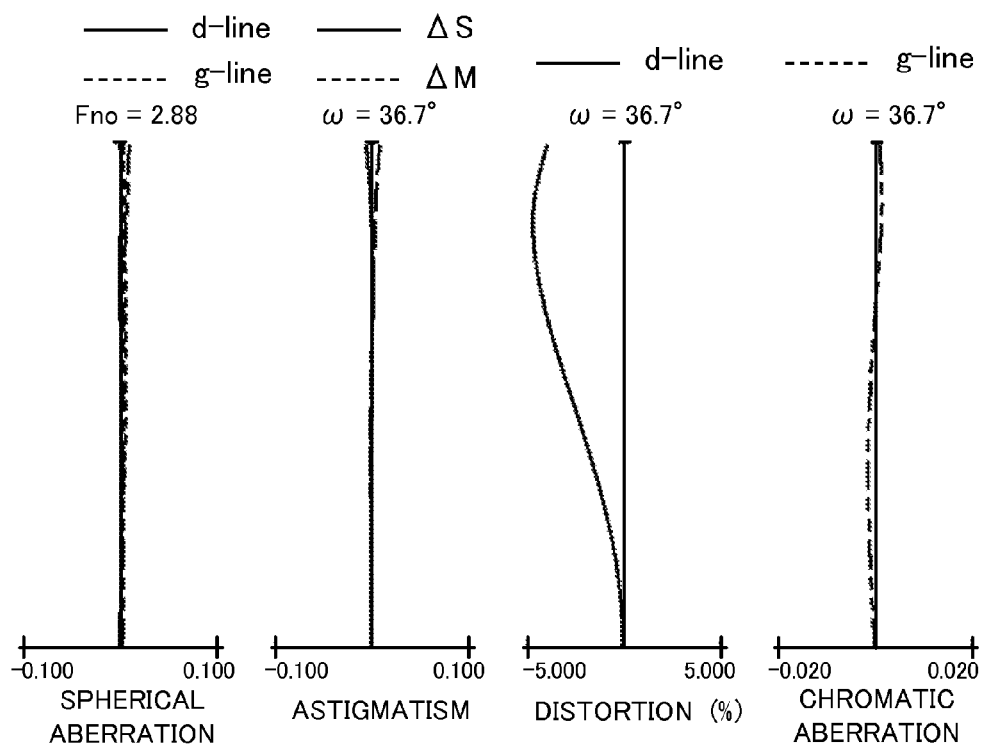
FIGS. 16A to 16D are aberration diagrams of Numerical example 2 corresponding to the compound-eye optical system in Embodiment 4.
Figure 16B:
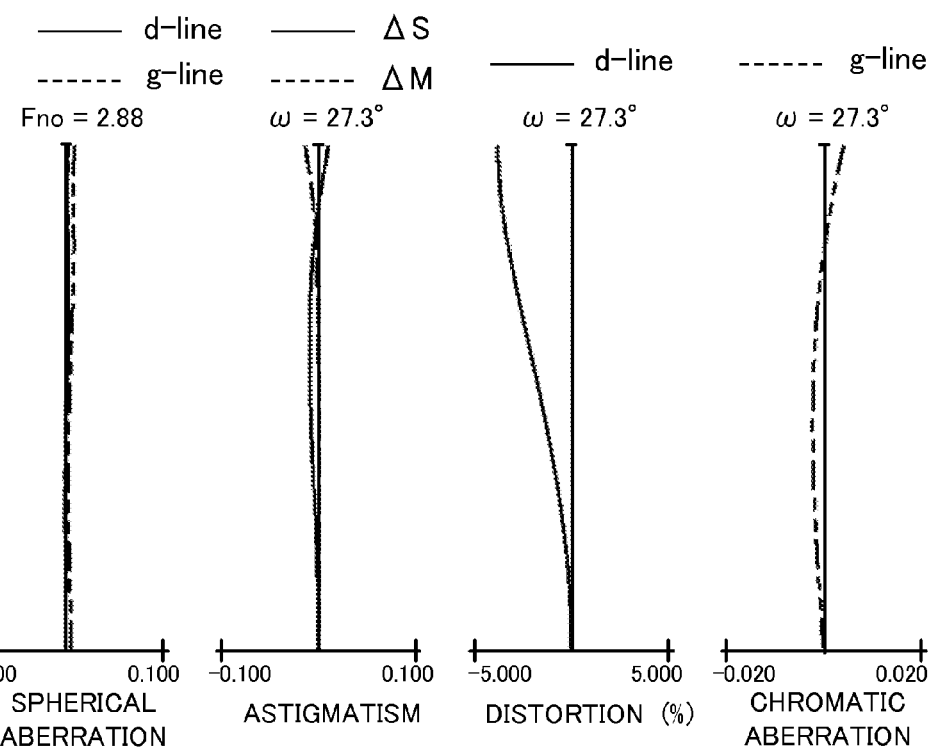
Figure 16C:
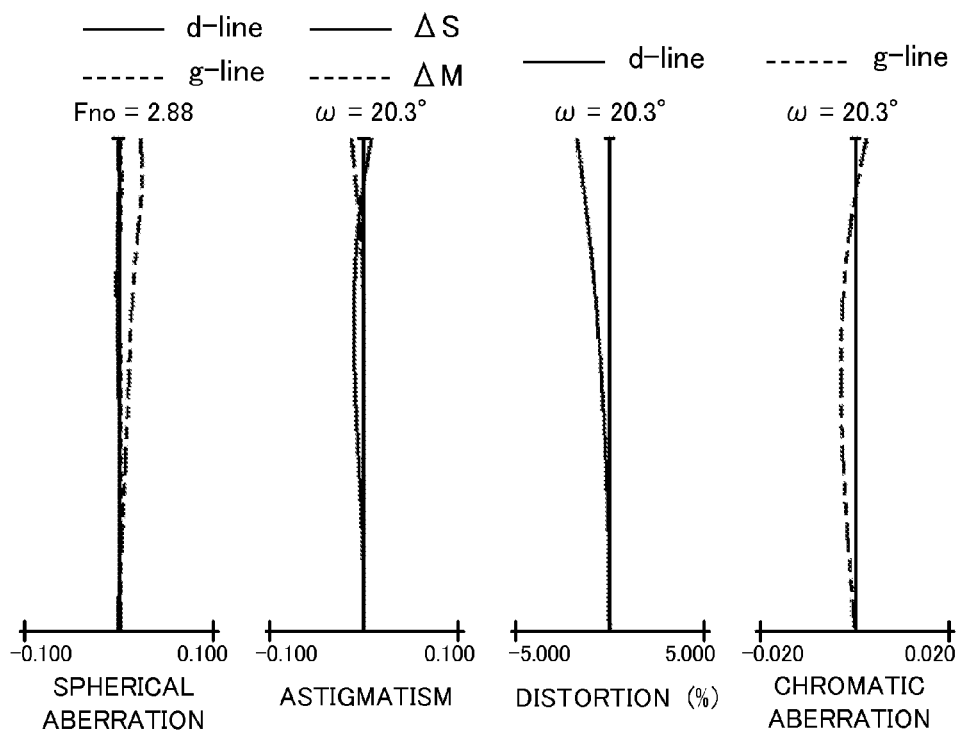
Figure 16D:
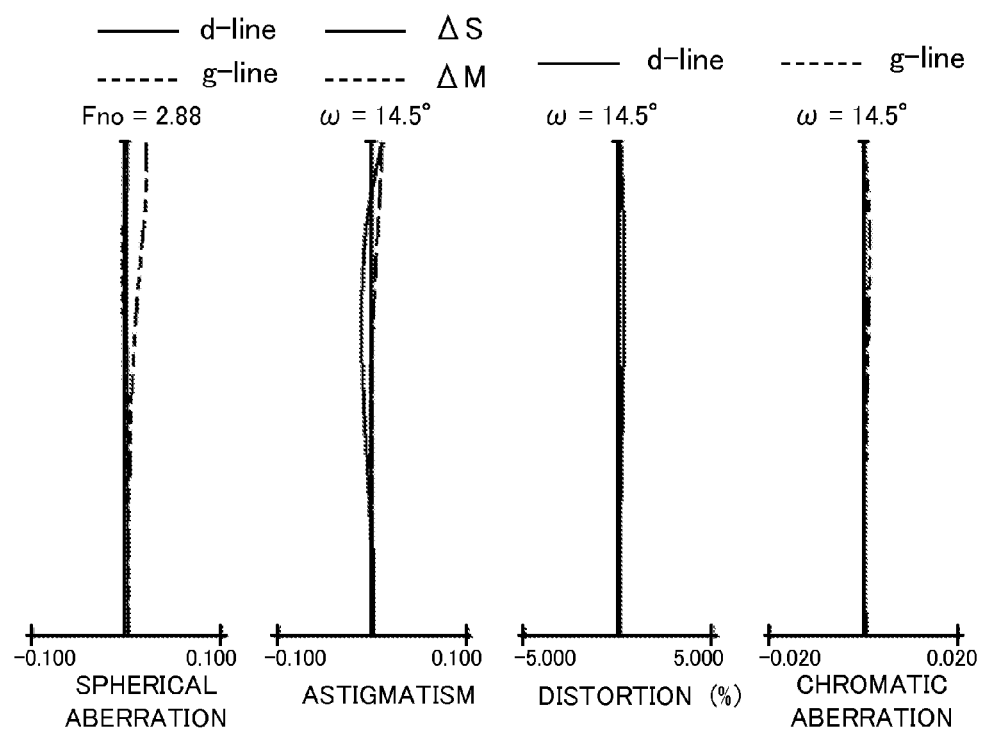
Figure 17A:
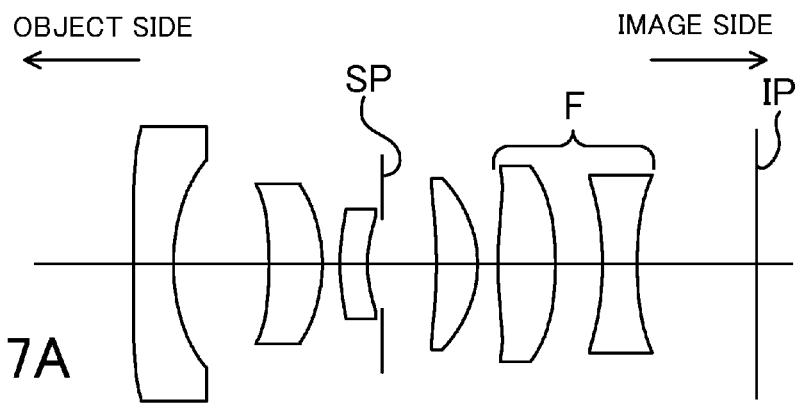
FIGS. 17A to 17D are cross-sectional views of lenses of a wide facet, a wide-middle facet, a tele-middle facet, and a tele facet of a compound-eye optical system in Embodiment 4.
Figure 17B:
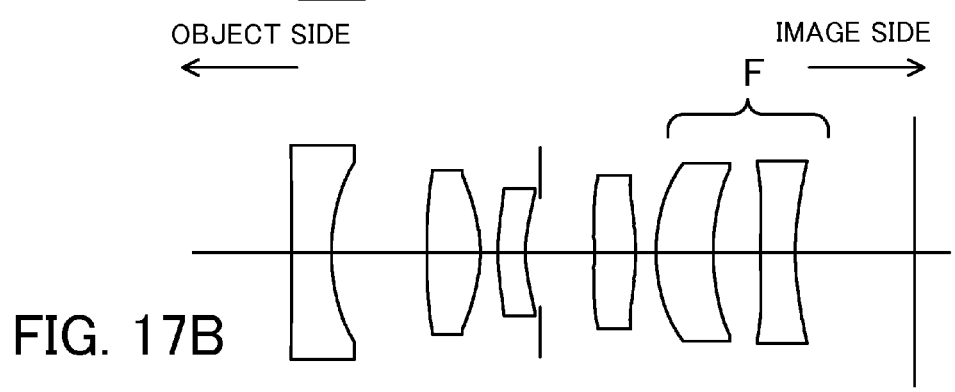
Figure 17C:
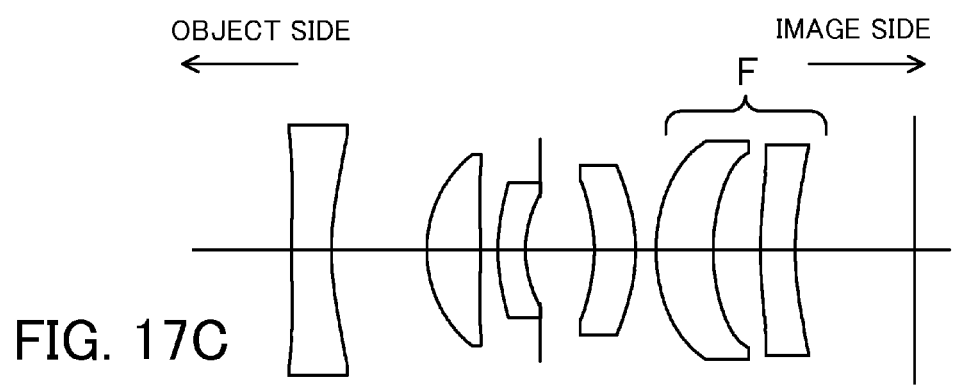
Figure 17D:
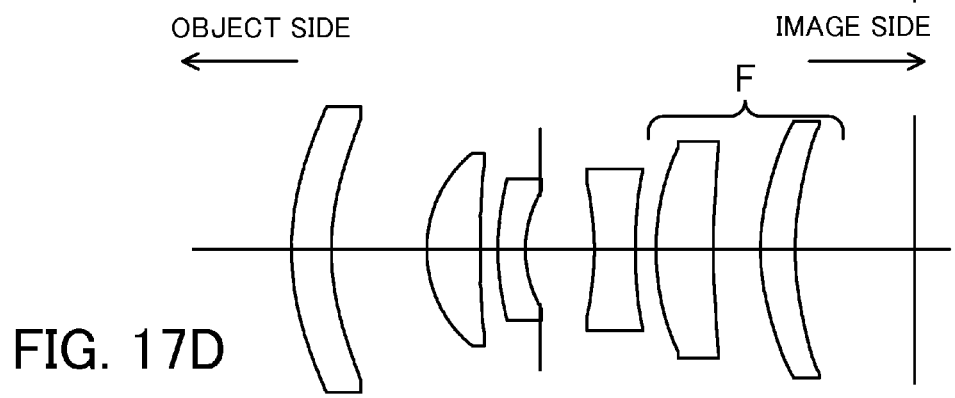
Figure 18A:
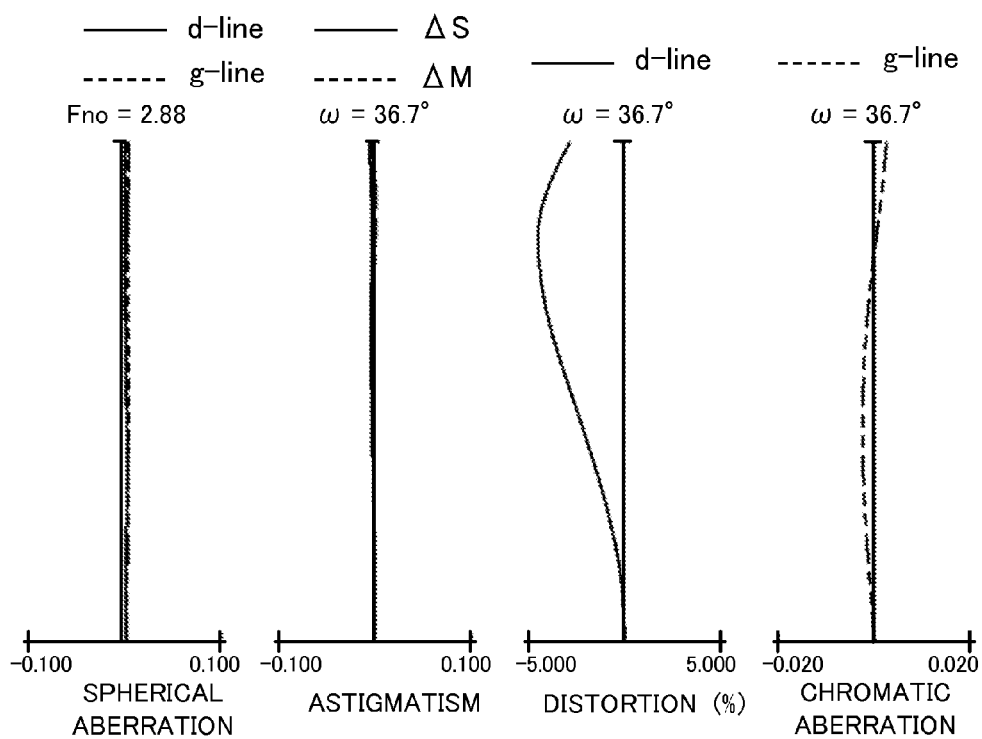
FIGS. 18A to 18D are aberration diagrams of Numerical example 3 corresponding to the compound-eye optical system in Embodiment 4.
Figure 18B:
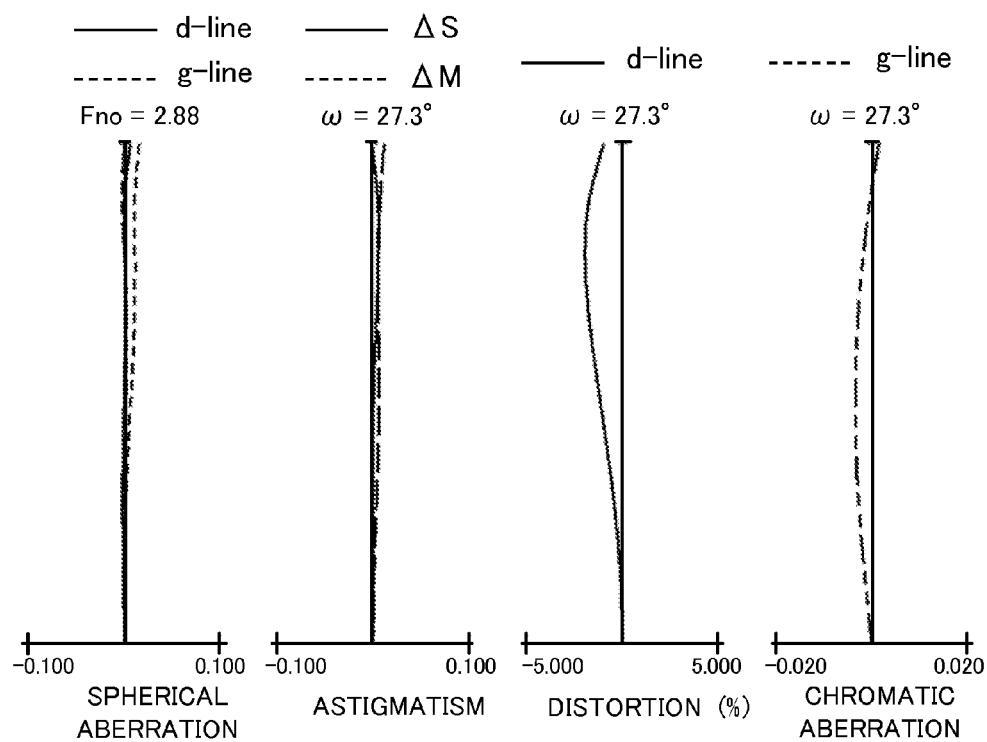
Figure 18C:
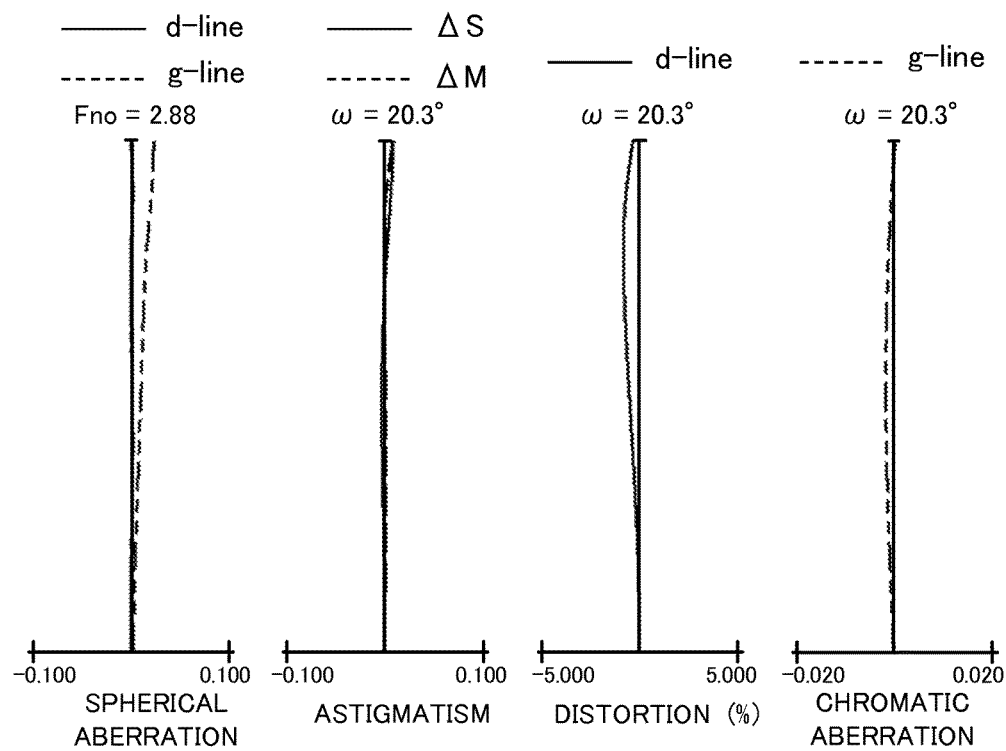
Figure 18D:
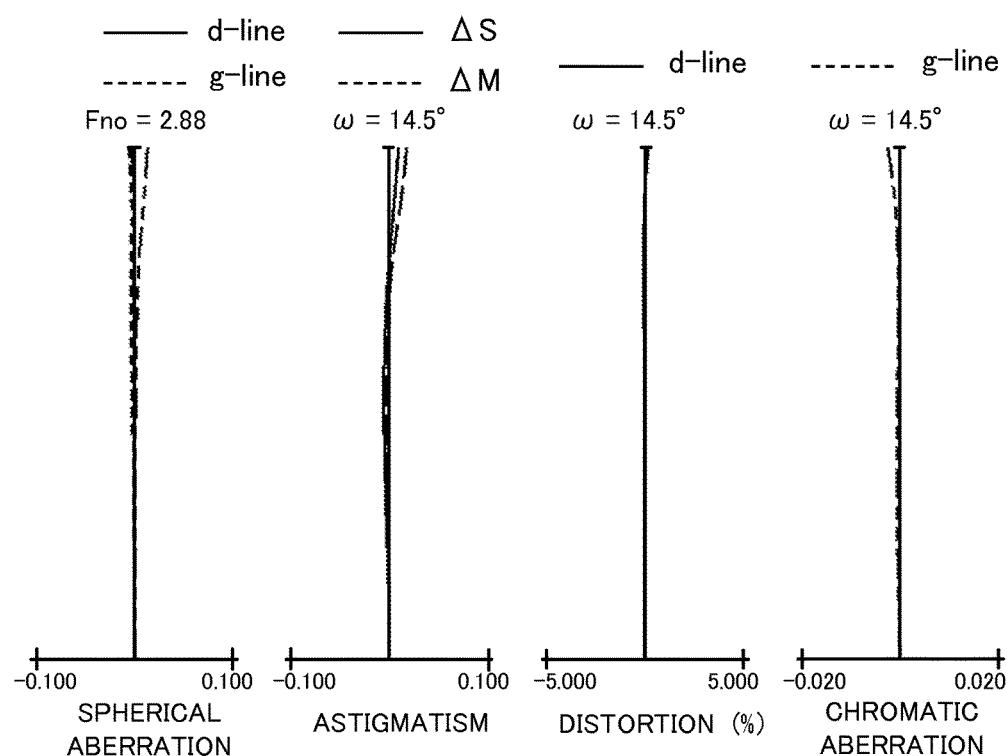

Next, referring to FIG. 12, an AF control method performed by the compound-eye image pickup apparatus 4 will be described. FIG. 12 is a flowchart of illustrating an image capturing operation (AF control method) of the compound-eye image pickup apparatus 4. Each step in FIG. 12 is performed by an instruction of the system controller 90 in the compound-eye image pickup apparatus 4. In other words, the AF control method illustrated in FIG. 12 can be realized as a program which causes the system controller including a microcomputer (processor) to execute a function of each step.

Steps S400 to S404 in FIG. 12 are the same as steps S300 to S304 in Embodiment 3 (FIG. 9), respectively. Subsequently, at step S405, the system controller 90 sends the defocus amount calculated at step S404 to the focus unit movement position calculator 52 to calculate a movement position. Then, the system controller 90 moves, via the image pickup controller 50, the focus units integrally to the calculated movement position. Subsequent steps S406 to S412 are the same as steps S306 to S312 in Embodiment (FIG. 9), except for controlling the movements of the focus units integrally.

In this embodiment, a plurality of imaging optical systems having focal lengths different from each other satisfy expression (17) that is necessary for making moving amounts for focusing identical. Accordingly, for an identical object distance, all the imaging optical systems always focus on an object while all the focus units move by the identical moving amount. In this configuration of the imaging optical systems, the process of calculating the positions of the focus units in the imaging optical systems other than the selected imaging optical system can be omitted, and accordingly the AF control can be performed more efficiently. This embodiment describes the case where the AF control is performed efficiently by adopting the imaging optical systems having the identical focus moving amount on the basis of the configuration in Embodiment 3, and similarly this embodiment can be configured on the basis of the configuration in Embodiment 1 or 2.

Next, first to fourth compound-eye optical systems which can be adopted to the compound-eye image pickup apparatus 4 of this embodiment will be described. The compound-eye optical systems of this embodiment adopt a partial focusing method in at least one imaging optical system, which satisfy conditional expression (17). Accordingly, the plurality of imaging optical systems having focal lengths different from each other have an identical moving amounts for focusing. Specifically, lateral magnifications $\beta_F$ and $\beta_R$, which impact on a position sensitivity ES of the focus unit F, of the focus unit F of each optical system and the image-side unit (rear unit R) disposed at the image side relative to the focus unit F, respectively, are appropriately set.

With respect to a calculation condition of the conditional expression in this case, a focal length and a position sensitivity of the optical system having the largest focal length in each compound-eye optical system are substituted in $f_T$ and $ES_{FT}$ in conditional expression (17). In addition, a focal length and a position sensitivity of the target imaging optical system are substituted in $f_T$ and $ES_{FT}$ in conditional expression (17). When each optical system satisfies conditional expression (17) in this calculation condition, all facet optical systems can focus on an identical object on condition that a moving amount of a focus unit are set to that of a tele facet having the shallowest depth of focus.

Furthermore, a lens is disposed to be approximately the same as a lens constituting the other optical system adjacent in a vertical direction of each optical axis so as to be easily hold the lenses integrally. In addition, each lens is made of an identical material to the lens constituting the other optical system adjacent in the vertical direction of each optical axis so as to mold them integrally. As a method of the integral molding, for example, a conventional injection molding method or glass molding method in which a glass is disposed in a mold and then pressed can be used. Positions of front lenses in the respective optical systems are set to be approximately the same so that light beams of each optical system do not interfere with those of the other optical systems. Positions of image planes (image pickup regions) are set to be approximately the same so that an arrangement or an adjustment of the image pickup element is easy. A surface shape of a lens constituting each optical system is different from a lens constituting the other optical system adjacent in the vertical direction of each optical axis. Even when the lenses having different surface shapes and being made of an identical material, sufficient optical imaging performance can be achieved. Furthermore, in order to achieve a sufficient high zoom ratio (variable magnification ratio) as an image pickup apparatus, a ratio of focus lengths of the wide facet and the tele facet is one-and-a-half times or more.

FIGS. 13A to 13D are cross-sectional views of lenses of a wide facet, a wide-middle facet, a tele-middle facet, and a tele facet in the first compound-eye optical system, respectively. In the first compound-eye optical system, the focus unit F moves to an object side and the image-side unit (rear unit R) is fixed during the focusing from an object at infinity to an object in a close range (front lens focus type). FIGS. 14A to 14D are aberration diagrams of the wide, wide-middle, tele-middle, and tele in Numerical example 1 corresponding to the first compound-eye optical system, respectively.

FIGS. 15A to 15D are cross-sectional views of lenses of a wide facet, a wide-middle facet, a tele-middle facet, and a tele facet in the second compound-eye optical system, respectively. In the second compound-eye optical system, the focus unit F moves to the object side and the image-side unit (rear unit R) is fixed during the focusing from the object at infinity to the object in the close range (inner focus type). FIGS. 16A to 16D are aberration diagrams of the wide, wide-middle, tele-middle, and tele in Numerical example 2 corresponding to the second compound-eye optical system, respectively.

FIGS. 17A to 17D are cross-sectional views of lenses of a wide facet, a wide-middle facet, a tele-middle facet, and a tele facet in the third compound-eye optical system, respectively. In the third compound-eye optical system, the focus unit F moves to the object side during the focusing from the object at infinity to the object in the close range and the image-side unit (rear unit R) does not exist (rear focus type). FIGS. 18A to 18D are aberration diagrams of the wide, wide-middle, tele-middle, and tele in Numerical example 3 corresponding to the third compound-eye optical system, respectively.

FIGS. 19A and 19B are cross-sectional views of lenses of a wide facet and a tele facet in the fourth compound-eye optical system, respectively. In the fourth compound-eye optical system, the focus unit F moves to the object side during the focusing from the object at infinity to the object in the close range. In the wide facet, the image-side unit (rear unit Rha) is fixed during the focusing, and in the tele facet, the image-side unit (rear unit R) does not exist. In other words, a front lens focus type for the wide facet and an entire extension type for the tele facet are adopted as a focus type.

As described above, conditional expression (17) can be satisfied if one is the entire extension type and the other is a partial focus type.

Figure 20A:
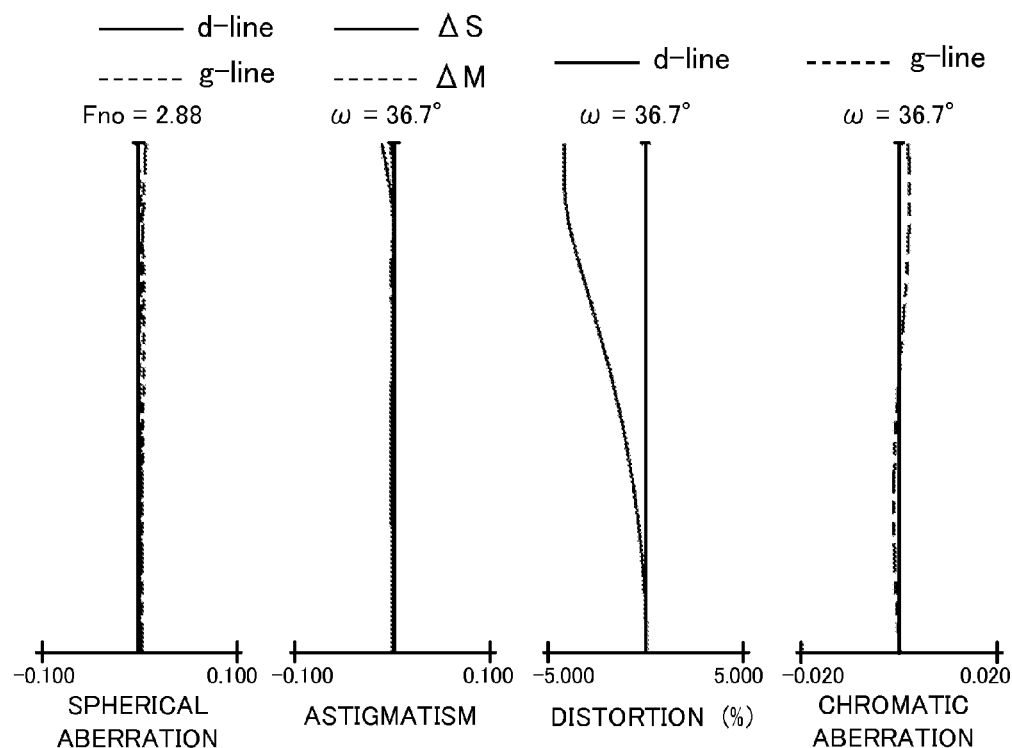
FIGS. 20A and 20B are aberration diagrams of Numerical example 4 corresponding to the compound-eye optical system in Embodiment 4.
Figure 20B:
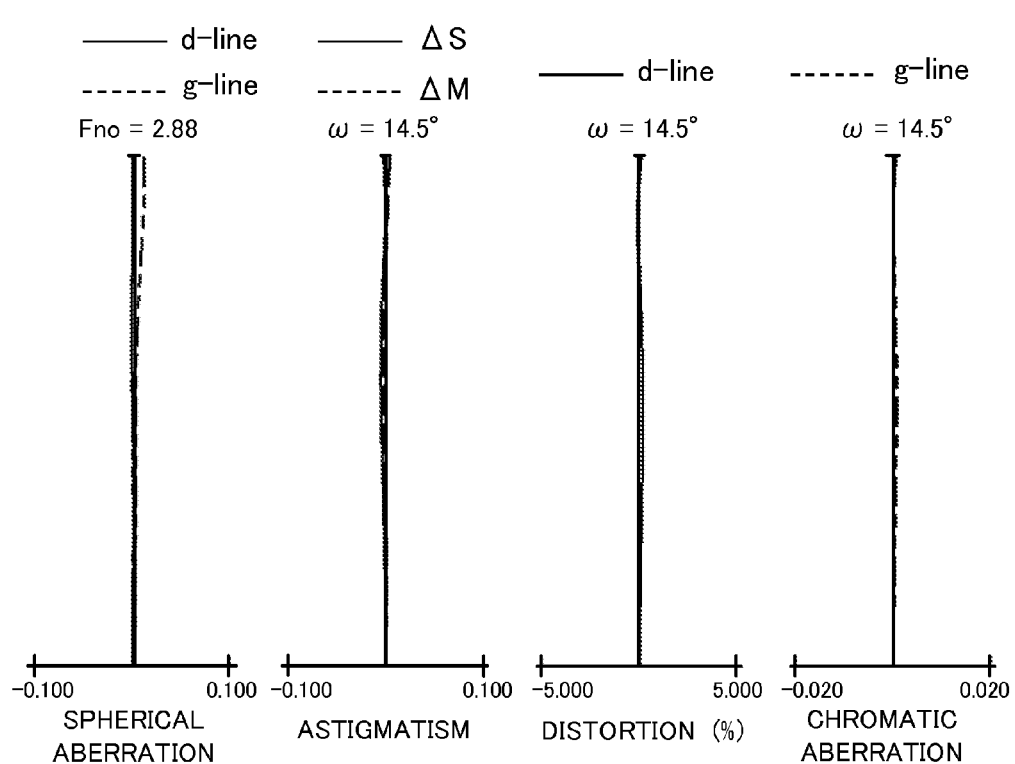

FIGS. 20A and 20B are aberration diagrams of the wide and tele in Numerical example 4 corresponding to the fourth compound-eye optical system, respectively. In each cross-sectional view of lenses, the left side is an object side, i.e., object side (front side), and the right side is an image side (rear side). Symbol F denotes a focus unit, symbol R denotes an image-side unit (rear unit), symbol SP denotes an aperture stop, and symbol IP denotes an image plane. The image plane IP corresponds to an image pickup surface of a solid-state image pickup element (photoelectric conversion element) such as a CCD sensor and a CMOS sensor. It corresponds to a film surface if a silver salt film is used. In each aberration diagram, symbols d and g denote d-line and g-line, respectively, and symbols ΔM and ΔS denote a meridional image surface and a sagittal image surface, respectively. A chromatic aberration of magnification is represented by the g-line. Symbol co denotes a half angle of field, and symbol Fno denotes an F number.

The image pickup unit 400 in this embodiment is simply constituted by two lenses of the focus unit F and the image-side unit (rear unit R). However, this embodiment is not limited thereto, and a holder or a driver of the focus unit may be configured appropriately according to the optical system in each of Numerical examples 1 to 4.

As described above, a control apparatus in each embodiment includes a focus detector (AF signal processor or phase-difference AF signal processor 33) and a controller (image pickup controller 50). The focus detector performs focus detection based on an image signal (focal signal, or output signal from an image pickup element) obtained via a first optical system (first imaging optical system) having a shallowest depth of field in a plurality of optical systems (imaging optical systems) having focal lengths different from each other. The controller performs focus control of the plurality of optical systems based on an output signal from the focus detector. Each of the focus detector and the controller operates based on an instruction of the system controller (camera CPU or lens CPU).

Preferably, the control apparatus includes a calculator (focus unit movement position calculator 52) which calculates a movement position of a focus lens of a second optical system (optical systems other than the first optical system) in the plurality of optical systems. The controller performs the focus control by moving a focus lens of the first optical system based on the output signal from the focus detector. Then, the calculator calculates the movement position of the focus lens of the second optical system based on a position of the focus lens of the first optical system. Preferably, the controller performs the focus control by integrally moving a plurality of focus lenses of the plurality of optical systems by an identical moving amount based on the output signal from the focus detector.

Preferably, the control apparatus includes an acquirer (information acquirer 61) which acquires image capturing condition information and a determiner (imaging optical system determiner 51) which determines the first optical system based on the image capturing condition information. More preferably, the acquirer acquires, as the image capturing condition information, information relating to the plurality of optical systems, focal lengths of the optical systems, and F numbers of the optical systems. Then, the determiner determines the first optical system satisfying conditional expression (3a) where $f_1$ is a focal length of the first optical system, $Fno_1$ is an F number of the first optical system, $f_i$ is a focal length of one of the optical systems, and $Fno_i$ is an F number of the one of the optical systems.

Preferably, the focus detector performs the focus detection by a contrast detection method or a phase-difference detection method. Preferably, the focus detector includes a first focus detector (phase-difference AF signal processor 33) which performs focus detection by a phase-difference detection method and a second focus detector (AF signal processor 31) which performs focus detection by a contrast detection method. Then, the controller performs first focus control based on a first output signal from the first focus detector. The controller performs second focus control based on a second output signal from the second focus detector after the first focus control.

Preferably, the control apparatus includes a region determiner (focus detection region determiner 62) and an inclusion determiner (region inclusion determiner 63). The region determiner determines a region in which the focus detection is to be performed. The inclusion determiner determines whether the region determined by the region determiner is included in an image pickup region for each of the plurality of optical systems. Then, the determiner determines the first optical system based on a determination result of the inclusion determiner.

An image pickup apparatus of each embodiment (each of compound-eye image pickup apparatuses 1 to 4) includes the control apparatus and an image pickup element (image pickup element unit 200) which photoelectrically converts an optical image formed via a plurality of optical systems having focal lengths different from each other. Preferably, the image pickup element includes a plurality of image pickup regions (image pickup elements 210a to 210h) corresponding to the respective optical systems.

An image pickup system of each embodiment (each of compound-eye image pickup apparatuses 1 to 4) includes the image pickup apparatus and a plurality of optical systems (imaging optical systems 110 to 140 or 410 to 440) having focal lengths different from each other. Preferably, the plurality of optical systems include at least two optical systems (for example, imaging optical systems 110a and 110b) having an identical focal length. Preferably, the image pickup system includes a holder (holder 300) which integrally moves a plurality of focus lenses of the optical systems by an identical moving amount during the focus control of the optical systems.

A lens apparatus of each embodiment includes the plurality of optical systems (imaging optical systems 110 to 140 or 410 to 440) and the controller (system controller 90). The controller performs focus control of the plurality of optical systems based on an image signal obtained via a first optical system having a shallowest depth of field in the plurality of optical systems. In this case, the controller is included in the lens apparatus and it has a function which is similar to that of the image pickup controller 50.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The following numerical examples 1 to 4 are specific numerical data corresponding to the first to fourth compound-eye optical systems, respectively. In each numerical example, symbol i denotes the number of a surface counted from the object side. Symbol $r_i$ denotes a radius of curvature of an i-th optical surface (i-th surface). Symbol $d_i$ denotes a distance on the optical axis between an i-th surface and an (i+1)-th surface. Symbols $nd_i$ and $\nu d_i$ denote a refractive index and the Abbe number of a material of an i-th optical member for the d-line, respectively. Symbol f denotes a focal length, symbol Fno denotes an F number, and symbol ω denotes a half angle of field. The distance d of zero (d=0) means that adjacent surfaces are cemented (joined)

An aspherical shape is given by the following expression (18) where symbol R denotes a radius of curvature, and K, A3, A4, A5, A6, A7, A8, A9, A10, A11, and A12 denote aspherical coefficients.

$$X = (H^2/R)/[1+\{1-(1+K)(H/R)^2\}^{1/2}] + A3 \cdot H^3 + A4 \cdot H^4 + A5 \cdot H^5 + A6 \cdot H^6 + A7 \cdot H^7 + A8 \cdot H^8 + A9 \cdot H^9 + A10 \cdot H^{10} + A11 \cdot H^{11} + A12 \cdot H^{12} \quad (18)$$

Symbol "e±XX" for each aspherical coefficient means "$\times 10^{\pm xx}$".

Table 1 indicates a relationship between conditional expression (17) and each of numerical examples 1 to 4 (Embodiments 1 to 4). Each of the focal length, the F number, and the angle of field represents a value when focusing on an object at infinity. Symbol BF is an air-converted value of a distance from a final lens surface to an image plane.

(NUMERICAL EXAMPLE 1)
Wide facet
Unit mm
Surface data

| Surface number | r | d | nd | νd |
|---|---|---|---|---|
| 1* | 40.382 | 1.30 | 1.62041 | 60.3 |
| 2* | 2.411 | 2.67 | | |
| 3* | 6.203 | 1.40 | 1.59240 | 68.3 |
| 4* | −11.433 | 0.50 | | |
| 5* | −62.116 | 0.80 | 1.80518 | 25.4 |
| 6* | 15.255 | 0.10 | | |
| 7(stop) | ∞ | 0.10 | | |
| 8* | 6.018 | 1.20 | 1.64000 | 60.1 |
| 9* | −12.756 | 3.48 | | |
| 10* | 9.928 | 1.80 | 1.59240 | 68.3 |
| 11* | −11.658 | 0.50 | | |
| 12* | −28.136 | 1.00 | 1.84666 | 23.8 |
| 13* | 8.934 | | | |
| Image plane | ∞ | | | |

Aspherical data

1st surface

K = −8.61567e+001 A 4 = −9.22230e−004 A 6 = 4.19663e−005

2nd surface

K = −9.30223e−001 A 4 = 7.19408e−003 A 6 = 6.36185e−004

3rd surface

K = 3.54414e+000 A 4 = 2.81499e−003 A 6 = 2.34019e−004

4th surface

K = −3.53906e+000 A 4 = 1.43935e−003 A 6 = 1.07092e−004

5th surface

K = 3.15676e+000 A 4 = 1.79932e−003 A 6 = −9.65503e−004

6th surface

K = 4.96423e+001 A 4 = 1.09416e−003 A 6 = −7.97966e−004

8th surface

K = −3.06847e+000 A 4 = −1.51330e−004 A 6 = 3.84651e−004

9th surface

K = 9.75797e+000 A 4 = −3.28928e−004 A 6 = 5.50566e−004

10th surface

K = −1.10481e+001 A 4 = 2.90917e−004 A 6 = 5.26599e−004

11th surface

K = 1.72650e+001 A 4 = −4.08824e−003 A 6 = 9.11055e−004

12th surface

K = −7.35482e+001 A 4 = −1.54275e−002 A 6 = 3.85072e−004

13th surface

K = 7.43385e+000 A 4 = −1.07701e−002 A 6 = 4.92519e−004

Various data

| Focal length | 5.20 |
|---|---|
| F number | 2.88 |
| Half angle of field | 36.69 |
| Image height | 3.88 |
| Total lens length | 17.91 |
| BF | 3.06 |
| Entrance pupil position | 3.15 |
| Exit pupil position | −4.86 |
| Front-side principal point position | 4.94 |
| Rear-side principal point position | −2.14 |

Single lens data

| Lens | Start surface | Focal length |
|---|---|---|
| 1 | 1 | −4.19 |
| 2 | 3 | 6.99 |
| 3 | 5 | −15.14 |
| 4 | 8 | 6.55 |
| 5 | 10 | 9.34 |
| 6 | 12 | −7.91 |

(NUMERICAL EXAMPLE 1)

Wide-middle facet
Unit mm
Surface data

| Surface number | r | d | nd | vd |
|---|---|---|---|---|
| 1* | 6.194 | 1.30 | 1.62041 | 60.3 |
| 2* | 2.200 | 2.67 | | |
| 3* | 6.346 | 1.40 | 1.59240 | 68.3 |
| 4* | −26.449 | 0.50 | | |
| 5* | −41.518 | 0.80 | 1.80518 | 25.4 |
| 6* | 14.348 | 0.10 | | |
| 7(stop) | ∞ | 0.10 | | |
| 8* | 4.979 | 1.20 | 1.64000 | 60.1 |
| 9* | −7.878 | 3.48 | | |
| 10* | −7.653 | 1.80 | 1.59240 | 68.3 |
| 11* | −7.611 | 0.50 | | |
| 12* | −12.407 | 1.00 | 1.84666 | 23.8 |
| 13* | 52.342 | | | |
| Image plane | ∞ | | | |

Aspherical data

1st surface

K = −5.86699e+000 A 4 = −8.96118e−004 A 6 = 1.23087e−006
2nd surface

K = −1.11462e+000 A 4 = 5.18382e−003 A 6 = 7.47793e−004
3rd surface

K = 2.23083e+000 A 4 = 2.29189e−003 A 6 = 9.11689e−005
4th surface

K = 3.98608e+001 A 4 = −1.07969e−003 A 6 = −1.03444e−004
5th surface

K = −2.66134e+001 A 4 = 2.91291e−004 A 6 = −5.80559e−004
6th surface

K = 3.25993e+001 A 4 = 1.05064e−003 A 6 = −3.89850e−004
8th surface

K = −3.31035e+000 A 4 = 9.36039e−004 A 6 = 4.48060e−005
9th surface

K = 1.62170e+000 A 4 = −1.30807e−004 A 6 = 1.97962e−004
10th surface

K = −1.84308e+001 A 4 = −9.71624e−003 A 6 = 5.68105e−004
11th surface

K = −2.88780e+001 A 4 = −1.01570e−002 A 6 = 1.38466e−004
12th surface

K = −9.00000e+001 A 4 = −1.47730e−002 A 6 = −1.20913e−005
13th surface

K = −5.42659e+001 A 4 = −8.67083e−003 A 6 = 3.90008e−004

Various data

| | |
|---|---|
| Focal length | 7.50 |
| F number | 2.88 |
| Half angle of field | 27.32 |
| Image height | 3.88 |
| Total lens length | 17.91 |
| BF | 3.06 |
| Entrance pupil position | 4.05 |
| Exit pupil position | −4.94 |
| Front-side principal position | 4.52 |
| Rear-side principal position | −4.44 |

(NUMERICAL EXAMPLE 1)

Single lens data

| Lens | Start surface | Focal length |
|---|---|---|
| 1 | 1 | −6.28 |
| 2 | 3 | 8.78 |
| 3 | 5 | −13.16 |
| 4 | 8 | 4.95 |
| 5 | 10 | 138.07 |
| 6 | 12 | −11.76 |

Tele-middle facet
Unit mm
Surface data

| Surface number | r | d | nd | vd |
|---|---|---|---|---|
| 1* | −14.915 | 1.30 | 1.62041 | 60.3 |
| 2* | 69.090 | 2.67 | | |
| 3* | 5.672 | 1.40 | 1.59240 | 68.3 |
| 4* | −7.487 | 0.50 | | |
| 5* | −9.447 | 0.80 | 1.80518 | 25.4 |
| 6* | −22.100 | 0.10 | | |
| 7(stop) | ∞ | 0.10 | | |
| 8* | 3.929 | 1.20 | 1.64000 | 60.1 |
| 9* | 2.484 | 3.48 | | |
| 10* | 6.037 | 1.80 | 1.59240 | 68.3 |
| 11* | 21.097 | 0.50 | | |
| 12* | 13.374 | 1.00 | 1.84666 | 23.8 |
| 13* | 6.940 | | | |
| Image plane | ∞ | | | |

Aspherical data

1st surface

K = 3.23218e+000 A 4 = −3.05400e−004 A 6 = 4.53521e−005
2nd surface

K = −9.00000e+001 A 4 = 1.59130e−004 A 6 = 5.15981e−005
3rd surface

K = −1.64767e+000 A 4 = 2.27739e−003 A 6 = −6.09668e−006
4th surface

K = −7.51140e+000 A 4 = 2.83658e−004 A 6 = 7.41960e−005
5th surface

K = 8.77500e+000 A 4 = 1.90647e−004 A 6 = 7.09546e−004
6th surface

K = 7.06211e+000 A 4 = −1.29880e−003 A 6 = 6.54962e−004
8th surface

K = −7.69118e−001 A 4 = −1.53255e−003 A 6 = −1.23634e−004
9th surface

K = −9.82229e−001 A 4 = 2.51720e−004 A 6 = −1.95089e−004
10th surface

K = −4.39310e+000 A 4 = 2.05043e−003 A 6 = −1.72957e−005
11th surface

K = 3.04604e+001 A 4 = 9.28199e−004 A 6 = −1.81115e−004
12th surface

K = 5.49088e+000 A 4 = −1.18023e−003 A 6 = 3.43330e−005
13th surface

K = 2.34608e+000 A 4 = −3.33103e−003 A 6 = 1.61864e−004

Various data

| | |
|---|---|
| Focal length | 10.50 |
| F number | 2.88 |
| Half angle of field | 20.26 |
| Image height | 3.88 |

-continued (NUMERICAL EXAMPLE 1)

| | |
|---|---|
| Total lens length | 17.91 |
| BF | 3.06 |
| Entrance pupil position | 4.64 |
| Exit pupil position | −5.12 |
| Front-side principal position | 1.66 |
| Rear-side principal position | −7.44 |

Single lens data

| Lens | Start surface | Focal length |
|---|---|---|
| 1 | 1 | −19.66 |
| 2 | 3 | 5.67 |
| 3 | 5 | −21.09 |
| 4 | 8 | −15.62 |
| 5 | 10 | 13.67 |
| 6 | 12 | −18.35 |

Tele facet
Unit mm
Surface data

| Surface number | r | d | nd | νd |
|---|---|---|---|---|
| 1* | 36.807 | 1.30 | 1.62041 | 60.3 |
| 2* | −41.677 | 2.67 | | |
| 3* | 8.270 | 1.40 | 1.59240 | 68.3 |
| 4* | −7.910 | 0.50 | | |
| 5* | −9.885 | 0.80 | 1.80518 | 25.4 |
| 6* | −54.358 | 0.10 | | |
| 7(stop) | ∞ | 0.10 | | |
| 8* | 5.124 | 1.20 | 1.64000 | 60.1 |
| 9* | 2.412 | 3.48 | | |
| 10* | 10.272 | 1.80 | 1.59240 | 68.3 |
| 11* | 16.743 | 0.50 | | |
| 12* | 9.281 | 1.00 | 1.84666 | 23.8 |
| 13* | 10.176 | | | |
| Image plane | ∞ | | | |

Aspherical data

1st surface

K = −9.00000e+001 A 4 = 3.25623e−005 A 6 = 1.37046e−005
2nd surface

K = 6.54916e+001 A 4 = 9.61894e−004 A 6 = 1.97095e−005
3rd surface

K = −5.20341e−001 A 4 = 2.82359e−003 A 6 = 1.62204e−005
4th surface

K = −1.07451e+001 A 4 = 1.35610e−003 A 6 = −1.75272e−005
5th surface

K = 9.36306e+000 A 4 = 3.65867e−003 A 6 = 3.57432e−004
6th surface

K = −1.69149e+001 A 4 = 1.12483e−003 A 6 = 6.25155e−004
8th surface

K = −6.38373e−001 A 4 = −3.54965e−003 A 6 = 1.25622e−006
9th surface

K = −9.28207e−001 A 4 = −1.83232e−003 A 6 = −1.58220e−004
10th surface

K = 6.03894e−001 A 4 = 1.13103e−003 A 6 = 4.35985e−005
11th surface

K = −8.36796e+000 A 4 = 9.48431e−004 A 6 = −5.05453e−005

-continued (NUMERICAL EXAMPLE 1)

12th surface

K = −2.24043e+000 A 4 = −9.07528e−004 A 6 = 9.61281e−007
13th surface

K = 6.10242e+000 A 4 = −2.60010e−003 A 6 = 1.92825e−005

Various data

| | |
|---|---|
| Focal length | 15.00 |
| F number | 2.88 |
| Half angle of field | 14.48 |
| Image height | 3.88 |
| Total lens length | 17.91 |
| BF | 3.06 |
| Entrance pupil position | 6.90 |
| Exit pupil position | −6.27 |
| Front-side principal position | −2.20 |
| Rear-side principal position | −11.94 |

Single lens data

| Lens | Start surface | Focal length |
|---|---|---|
| 1 | 1 | 31.71 |
| 2 | 3 | 7.05 |
| 3 | 5 | −15.13 |
| 4 | 8 | −8.61 |
| 5 | 10 | 40.66 |
| 6 | 12 | 82.43 |

(NUMERICAL EXAMPLE 2)

Wide facet
Unit mm
Surface data

| Surface number | r | d | nd | νd |
|---|---|---|---|---|
| 1* | −42.834 | 1.30 | 1.72916 | 54.7 |
| 2* | 3.863 | 1.95 | | |
| 3* | 10.061 | 1.40 | 1.59240 | 68.3 |
| 4* | −254.805 | 0.97 | | |
| 5(stop) | ∞ | 0.20 | | |
| 6* | 60.619 | 0.80 | 1.80518 | 25.4 |
| 7* | 15.022 | 0.20 | | |
| 8* | 12.585 | 1.20 | 1.64000 | 60.1 |
| 9* | −6.869 | 1.35 | | |
| 10* | 6.405 | 1.80 | 1.59240 | 68.3 |
| 11* | −9.227 | 1.28 | | |
| 12* | 42.308 | 1.00 | 1.84666 | 23.8 |
| 13* | 4.861 | | | |
| Image plane | ∞ | | | |

Aspherical data

1st surface

K = −9.00000e+001 A 4 = 1.68209e−003 A 6 = 2.18378e−005
2nd surface

K = 1.56201e+000 A 4 = 2.31919e−004 A 6 = 2.49857e−005
3rd surface

K = 1.56344e+001 A 4 = −2.30989e−003 A 6 = −3.90307e−004
4th surface

K = −9.00000e+001 A 4 = 8.76797e−004 A 6 = −3.09096e−004
6th surface

K = −9.00000e+001 A 4 = 7.22417e−004 A 6 = 1.69814e−004
7th surface

K = −5.28938e+001 A 4 = 3.20245e−003 A 6 = 2.63310e−004

(NUMERICAL EXAMPLE 2)

8th surface

K = −3.31531e+001 A 4 = 3.32480e−003 A 6 = −1.76152e−005
9th surface

K = −1.14135e+000 A 4 = −8.15775e−004 A 6 = 3.19305e−006
10th surface

K = −8.67401e+000 A 4 = 2.26418e−003 A 6 = −3.63267e−004
11th surface

K = 2.68548e+000 A 4 = −2.16758e−003 A 6 = −4.66522e−005
12th surface

K = 9.00000e+001 A 4 = −8.67976e−003 A 6 = 6.91067e−004
13th surface

K = −5.35623e+000 A 4 = 9.73749e−004 A 6 = 7.24657e−004

Various data

| | |
|---|---|
| Focal length | 5.20 |
| F number | 2.88 |
| Half angle of field | 36.69 |
| Image height | 3.88 |
| Total lens length | 18.00 |
| BF | 4.55 |
| Entrance pupil position | 2.89 |
| Exit pupil position | −4.03 |
| Front-side principal point | 4.94 |
| Rear-side principal point | −0.65 |

Single lens data

| Lens | Start surface | Focal length |
|---|---|---|
| 1 | 1 | −4.80 |
| 2 | 3 | 16.37 |
| 3 | 6 | −25.00 |
| 4 | 8 | 7.11 |
| 5 | 10 | 6.67 |
| 6 | 12 | −6.57 |

Wide-middle facet
Unit mm
Surface data

| Surface number | r | d | nd | vd |
|---|---|---|---|---|
| 1* | 7.207 | 1.30 | 1.72916 | 54.7 |
| 2* | 4.000 | 1.95 | | |
| 3* | 7.876 | 1.40 | 1.59240 | 68.3 |
| 4* | 4.755 | 0.97 | | |
| 5(stop) | ∞ | 0.20 | | |
| 6* | 11.962 | 0.80 | 1.80518 | 25.4 |
| 7* | 5.782 | 0.20 | | |
| 8* | 7.462 | 1.20 | 1.64000 | 60.1 |
| 9* | −5.083 | 1.35 | | |
| 10* | 4.011 | 1.80 | 1.59240 | 68.3 |
| 11* | 7.357 | 1.28 | | |
| 12* | 12.505 | 1.00 | 1.84666 | 23.8 |
| 13* | 5.927 | | | |
| Image plane | ∞ | | | |

Aspherical data

1st surface

K = −4.55173e+000 A 4 = 1.04524e−003 A 6 = 5.22673e−005
2nd surface

K = 1.07655e+000 A 4 = −2.68944e−003 A 6 = 1.76360e−004
3rd surface

K = −5.98889e+000 A 4 = −7.72514e−003 A 6 = 4.93606e−004

(NUMERICAL EXAMPLE 2)

4th surface

K = −6.75596e+000 A 4 = −4.98007e−003 A 6 = 5.07961e−004
6th surface

K = −7.89069e+001 A 4 = −2.69850e−003 A 6 = 3.52609e−004
7th surface

K = −2.27576e+001 A 4 = 1.42455e−003 A 6 = −1.01831e−005
8th surface

K = −3.33768e+001 A 4 = 4.50455e−003 A 6 = −2.18686e−004
9th surface

K = −2.68795e−002 A 4 = −2.95824e−004 A 6 = 1.05748e−004
10th surface

K = −2.20833e+000 A 4 = 3.37019e−003 A 6 = 3.11853e−005
11th surface

K = 1.71227e+000 A 4 = −4.49146e−005 A 6 = 1.17908e−004
12th surface

K = 5.70869e−001 A 4 = −3.54385e−003 A 6 = 2.46582e−004
13th surface

K = −1.78719e+000 A 4 = −7.83362e−004 A 6 = 3.59345e−004

Various data

| | |
|---|---|
| Focal length | 7.50 |
| F number | 2.88 |
| Half angle of field | 27.32 |
| Image height | 3.88 |
| Total lens length | 18.00 |
| BF | 4.55 |
| Entrance pupil position | 4.41 |
| Exit pupil position | −4.23 |
| Front-side principal position | 5.51 |
| Rear-side principal position | −2.95 |

Single lens data

| Lens | Start surface | Focal length |
|---|---|---|
| 1 | 1 | −14.87 |
| 2 | 3 | −24.32 |
| 3 | 6 | −14.75 |
| 4 | 8 | 4.91 |
| 5 | 10 | 12.41 |
| 6 | 12 | −14.31 |

Tele-middle facet
Unit mm
Surface data

| Surface number | r | d | nd | vd |
|---|---|---|---|---|
| 1* | −15.000 | 1.30 | 1.72916 | 54.7 |
| 2* | 17.960 | 1.95 | | |
| 3* | 6.796 | 1.40 | 1.59240 | 68.3 |
| 4* | −7.146 | 0.97 | | |
| 5(stop) | ∞ | 0.20 | | |
| 6* | −14.236 | 0.80 | 1.80518 | 25.4 |
| 7* | −98.169 | 0.20 | | |
| 8* | 5.334 | 1.20 | 1.64000 | 60.1 |
| 9* | 4.199 | 1.35 | | |
| 10* | 5.372 | 1.80 | 1.59240 | 68.3 |
| 11* | 9.899 | 1.28 | | |
| 12* | 5.128 | 1.00 | 1.84666 | 23.8 |
| 13* | 3.875 | | | |
| Image plane | ∞ | | | |

(NUMERICAL EXAMPLE 2)

Aspherical data

1st surface

K = 8.00699e+000 A 4 = −1.47327e−003 A 6 = 7.30169e−005

2nd surface

K = −3.65224e+001 A 4 = −5.44314e−004 A 6 = 5.29084e−005

3rd surface

K = −3.27830e+000 A 4 = 9.82143e−004 A 6 = 1.93818e−005

4th surface

K = −1.26439e+000 A 4 = 1.25692e−003 A 6 = −7.42342e−006

6th surface

K = −5.37243e+000 A 4 = 1.00930e−003 A 6 = 8.59265e−005

7th surface

K = −9.00000e+001 A 4 = 2.44487e−003 A 6 = 1.02366e−004

8th surface

K = −5.01056e+000 A 4 = 8.62296e−003 A 6 = 6.49491e−005

9th surface

K = 6.14970e−001 A 4 = 2.64291e−003 A 6 = 4.35217e−004

10th surface

K = 7.18277e−001 A 4 = 3.35315e−003 A 6 = −1.54486e−004

11th surface

K = 1.51189e+000 A 4 = 5.61145e−003 A 6 = −1.70734e−004

12th surface

K = 9.04194e−001 A 4 = −6.62979e−003 A 6 = −1.55750e−004

13th surface

K = −6.57254e−003 A 4 = − 9.21593e−003 A 6 = 2.82444e−005

Various data

| | |
|---|---|
| Focal length | 10.50 |
| F number | 2.88 |
| Half angle of field | 20.26 |
| Image height | 3.88 |
| Total lens length | 18.00 |
| BF | 4.55 |
| Entrance pupil position | 3.62 |
| Exit pupil position | −4.01 |
| Front-side principal position | 1.25 |
| Rear-side principal position | −5.95 |

Single lens data

| Lens | Start surface | Focal length |
|---|---|---|
| 1 | 1 | −11.03 |
| 2 | 3 | 6.11 |
| 3 | 6 | −20.77 |
| 4 | 8 | −52.55 |
| 5 | 10 | 17.27 |
| 6 | 12 | −29.54 |

Tele facet
Unit mm

Surface data

| Surface number | r | d | nd | vd |
|---|---|---|---|---|
| 1* | 33.245 | 1.30 | 1.72916 | 54.7 |
| 2* | 144.445 | 1.95 | | |
| 3* | 12.849 | 1.40 | 1.59240 | 68.3 |
| 4* | −9.797 | 0.97 | | |
| 5(stop) | ∞ | 0.20 | | |
| 6* | −13.239 | 0.80 | 1.80518 | 25.4 |
| 7* | 60.932 | 0.20 | | |
| 8* | 5.788 | 1.20 | 1.64000 | 60.1 |
| 9* | 4.534 | 1.35 | | |
| 10* | 5.805 | 1.80 | 1.59240 | 68.3 |
| 11* | 4.659 | 1.28 | | |
| 12* | 5.752 | 1.00 | 1.84666 | 23.8 |
| 13* | 6.534 | | | |
| Image plane | ∞ | | | |

Aspherical data

1st surface

K = −8.19456e+001 A 4 = −5.31853e−004 A 6 = −7.42778e−006

2nd surface

K = −9.00000e+001 A 4 = 9.14133e−005 A 6 = 1.43749e−005

3rd surface

K = −1.08476e+001 A 4 = 1.16459e−003 A 6 = −1.83197e−005

4th surface

K = 9.72251e−001 A 4 = 1.35326e−004 A 6 = 7.81170e−006

6th surface

K = −6.39115e+001 A 4 = 2.15637e−003 A 6 = 1.05300e−005

7th surface

K = −9.00000e+001 A 4 = 4.80467e−003 A 6 = 7.24665e−005

8th surface

K = −1.02518e+001 A 4 = 6.60769e−003 A 6 = 1.61089e−004

9th surface

K = 1.25753e+000 A 4 = −2.95145e−005 A 6 = 3.76702e−004

10th surface

K = −1.25455e+000 A 4 = −1.16553e−003 A 6 = 2.81324e−005

11th surface

K = −4.99122e+000 A 4 = 1.63656e−003 A 6 = −1.60913e−004

12th surface

K = −5.81002e−001 A 4 = −3.88415e−003 A 6 = 1.65437e−004

13th surface

K = 1.22656e+000 A 4 = −4.86561e−003 A 6 = 1.16617e−004

Various data

| | |
|---|---|
| Focal length | 15.00 |
| F number | 2.88 |
| Half angle of field | 14.48 |
| Image height | 3.88 |
| Total lens length | 18.00 |
| BF | 4.55 |
| Entrance pupil position | 5.25 |
| Exit pupil position | −4.71 |
| Front-side principal position | −4.04 |
| Rear-side principal position | −10.45 |

Single lens data

| Lens | Start surface | Focal length |
|---|---|---|
| 1 | 1 | 58.93 |
| 2 | 3 | 9.60 |
| 3 | 6 | −13.44 |
| 4 | 8 | −52.19 |
| 5 | 10 | −95.85 |
| 6 | 12 | 35.77 |

(NUMERICAL EXAMPLE 3)

Wide facet
Unit mm
Surface data

| Surface number | r | d | nd | νd |
|---|---|---|---|---|
| 1* | −278.039 | 1.15 | 1.69680 | 55.5 |
| 2* | 6.000 | 2.75 | | |
| 3* | −13.838 | 1.55 | 1.59240 | 68.3 |
| 4* | −4.335 | 0.50 | | |
| 5* | 5.392 | 0.80 | 1.80518 | 25.4 |
| 6* | 3.393 | 0.43 | | |
| 7(stop) | ∞ | 1.56 | | |
| 8* | −20.462 | 1.20 | 1.64000 | 60.1 |
| 9* | −3.385 | 0.59 | | |
| 10* | 11.995 | 1.65 | 1.59240 | 68.3 |
| 11* | −11.271 | 1.37 | | |
| 12* | −9.279 | 1.00 | 1.84666 | 23.8 |
| 13* | 9.946 | | | |
| Image plane | ∞ | | | |

Aspherical data

1st surface

K = −1.51839e+001 A 4 = 6.01752e−004 A 6 = 2.86999e−005
2nd surface

K = 1.96510e+000 A 4 = −3.86322e−004 A 6 = −1.66133e−005
3rd surface

K = 2.27610e+001 A 4 = −8.92074e−004 A 6 = −6.83728e−004
4th surface

K = −7.29708e+000 A 4 = −6.23057e−003 A 6 = −1.69117e−004
5th surface

K = −9.67598e−001 A 4 = −7.68250e−003 A 6 = −2.57460e−004
6th surface

K = −4.96656e+000 A 4 = 7.15623e−004 A 6 = 8.72707e−006
8th surface

K = −6.04476e−001 A 4 = −1.54465e−003 A 6 = 2.57992e−004
9th surface

K = −1.00603e+000 A 4 = −2.23851e−003 A 6 = −9.07492e−005
10th surface

K = −3.55816e+001 A 4 = 7.39878e−005 A 6 = −4.05799e−004
11th surface

K = 3.15494e+000 A 4 = −5.45664e−003 A 6 = 4.27810e−005
12th surface

K = −1.09737e+001 A 4 = −4.17651e−003 A 6 = 3.03530e−004
13th surface

K = −1.89271e+001 A 4 = 3.28962e−003 A 6 = 1.01426e−004

Various data

| Focal length | 5.20 |
|---|---|
| F number | 2.88 |
| Half angle of field | 36.69 |
| Image height | 3.88 |
| Total lens length | 18.00 |
| BF | 3.45 |
| Entrance pupil position | 3.90 |
| Exit pupil position | −4.05 |
| Front-side principal position | 5.49 |
| Rear-side principal position | −1.75 |

Single lens data

| Lens | Start surface | Focal length |
|---|---|---|
| 1 | 1 | −8.41 |
| 2 | 3 | 10.05 |

-continued (NUMERICAL EXAMPLE 3)

| 3 | 5 | −13.83 |
|---|---|---|
| 4 | 8 | 6.17 |
| 5 | 10 | 10.07 |
| 6 | 12 | −5.54 |

Wide-middle facet
Unit mm
Surface data

| Surface number | r | d | nd | νd |
|---|---|---|---|---|
| 1* | 246.153 | 1.15 | 1.69680 | 55.5 |
| 2* | 6.000 | 2.75 | | |
| 3* | 27.183 | 1.55 | 1.59240 | 68.3 |
| 4* | −4.038 | 0.50 | | |
| 5* | 5.849 | 0.80 | 1.80518 | 25.4 |
| 6* | 3.626 | 0.43 | | |
| 7(stop) | ∞ | 1.56 | | |
| 8* | −30.741 | 1.20 | 1.64000 | 60.1 |
| 9* | −6.722 | 0.59 | | |
| 10* | 5.066 | 1.65 | 1.59240 | 68.3 |
| 11* | 6.280 | 1.37 | | |
| 12* | 18.583 | 1.00 | 1.84666 | 23.8 |
| 13* | 6.571 | (variable) | | |
| Image plane | ∞ | | | |

Aspherical data

1st surface

K = 9.00000e+001 A 4 = −8.39451e−004 A 6 = 2.35285e−005
2nd surface

K = −5.34082e+000 A 4 = 4.03329e−003 A 6 = −1.66191e−005
3rd surface

K = 6.33715e+001 A 4 = 2.67153e−003 A 6 = −1.61664e−004
4th surface

K = −5.22262e+000 A 4 = −1.37728e−003 A 6 = 2.77794e−005
5th surface

K = −2.62749e+000 A 4 = −9.55365e−003 A 6 = 2.40785e−004
6th surface

K = −5.84224e+000 A 4 = −6.94200e−003 A 6 = 1.86444e−004
8th surface

K = 9.00000e+001 A 4 = 8.35122e−003 A 6 = 1.58826e−004
9th surface

K = −1.03311e+001 A 4 = 3.42515e−003 A 6 = 6.46597e−004
10th surface

K = −3.10477e+000 A 4 = 3.57728e−003 A 6 = 1.57487e−004
11th surface

K = −3.74031e+000 A 4 = −8.18470e−004 A 6 = 4.37137e−004
12th surface

K = −9.00000e+001 A 4 = −7.97372e−003 A 6 = 3.60044e−004
13th surface

K = −1.19739e+001 A 4 = −3.83591e−003 A 6 = 4.12780e−004

Various data

| Focal length | 7.50 |
|---|---|
| F number | 2.88 |
| Half angle of field | 27.32 |
| Image height | 3.88 |
| Total lens length | 18.00 |
| BF | 3.45 |
| Entrance pupil position | 4.17 |
| Exit pupil position | −3.91 |

(NUMERICAL EXAMPLE 3)

| Front-side principal position | 4.03 |
| Rear-side principal position | −4.05 |

Single lens data

| Lens | Start surface | Focal length |
| --- | --- | --- |
| 1 | 1 | −8.84 |
| 2 | 3 | 6.05 |
| 3 | 5 | −14.11 |
| 4 | 8 | 13.19 |
| 5 | 10 | 29.38 |
| 6 | 12 | −12.48 |

Tele-middle facet
Unit mm
Surface data

| Surface number | r | d | nd | νd |
| --- | --- | --- | --- | --- |
| 1* | 42.658 | 1.15 | 1.69680 | 55.5 |
| 2* | 8.092 | 2.75 | | |
| 3* | 3.713 | 1.55 | 1.59240 | 68.3 |
| 4* | −32.881 | 0.50 | | |
| 5* | 5.257 | 0.80 | 1.80518 | 25.4 |
| 6* | 3.116 | 0.43 | | |
| 7(stop) | ∞ | 1.56 | | |
| 8* | −5.288 | 1.20 | 1.64000 | 60.1 |
| 9* | −4.931 | 0.59 | | |
| 10* | 5.092 | 1.65 | 1.59240 | 68.3 |
| 11* | 5.827 | 1.37 | | |
| 12* | 11.995 | 1.00 | 1.84666 | 23.8 |
| 13* | 7.874 | | | |
| Image plane | ∞ | | | |

Aspherical data

1st surface

K = −2.66383e+001 A 4 = −2.18872e−003 A 6 = 6.31429e−005
2nd surface

K = 2.08397e+000 A 4 = −3.26063e−003 A 6 = 2.84905e−005
3rd surface

K = 1.10583e−001 A 4 = 2.75665e−004 A 6 = −1.47214e−005
4th surface

K = −6.74747e+001 A 4 = 3.16266e−003 A 6 = −8.64586e−005
5th surface

K = −1.66566e+000 A 4 = −3.71526e−003 A 6 = 1.34066e−004
6th surface

K = 5.41702e−001 A 4 = −9.62595e−003 A 6 = 1.70734e−004
8th surface

K = 3.16668e+000 A 4 = 4.62242e−003 A 6 = 1.81580e−004
9th surface

K = 1.69035e+000 A 4 = 5.27071e−003 A 6 = 1.69765e−004
10th surface

K = 1.136736e+000 A 4 = 3.22950e−006 A 6 = 2.93792e−005
11th surface

K = 2.99335e+000 A 4 = −2.40678e−003 A 6 = 7.59485e−005
12th surface

K = −9.39873e+000 A 4 = −2.70967e−003 A 6 = 5.48169e−005
13th surface

K = −8.61644e+000 A 4 = −1.90799e−003 A 6 = 9.68595e−005

(NUMERICAL EXAMPLE 3)

Various data

| Focal length | 10.50 |
| F number | 2.88 |
| Half angle of field | 20.26 |
| Image height | 3.88 |
| Total lens length | 18.00 |
| BF | 3.45 |
| Entrance pupil position | 5.41 |
| Exit pupil position | −4.58 |
| Front-side principal point position | 2.18 |
| Rear-side principal point position | −7.05 |

Single lens data

| Lens | Start surface | Focal length |
| --- | --- | --- |
| 1 | 1 | 14.53 |
| 2 | 3 | 5.72 |
| 3 | 5 | −11.40 |
| 4 | 8 | 49.39 |
| 5 | 10 | 37.12 |
| 6 | 12 | −30.46 |

Tele facet
Unit mm
Surface data

| Surface number | r | d | nd | νd |
| --- | --- | --- | --- | --- |
| 1* | 8.009 | 1.15 | 1.69680 | 55.5 |
| 2* | 7.508 | 2.75 | | |
| 3* | 3.702 | 1.55 | 1.59240 | 68.3 |
| 4* | 88.710 | 0.50 | | |
| 5* | 7.031 | 0.80 | 1.80518 | 25.4 |
| 6* | 3.311 | 0.43 | | |
| 7(stop) | ∞ | 1.56 | | |
| 8* | −9.083 | 1.20 | 1.64000 | 60.1 |
| 9* | 25.053 | 0.59 | | |
| 10* | 7.503 | 1.65 | 1.59240 | 68.3 |
| 11* | 15.709 | 1.37 | | |
| 12* | 5.989 | 1.00 | 1.84666 | 23.8 |
| 13* | 7.775 | | | |
| Image plane | ∞ | | | |

Aspherical data

1st surface

K = 5.90804e−001 A 4 = −3.95356e−004 A 6 = −1.87359e−005
2nd surface

K = 9.02179e−001 A 4 = −6.68247e−004 A 6 = −4.35238e−005
3rd surface

K = 7.86019e−002 A 4 = 1.00348e−004 A 6 = 5.36889e−006
4th surface

K = 9.00000e+001 A 4 = 2.36995e−003 A 6 = −5.00552e−005
5th surface

K = −5.90637e+000 A 4 = −5.74098e−004 A 6 = 1.24577e−004
6th surface

K = 7.11639e−001 A 4 = −6.13172e−003 A 6 = 2.01076e−004
8th surface

K = 9.12926e+000 A 4 = 5.29083e−003 A 6 = −8.33091e−004
9th surface

K = 9.00002e+001 A 4 = 6.28003e−003 A 6 = −7.33225e−004
10th surface

K = 1.72371e+000 A 4 = −2.97948e−004 A 6 = −2.54947e−006
11th surface

K = −6.66245e+001 A 4 = −1.60347e−003 A 6 = 1.06542e−004

(NUMERICAL EXAMPLE 3)

12th surface

K = −3.71090e+000 A 4 = −1.38172e−003 A 6 = 1.02692e−004
13th surface

K = 1.93714e+000 A 4 = −3.41454e−003 A 6 = 1.05240e−004

Various data

| | |
|---|---|
| Focal length | 15.00 |
| F number | 2.88 |
| Half angle of field | 14.48 |
| Image height | 3.88 |
| Total lens length | 18.00 |
| BF | 3.45 |
| Entrance pupil position | 8.15 |
| Exit pupil position | −6.16 |
| Front-side principal point position | −0.26 |
| Rear-side principal point position | −11.55 |

Single lens data

| Lens | Start surface | Focal length |
|---|---|---|
| 1 | 1 | −2975.24 |
| 2 | 3 | 6.48 |
| 3 | 5 | −8.60 |
| 4 | 8 | −10.28 |
| 5 | 10 | 22.56 |
| 6 | 12 | 24.50 |

(NUMERICAL EXAMPLE 4)

Wide facet
Unit mm
Surface data

| Surface number | r | d | nd | vd |
|---|---|---|---|---|
| 1* | 9.963 | 1.30 | 1.62041 | 60.3 |
| 2* | 2.063 | 3.16 | | |
| 3* | 5.403 | 1.40 | 1.59240 | 68.3 |
| 4* | −11.150 | 0.60 | | |
| 5* | −43.751 | 0.80 | 1.80518 | 25.4 |
| 6* | 15.608 | 0.10 | | |
| 7(stop) | ∞ | 0.10 | | |
| 8* | 4.764 | 1.20 | 1.64000 | 60.1 |
| 9* | −66.999 | 2.94 | | |
| 10* | 14.404 | 1.80 | 1.59240 | 68.3 |
| 11* | −9.500 | 0.50 | | |
| 12* | −17.138 | 1.00 | 1.84666 | 23.8 |
| 13* | 11.853 | | | |
| Image plane | ∞ | | | |

Aspherical data

1st surface

K = −2.47869e+001 A 4 = −2.02166e−003 A 6 = 5.43003e−005
2nd surface

K = −1.79551e+000 A 4 = 1.25374e−002 A 6 = −4.89811e−005
3rd surface

K = 2.24981e+000 A 4 = 2.67772e−003 A 6 = 1.71832e−004
4th surface

K = −2.15785e+001 A 4 = 1.38585e−003 A 6 = −4.29296e−005
5th surface

K = −7.77189e+000 A 4 = 2.90232e−003 A 6 = −1.23226e−003
6th surface

K = 5.52064e+001 A 4 = 2.30902e−003 A 6 = −9.38603e−004

(NUMERICAL EXAMPLE 4)

8th surface

K = 6.43691e−001 A 4 = 1.22013e−003 A 6 = 3.62473e−004
9th surface

K = −6.95418e+001 A 4 = 3.79577e−003 A 6 = 8.00925e−004
10th surface

K = −9.00000e+001 A 4 = 5.32715e−003 A 6 = 4.14940e−004
11th surface

K = 1.36769e+001 A 4 = −2.97992e−003 A 6 = 1.43850e−003
12th surface

K = −9.00000e+001 A 4 = −2.16468e−002 A 6 = 4.36176e−004
13th surface

K = 1.40560e+001 A 4 = −1.25552e−002 A 6 = 5.78256e−004

Various data

| | |
|---|---|
| Focal length | 5.20 |
| F number | 2.88 |
| Half angle of field | 36.69 |
| Image height | 3.88 |
| Total lens length | 17.77 |
| BF | 2.87 |
| Entrance pupil position | 3.58 |
| Exit pupil position | −4.59 |
| Front-side principal point position | 5.15 |
| Rear-side principal point position | −2.33 |

Single lens data

| Lens | Start surface | Focal length |
|---|---|---|
| 1 | 1 | −4.47 |
| 2 | 3 | 6.34 |
| 3 | 5 | −14.20 |
| 4 | 8 | 6.99 |
| 5 | 10 | 9.94 |
| 6 | 12 | −8.15 |

Tele facet
Unit mm
Surface data

| Surface number | r | d | nd | vd |
|---|---|---|---|---|
| 1* | 32.268 | 1.30 | 1.62041 | 60.3 |
| 2* | −51.647 | 3.16 | | |
| 3* | 5.700 | 1.40 | 1.59240 | 68.3 |
| 4* | −12.800 | 0.60 | | |
| 5* | −9.999 | 0.80 | 1.80518 | 25.4 |
| 6* | 191.283 | 0.10 | | |
| 7(stop) | ∞ | 0.10 | | |
| 8* | 5.214 | 1.20 | 1.64000 | 60.1 |
| 9* | 2.487 | 2.94 | | |
| 10* | 18.649 | 1.80 | 1.59240 | 68.3 |
| 11* | 26.555 | 0.50 | | |
| 12* | 8.399 | 1.00 | 1.84666 | 23.8 |
| 13* | 11.838 | | | |
| Image plane | ∞ | | | |

Aspherical data

1st surface

K = −1.92634e+001 A 4 = −2.82433e−004 A 6 = 3.81416e−006
2nd surface

K = 9.00000e+001 A 4 = 3.23423e−004 A 6 = 2.68125e−006
3rd surface

K = −8.60800e−001 A 4 = 2.63313e−003 A 6 = 4.15438e−005

-continued (NUMERICAL EXAMPLE 4)

4th surface

K = −2.86471e+001 A 4 = 8.10119e−004 A 6 = 2.03306e−006
5th surface

K = 9.11794e+000 A 4 = 5.04006e−003 A 6 = 2.54023e−004
6th surface

K = 7.38599e+001 A 4 = 2.81749e−003 A 6 = 5.63571e−004
8th surface

K = −8.57667e−001 A 4 = −3.65406e−003 A 6 = −4.84007e−004
9th surface

K = −2.26017e−001 A 4 = −3.68837e−003 A 6 = −1.37027e−003
10th surface

K = 1.65894e+001 A 4 = 2.55538e−003 A 6 = 1.45887e−005
11th surface

K = 9.21247e+000 A 4 = 2.90663e−004 A 6 = −7.09973e−006
12th surface

K = −7.20764e+000 A 4 = −1.10889e−003 A 6 = −5.90829e−005
13th surface

K = 8.94495e+000 A 4 = −3.28402e−003 A 6 = −4.17715e−005

| Focal length | 15.00 |
| F number | 2.88 |
| Half angle of field | 14.48 |
| Image height | 3.88 |
| Total lens length | 17.77 |
| BF | 2.87 |
| Entrance pupil position | 8.12 |
| Exit pupil position | −6.28 |
| Front-side principal point position | −1.49 |
| Rear-side principal point position | −12.13 |

Single lens data

| Lens | Start surface | Focal length |
|---|---|---|
| 1 | 1 | 32.20 |
| 2 | 3 | 6.85 |
| 3 | 5 | −11.78 |
| 4 | 8 | −8.97 |
| 5 | 10 | 97.49 |
| 6 | 12 | 30.14 |

TABLE 1

| | EMBODIMENT | | | |
| FACET TYPE | 1 | 2 | 3 | 4 |
|---|---|---|---|---|
| A | 1.00 | 0.94 | 1.11 | 1.04 |
| B | 1.00 | 0.90 | 1.01 | 1.00 |
| C | 1.00 | 1.00 | 0.99 | |
| D | 1.00 | 1.00 | 1.00 | |

This application claims the benefit of Japanese Patent Application No. 2014-227662, filed on Nov. 10, 2014, which is hereby incorporated by reference herein in its entirety.

What is claimed is:

1. A control apparatus comprising:
a focus detector configured to perform focus detection based on an image signal obtained via a first imaging optical system, the first imaging optical system having a shallowest depth of field in a plurality of imaging optical systems having focal lengths different from each other; and
a controller configured to:
obtain an output signal from the focus detector, the output signal being generated based on the image signal obtained via the first imaging optical system;
determine position information of a first focus unit of the first imaging optical system; and
perform focus control of a second imaging optical system, different from the first imaging optical system, of the plurality of imaging optical systems based on position information of a second focus unit of the second imaging optical system, the position information of the second focus unit being determined based on the determined position information of the first focus unit.

2. The control apparatus according to claim 1, further comprising a calculator configured to calculate a movement position of the second focus unit,
wherein:
the controller is configured to perform the focus control by moving the first focus unit based on the output signal from the focus detector, and
the calculator is configured to calculate the movement position of the second focus unit based on a position of the first focus unit.

3. The control apparatus according to claim 1, wherein the controller is configured to perform the focus control by integrally moving a plurality of focus units of the plurality of imaging optical systems by an identical moving amount based on the output signal from the focus detector.

4. The control apparatus according to claim 1, further comprising:
an acquirer configured to acquire image capturing condition information; and
a determiner configured to determine the first imaging optical system based on the image capturing condition information.

5. The control apparatus according to claim 4, wherein:
the acquirer is configured to acquire, as the image capturing condition information, information relating to the plurality of imaging optical systems, focal lengths of the imaging optical systems, and F numbers of the imaging optical systems, and
the determiner is configured to determine the first imaging optical system satisfying a conditional expression below:

$$\frac{f_i^2}{Fno_i} \leq \frac{f_1^2}{Fno_1},$$

where $f_1$ is a focal length of the first imaging optical system, $Fno_1$ is an F number of the first imaging optical system, $f_i$ is a focal length of one of the imaging optical systems, and $Fno_i$ is an F number of the one of the imaging optical systems.

6. The control apparatus according to claim 1, wherein the focus detector is configured to perform the focus detection by a contrast detection method.

7. The control apparatus according to claim 1, wherein the focus detector is configured to perform the focus detection by a phase-difference detection method.

8. The control apparatus according to claim 1, wherein the focus detector includes:
a first focus detector configured to perform focus detection by a phase-difference detection method, and a second focus detector configured to perform focus detection by a contrast detection method, and wherein the controller is configured to:
perform first focus control based on a first output signal from the first focus detector, and
perform second focus control based on a second output signal from the second focus detector after the first focus control.

9. The control apparatus according to claim 4, further comprising:
a region determiner configured to determine a region in which the focus detection is to be performed; and
an inclusion determiner configured to determine whether the region determined by the region determiner is included in an image pickup region for each of the plurality of imaging optical systems,
wherein the determiner is configured to determine the first imaging optical system based on a determination result of the inclusion determiner.

10. An image pickup apparatus comprising:
an image pickup element configured to photoelectrically convert an optical image formed via at least one of a plurality of imaging optical systems, the plurality of imaging optical systems having focal lengths different from each other;
a focus detector configured to perform focus detection based on an image signal obtained via a first imaging optical system, the first imaging optical system having a shallowest depth of field in the plurality of imaging optical systems; and
a controller configured to:
obtain an output signal from the focus detector, the output signal being generated based on the image signal obtained via the first imaging optical system;
determine position information of a first focus unit of the first imaging optical system; and
perform focus control of a second imaging optical system, different from the first imaging optical system, of the plurality of imaging optical systems based on position information of a second focus unit of the second imaging optical system, the position information of the second focus unit being determined based on the determined position information of the first focus unit.

11. The image pickup apparatus according to claim 10, wherein the image pickup element includes a plurality of image pickup regions corresponding to the respective imaging optical systems.

12. An image pickup system comprising:
a plurality of imaging optical systems, wherein at least one imaging optical system of the plurality of imaging optical systems has a different focal length from another imaging optical system of the plurality of imaging optical systems;
an image pickup element configured to photoelectrically convert an optical image formed via at least one of the plurality of imaging optical systems;
a focus detector configured to perform focus detection based on an image signal obtained via a first imaging optical system, the first imaging optical system having a shallowest depth of field in the plurality of imaging optical systems; and
a controller configured to:
obtain an output signal from the focus detector, the output signal being generated based on the image signal obtained via the first imaging optical system;
determine position information of a first focus unit of the first imaging optical system; and
perform focus control of a second imaging optical system, different from the first imaging optical system, of the plurality of imaging optical systems based on position information of a second focus unit of the second imaging optical system, the position information of the second focus unit being determined based on the determined position information of the first focus unit.

13. The image pickup system according to claim 12, wherein the plurality of optical systems includes at least one imaging optical system that has an identical focal length as another imaging optical system of the plurality of imaging optical systems.

14. The image pickup system according to claim 12, further comprising a holder configured to integrally move a plurality of focus units of the imaging optical systems by an identical moving amount during the focus control of the imaging optical systems.

15. A lens apparatus comprising:
a plurality of imaging optical systems having focal lengths different from each other; and
a controller configured to:
determine position information of a first focus unit of a first imaging optical system of the plurality of imaging optical system; and
perform focus control of a second imaging optical system, different from the first imaging optical system, of the plurality of imaging optical systems based on position information of a second focus unit of the second imaging optical system, the position information of the second focus unit being determined based on an image signal obtained via the first imaging optical system, the first imaging optical system having a shallowest depth of field in the plurality of imaging optical systems.

16. A control method comprising the steps of:
performing focus detection based on an image signal obtained via a first imaging optical system, the first imaging optical system having a shallowest depth of field in a plurality of imaging optical systems having focal lengths different from each other;
obtaining an output signal based on the image signal obtained via the first imaging optical system;
determining position information of a first focus unit of the first imaging optical system; and
performing focus control of a second imaging optical system, different from the first imaging optical system, of the plurality of imaging optical systems based on position information of a second focus unit of the second imaging optical system, the position information of the second focus unit being determined based on the determined position information of the first focus unit.

17. A non-transitory computer-readable storage medium storing a program which causes a computer to execute a process comprising:
performing focus detection based on an image signal obtained via a first imaging optical system, the first imaging optical system having a shallowest depth of field in a plurality of imaging optical systems having focal lengths different from each other;
obtaining an output signal based on the image signal obtained via the first imaging optical system;
determining position information of a first focus unit of the first imaging optical system; and performing focus control of a second imaging optical system, different from the first imaging optical system, of the plurality of imaging optical systems based on position information of a second focus unit of the second imaging optical system, the position information of the second focus unit being determined based on the determined position information of the first focus unit.

18. The control apparatus according to claim 1, wherein the output signal is one of an auto-focus (AF) evaluation value or a defocus amount.

* * * * *